US005352275A

United States Patent [19]

Nath et al.

[11] Patent Number: 5,352,275

[45] Date of Patent: Oct. 4, 1994

[54] METHOD OF PRODUCING HOT MIX ASPHALT

[75] Inventors: Robert Nath, Austin; Robert Erickson, Georgetown; John Wiley, Leander; Harry Hebard, Burnet; Michael Miles, Georgetown, all of Tex.

[73] Assignee: Cyclean, Inc., Round Rock, Tex.

[21] Appl. No.: 951,084

[22] Filed: Sep. 25, 1992

Related U.S. Application Data

[63] Continuation-in-part of Ser. No. 803,642, Nov. 27, 1991, which is a continuation-in-part of Ser. No. 754,264, Aug. 29, 1991, which is a continuation-in-part of Ser. No. 387,160, Jul. 31, 1989, abandoned.

[51] Int. Cl.⁵ .............................................. B01D 53/04

[52] U.S. Cl. ....................................... 95/117; 55/315; 95/129; 95/139; 95/140; 95/141; 95/278; 95/282; 96/134

[58] Field of Search .................... 55/315; 95/117, 129, 95/139, 140, 141, 143, 268, 269, 272, 278, 282, 285; 96/134, 136

[56] References Cited

U.S. PATENT DOCUMENTS 3,485,671 12/1969 Stephens .......................... 55/315 X
4,224,043 9/1980 Dupre .............................. 55/315 X
4,490,162 12/1984 Davis ............................... 55/315 X

*Primary Examiner*—Charles Hart
*Attorney, Agent, or Firm*—Ronald R. Snider

[57] ABSTRACT

An apparatus and process is provided for the production of hot mix asphalt (HMA) by the treatment of virgin material alone or adding reclaimed or recycled asphalt pavement (RAP) of up to 100% of the HMA comprised of reclaimed asphaltic pavement (RAP). The HMA is first heated in either a parallel or a counter flow rotating drum which is supplied with hot combustion gases generated by a remote low $NO_x$ burner. The temperature of hot gases entering the drum is from about 400° to 2,000° F., and the temperature of gases exiting from the drum is from about 130° to 220° F. The HMA material optionally can be subjected to microwave radiation to raise the material to a final temperature, or optionally to only reorient the dipolar molecules of the material without any measurable heating of the material. The exhaust gas is treated and made environmentally safe. The hot gases exiting from the drum are passed through a knockout box and then through a baghouse having acrylic bags coated with a protective layer of particulate material. The gases exiting the baghouse are passed through an oxidizer to further remove smoke and asphaltic material and at least a portion of the gases from the oxidizer are recycled through a heat exchanger.

13 Claims, 33 Drawing Sheets

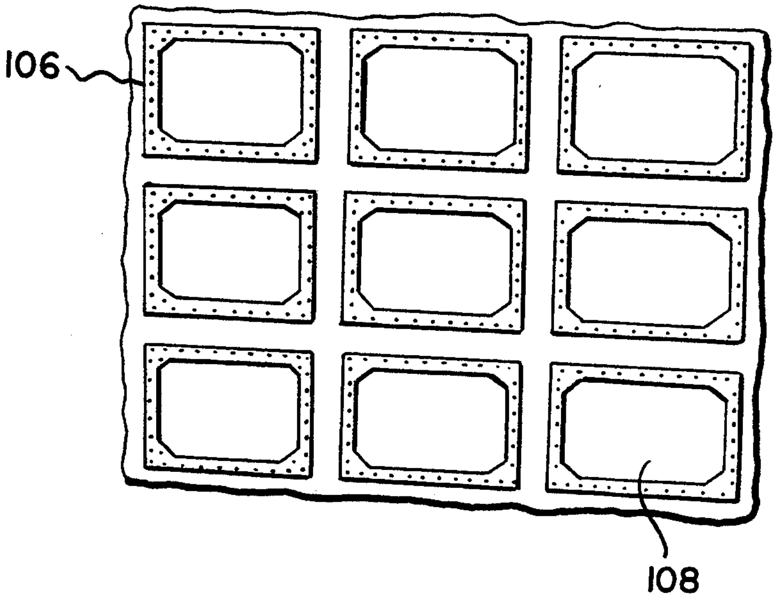
Fig. 12E
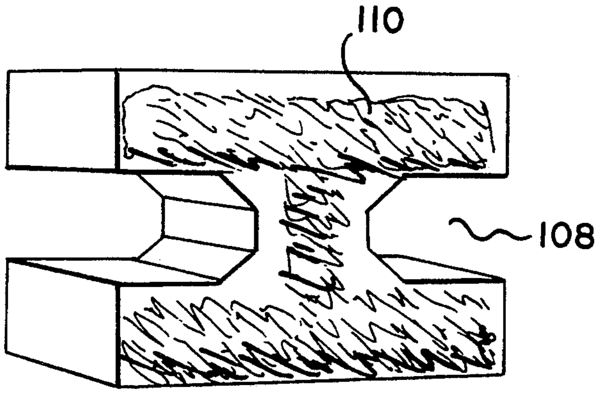
Fig. 12F
Fig. 12G
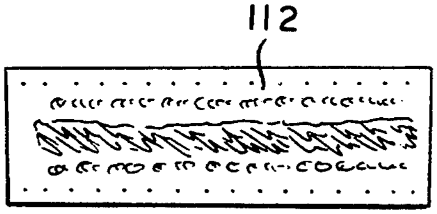

METHOD OF PRODUCING HOT MIX ASPHALT

RELATED APPLICATIONS

This application is a continuation-in-part of co-pending U.S. patent application Ser. No. 07/803,642 filed Nov. 27, 1991, which in turn is a continuation-in-part of U.S. patent application Ser. No. 07/754,264 filed Aug. 29, 1991 which is a continuation-in-part of U.S. patent application Ser. No. 07/387,160 filed Jul. 31, 1989, now abandoned, entitled "Drum Dryer For Reprocessing Recycled Asphalt Pavement", which is owned by the same corporation, Cyclean, Inc., a Delaware Corporation.

FIELD OF THE INVENTION

This invention is in the field of environmentally safe hot mix asphalt (HMA) plants which can use virgin aggregate and/or recycled asphaltic pavement (RAP). More particularly, this invention relates to an HMA plant using a counter flow drum and an external burner where the hot gases of combustion exit the dryer drum at the same end that the hot asphalt enters the drum, and the exiting gases carry out excess fumes.

The field of recycling asphalt pavement (RAP) requires that the process not pollute the atmosphere with hydrocarbons, carbon monoxide, and other objectionable gases such as nitrous oxides. It is, therefore, essential to maintain these emissions at an absolute minimum in order to comply with anti pollution regulations in many state and local jurisdictions.

This invention also relates to a method of producing hot mixed asphalt pavement (HMA), more particularly where recycled asphalt pavement (RAP) is used, such that there is little or no air pollution in the form of smoking or production of carbon monoxide, or production of $NO_x$ by the burner used to heat the drum.

DESCRIPTION OF THE PRIOR ART

Prior Art - NAPA

The conventional practices of the prior art are generally shown in a publication by the National Asphalt Pavement Association (NAPA) located at 6811 Kenilworth Avenue, Riverdale, Md., 20737, in a book entitled "The Fundamentals of the Operation and Maintenance of Exhaust Gas System in a Hot Mix Asphalt Facility", 2nd Ed., 1987, incorporated herein by reference. NAPA at page 3 teaches that the most efficient means of drying and heating aggregate is to apply direct heat. It states that this is accomplished with a burner that directs the flame into the drum. This, however, is against the teachings of applicant which places the burner and flame outside the drum and adds substantial quantities of ambient air in order to cool the combustion gases prior to contact with the material and the drum. At page 1.1 NAPA teaches that in drum facilities it is necessary to avoid quenching of the flame. Applicant, however, teaches quenching of the flame prior to its entry into the drum in order to avoid overheating of the material. At pages 1–7 NAPA teaches that improper operation of the burner negatively impacts the overall efficiency of the HMA manufacturing process. Excessive amounts of air, far beyond what is needed for complete combustion of the fuel, are improper and wasteful. This is a teaching away from applicant's invention which requires at least twice as much air as is required for combustion in order to cool the gases prior to entering the drum and striking the veil of RAP. At pages 2–10 NAPA teaches that the purpose of the damper associated with the drum is to limit the amount of excess air that is pulled into the system so that it does not exceed the minimum needed to aid combustion and, therefore, conserve fuel. Applicant's invention, however, requires the damper be open and that substantial quantities of excess air are drawn through in order to reduce the inlet temperature of gases entering the drum and to provide for velocities sufficient to provide fines removal. At page 3-1 NAPA states that in practical terms the exhaust system should remove the gases at a rate which does not result in drum gas velocities which would lift and carry out excessive amounts of aggregate dust. Applicant, however, uses high velocity to remove fines from RAP. NAPA states at page 6-11 that the bag house should be warmed up before aggregate enters the drum and that the exhaust gas temperature in the bag house be above 250° F. at all times. This teaches away from applicant's counter flow embodiment where the temperature and air volume of the exhaust gas entering the bag house is approximately 170° F. and twice the air volume, and are well above the dew point, thereby eliminating condensation problems in the bag house and contrary to the teachings of the prior art.

Prior Art - Hot Mix

In a book entitled "Hot-Mix Asphalt Paving Handbook" published by the U.S. Army Corp of Engineer identified as UN-13 (CEMP-ET) Jul. 31, 1991, incorporated herein by reference, there are further prior art statements which teach away from applicant's choice of the cool flow counter flow design. Hot Mix at page 1–21 states that reclaimed material (RAP) may add a significant amount of fines to the mix. This publication has no recognition of fines removal as accomplished by applicant. At page 2–7 a typical counter flow drum of the prior art is depicted where aggregate is subjected to high heat and direct flame within the drum. This is contrary to applicant's invention which prevents contact of the aggregate (RAP) with high heat gases. Hot Mix at page 2–41 states that only under ideal and carefully controlled production conditions may it be possible to incorporate up to 70% reclaimed aggregates in a recycle mix without major visible emission problems. Applicant, in the cool flow design, has shown that it is possible to operate with 100% RAP and less than 1% additives. Applicant's invention, therefore, goes against the teachings of the Hot Mix publication. At page 2–60, Hot Mix teaches that the efficiency of the bag house will be affected if the temperature of the exhaust gases entering the bag house is below the dew point—the temperature of the exhaust gas at which the moisture begins to condense. Applicant provides exhaust gases into the bag house at a temperature above the dew point but well below the recommended minimum temperature of the prior art, and hence once again operates in a manner inconsistent with the teachings of the prior art.

Patent Prior Art

U.S. Pat. No. 4,600,379 to Elliott shows a counter flow drum which has a burner inside the drum injecting flame and high temperature gases directly into a veil of virgin aggregate, and asphalt cement is mixed in a second outer drum. The hot gases do not reach the asphalt material.

U.S. Pat. No. 4,522,498 to Mendenhall shows a counter flow drum arrangement where a burner is placed inside the drum at the RAP output end of the drum, but which uses a shroud or cover to protect the asphalt from the high flame heat. This does not permit a veil to move across the input gases, and does not produce a true counter flow where the input gâses are applied directly to the exiting RAP. Still further, this design allows the gases to fold back around the shroud and to exit at the same end as the RAP. The design is, therefore, not a counter flow because the gases and the RAP are moving parallel to each other at the RAP output end.

U.S. Pat. No. 4,427,376 to Etnyre et al shows a drum having a shroud which extends from the RAP output end almost to the RAP input. This drum, like the Mendenhall '498 patent, folds the gases back over the RAP so that the flow is parallel at the RAP exit.

U.S. Pat. No. 4,067,552 to Mendenhall shows a design where the hot gas burner is at the RAP exit end, but shielded from the exit RAP. The RAP is heated as it moves over heated pipes which separate it from the high heat and infra red radiation produced by the burner.

U.S. Pat. No. 4,229,109 to Benson describes a drum dryer having a burner located remotely from the drum dryer. Hot gases are recycled through the partially open system. Gases are removed from the output end of the drum, and are fed back to a burner and exhaust. The ratio of exhaust to burner use of the gases is determined by the amount of recycled gases which are required to cool the burner produced gases. The heat source 27 receives fresh air for combustion and recirculated gases. The recirculated gases are kept separate from the combustion fresh air which supplies the oxygen to the burner flame. The recirculated gases are combined with burner produced gases downstream from the burner.

The temperature of the heated gases 25 is controlled by the amount of recirculated gas. The patent teaches that the position of the openings for the recirculated air should be located downstream, just forward from the termination point of the combustion flame (Col 8, 38–50).

Benson teaches that his apparatus may be used for recycling of bituminous pavement or using a combination of old pavement and new aggregates and bituminous binders (Col 9, lines 50–57).

U.S. Pat. No. 3,866,888 to Dydzyk, shows an asphalt pavement drum which includes a recirculating duct 34 and a burner which is attached to the rotary drum.

Other prior art known to applicant includes many examples of asphalt pavement drums which have the burner attached to them and where the flame is inserted into the drum. Use of gas flow which is parallel to the flow of asphalt through the drum is also shown in the prior art. The following patents illustrate the state of the art: U.S. Pat. Nos. 4,309,113 to Mendenhall; 3,614,071 and 4,190,370 to Brock; 4,504,149 to Mendenhall; 4,522,498 to Mendenhall; 4,277,180 to Munderich; 4,481,039 to Mendenhall; 4,255,058 to Peleschka; 4,462,690 to Wirtgen; and 4,361,406 to Loggins et al.

Other Prior Art

In drum dryers of the prior art, flame is introduced directly into the drum and passes within the drum often in direct contact with the aggregated and asphaltic material. The CO formed in the burner is not combined with other gases because as the combustion products hit the wet material, the temperature is rapidly decreased below the level at which CO combustion occurs. As a result, CO remains in the exhaust gases of the drum and is released to the atmosphere. There are also frequently occurring operating conditions that produce uncombined carbon particles and steam cracked hydrocarbons from the asphalt or fuel, resulting in smokey opaque exhaust.

The drum dryers of the prior art also fail to eliminate the production of $NO_x$ because the high heat portion of the flame is not limited by the introduction of a cooling gas. Instead, in a prior art drum, the flame extends for some distance into the drum creating a large region where the temperatures are high enough to form $NO_x$. Even after the flame is extinguished, there still exist high heat conditions where $NO_x$ may be formed. In prior art drums where the flame or combustion gases strike the bituminous compounds, burning and smoking of the asphalt occurs which produces CO as a product of incomplete combustion. CO is also produced by the burner flame and there is no combustion chamber to assure combination of the CO with other materials. This pollutes the atmosphere with the CO, $NO_x$, and smoke containing hydrocarbon from the burned bituminous compounds. The drum dryers of the prior art fail to eliminate steam stripping even with reduced entrance temperatures because the flow design create the simultaneous presence of steam, hot gases and RAP or asphalt in certain zones of the drum. Counterflow drums with recirculated gases also have high temperature steam content. The steam causes cracking of the larger hydrocarbon molecules of less volatility into smaller, volatile molecules, creating an oily vapor in the exhaust. This is a major cause of exhaust stack opacity and not acceptable by current environmental standards.

Most RAP is obtained by mining existing pavement which is reduced in size by milling and/or crushing. These processes break the aggregate in the asphalt pavement into smaller pieces and produce very fine particles which pass through a No. 200 mesh and are known as "fines." This is the most critical range for gradation, as even a slight excess of "−200" mesh fines can produce an unstable mix. In most cases, the permissible percentage range of each category of particle size is prescribed by a buyer for each mix design, and it is mandatory that the RAP be within the allowable percentage range. Many states have specific regulations setting permissible asphalt composition ranges. It is, therefore, desirable to remove these excess fines created by milling and crushing the RAP as it is processed.

Hot mix asphalt must meet specified mix design criteria. It must comply with specifications on gradation (particularly no excess −200 mesh fines) as well as the following items:

asphalt cement content (%);

asphalt cement properties;

temperature of mix moisture content typically $<0.2\%$; and moisture content under specified limit, often $<0.2\%$.

In order for a plant to be permitted to operate, the exhaust must meet environmental and air quality regulations including: opacity of exhaust stack output with respect to hydrocarbons, CO, $NO_x$, polyaromatic hydrocarbons, and in some areas noise.

In addition, hot mix asphalt (HMA) must be produced in sufficient quantity per hour to match paving operation. HMA production costs must also be competitive, so total fixed and variable costs must, therefore, be competitive.

In almost all states and cities, the percentage of RAP in a material for asphalt paving is specified to be under some limit based on the inability of prior art machinery to recycle asphalt without damage to the RAP, resulting in air pollution and material performance degradation. This is due to the fact that prior art technology has not been able to produce an acceptable mix with a high percentage of RAP while complying with mix design and emission standards. One of these factors is the presence of excess −200 mesh particles in the RAP. The most frequently cited reasons for these state restrictive specifications are asphalt cement damage from conventional recycle methods, lack of gradation control and air pollution.

Applicant provides for control of a RAP recycling process which utilizes a plurality of sensors and computer driven programs which are used to make decisions and adjust parameters of the operating system in order to achieve the desired results. Applicant provides programs for control of production rate, for control of emissions, for the control of RAP outlet temperature, and for control of the gradation of the mix.

The control parameters for this invention include tons per hours, temperature at the drum inlet, quantity of gas passing through the drum, the drum speed, drum RPM, drum slope, hydrocarbon emissions, aggregate added, temperature of the RAP, drum RPM, and tons per hour. FIG. 7E shows the location of the various parameters.

SUMMARY OF THE INVENTION

It is an object of the present invention to provide an apparatus for the manufacture of hot mix asphalt (HMA) using either virgin material, recycled asphaltic pavement (RAP) or a combination of both, all of which are referred to as hot mix asphalt (HMA), comprising either a parallel flow or counter flow rotary drum heater for heating the HMA, the drum heater comprising a flame producing combustion burner means located with respect to the rotary drum so that the flame does not extend into the rotary drum heater, a drum having HMA flowing through the drum, a HMA output, a HMA input, a combustion gas and vapor output located at the opposite end of the drum as the HMAoutput, and a means to transfer HMA to the rotary drum heater HMA input.

It is another object of the present invention to provide a low $NO_x$ dryer drum for heating hot mix asphalt (HMA) materials comprising in combination, a counter flow rotating drum dryer having a HMA input and output and having a gas input and exhaust; a low $NO_x$ burner means for producing a flame; a combustion gas supply means for supplying a quantity of air to the burner means which produces complete combustion at a temperature which is below that which produces $NO_x$ in the combustion flame; wherein the burner is located at a position with respect to the drum dryer which prevents the flame from entering the drum; and means for supplying the combustion gases to the dryer drum gas input. This can be accomplished by including a hot gas supply pipe which connects the remote burner to the drum.

In one embodiment of the present invention, the apparatus further comprises a means to limit input gas temperatures to less than that which causes smoking and means to eliminate infra red radiation heating produced by an open flame.

In another embodiment the apparatus has an input gas temperature of approximately 1,100° F.

In yet another embodiment the apparatus further comprises an extended duct which is at least 5 feet long for containing the combustion gases.

In yet another embodiment the apparatus has a duct having a bend which is between the burner and the drum.

In a further embodiment the apparatus has a duct having baffles between the burner and the drum which prevent excessively hot gas from reaching the drum.

In still another embodiment of the apparatus the temperature of low $NO_x$ combustion gases entering the drum is 1,100°±100° F.

In still yet another embodiment of the apparatus the maximum temperature of the HMA at any point in the drum dryer does not exceed 350° F.

In one embodiment of the apparatus the maximum temperature in the drum dryer does not exceed that which produces smoking of the RAP.

In another embodiment of the apparatus the fuel burner is supplied with a larger quantity of gases than the quantity which is required for the designed combustion by the burner.

In a further embodiment the apparatus burner is supplied with a quantity of ambient air which is sufficient to provide a short burn time of the flame which prevents creation of $NO_x$ during the combustion process.

In a still further embodiment the apparatus burner is supplied with a quantity of ambient air which prevents the temperature of the flame from being sufficiently high to create $NO_x$ during the combustion process.

In yet another embodiment of the apparatus the temperature of the combustion gases entering the drum is at least 1,000° F. Preferably, the temperature of the combustion gases entering the drum is in the range of 900° to 1,300° F. Most preferably, the temperature of the gases entering the dryer drum is about 1,200° F.

In one embodiment of the apparatus the temperature of the gases entering the dryer drum is the firing rate of the burner.

In another embodiment of the apparatus the temperature at the dryer drum RAP output is controlled by adjusting the rate of flow of RAP through the drying drum.

In yet another embodiment of the apparatus the temperature of the RAP at the drum RAP output is controlled by adjusting the firing rate of the burner to the highest rate where there is no smoking of the RAP.

In still another embodiment of the apparatus the burner is a low $NO_x$ burner.

In a further embodiment of the present invention the apparatus has a temperature of the gases in the drum which is measured at a point downstream from the input region and prior to the exit of the RAP from the drum, and the burning rate of the burner is a function of the measured temperature of the gases in the drum.

In yet another embodiment of the apparatus flights in the rotating drum lift the HMA and allow it to fall through the drum and through low $NO_x$ gases flowing in the drum.

In a further embodiment of the apparatus the burner is mounted on the same longitudinal axis as the drum, and the burner incorporates baffles to shield radiant heat from flame. In this embodiment the baffles prevent excessively hot gas regions in the drum.

In a still further embodiment of the apparatus the burner is mounted on the same longitudinal axis as the drum, and the burner incorporates turbulence to shield radiant heat from the flame.

It is an object of the present invention to provide a method for drying and heating hot mix asphalt (HMA), using virgin material, recycled asphaltic pavement (RAP), or a combination of both comprising the steps of conveying the RAP to a counter flow drying drum having flights for raising the RAP towards the top of the drum and allowing it to fall to the bottom of the drum, providing a flow of hot gases to the drying drum from a remote burner having a burning rate which is controlled by the temperature of the gases measured inside of the drum, rotating the drying drum whereby the RAP falls downward through the hot gases as it falls to the bottom of the drum, and removing the RAP from the drum.

It is another object of the present invention to provide an apparatus for the production of hot mix asphalt (HMA) from recycled asphalt pavement (RAP) comprising in combination: a counter flow dryer drum having a RAP input and output; a conveyor means for moving RAP from a hopper storage means to the dryer drum; a low $NO_x$fuel burner means located remotely from the dryer drum for supplying low $NO_x$ combustion gases to the dryer drum; a hot gas duct means connected to the burner means and to the drum for transmitting the low $NO_x$ combustion gases to the drum; and a means for rotating the drum for mixing the RAP, for moving RAP through the drum, and for allowing different surfaces of the RAP to come into contact with the low $NO_x$ gases.

It is a further object of the present invention to provide a method of treating asphalt with a counter flow drum wherein the moisture is removed from the RAP prior to the contact of the RAP with the elevated temperatures of input gases from the burner, whereby the steam cracking of the asphalt is essentially eliminated, the counter flow results in a sequence of drying the RAP with lowest temperature gases just prior to their exit, with the evaporated moisture in the exhaust stream, the rapid cooling of the gas in the evaporative drying zone also producing conditions that precipitate many contaminants which would remain gaseous in hotter gas streams, because of the elimination of steam-cracking-produced pollutants, the air which contacts the RAP just prior to exit, results in the higher rate of heat transfer with greater temperature differentials, thus increasing the production rate of heated material for a given size of drum, air flow, and energy input, as compared to a parallel flow design.

It is a still further object of the present invention to provide a process of drying and heating recycled asphaltic pavement (RAP) optionally with virgin asphalt mix to form a hot mix, with low hydrocarbon emissions into the atmosphere, the steps comprising passing the hot mix through a rotating drying drum having flights for raising the hot mix toward the top of the drum and allowing it to fall to the bottom of the drum, passing hot gases through the drum in a direction opposite to the hot mix, thereby producing a counter flow of RAP and hot gases in the drum, the hot gases entering the drum at a temperature of from about 400° to 2,000° F. and having temperature spikes in the hot gas no greater than about ±100° F. from the mean temperature of the hot gas, and the hot gas exiting the drum at a temperature of from about 130° to 220° F.

In one embodiment of the present invention in the process above, the velocity of the hot gases in the drum is sufficient to entrain and carry excess −200 mesh fines from the RAP and out of the drum with exiting hot gases. This can be accomplished where the hot gases entering the drum are generated in a burner which uses from about 25 to 300% of excess air.

In one embodiment of the process the existing gases are sufficiently cooled such that excess −200 mesh fines and RAP remains sufficiently cool to prevent adhesion of the excess fines to hot RAP.

In another embodiment of the process the temperature profile in the drum corresponds to the temperature profile in FIG. 4.

In yet another embodiment of the process the hot gases enter the drum at a temperature of from about 800° to 1,600° F. and vary in temperature no more than about ±50° F. from the mean temperature of the hot gases. Preferably, the hot gases from the burner are thoroughly mixed to remove temperature variations greater than about ±20° F., before the hot gases are passed into the drum. This can be accomplished by mixing the gases when passing the gases through a fan. This can also be accomplished by passing the gases through a series of baffles. This can also be accomplished by passing the gases through a diffuser.

In one embodiment of the invention the process has hot gases entering the drum which are generated in a burner which uses from about 30 to 200% excess air. Preferably, the hot gases entering the drum are generated in a burner which uses from about 50 to 100% excess air.

In another embodiment of the process the temperature of the RAP remains sufficiently low in the drum to prevent adhesion thereto of excess −200 mesh fines.

In yet another embodiment of the process the gases enter the drum at a temperature of from about 1,000° to 1,300° F. and vary in temperature no more than about ±20° F. from the mean temperature of the hot gases. Preferably, the hot gases enter the drum at an average temperature of about 1,200° F. and vary in temperature from about 1,180° to 1,220° F. Most preferably, the hot gases entering the drum have temperature spikes not exceeding about 1,320° F.

In a further embodiment of the process the hot gases exit the drum at a temperature of from about 140° to 200° F. Preferably the hot gases exit the drum at a temperature of from about 150° to 180° F.

In a still further embodiment of the process the material exiting the drum is subjected to sufficient microwave energy to reorient dipolar molecules in the material.

In a yet still further embodiment of the process the hot gases exiting the drum are passed to a bag house filter to remove any particulate material from the gases, the bag house having one or more woven acrylic bags therein.

In a further embodiment of the process the RAP is passed through a cylindrical drum having at its entrance an angle section with a length from about 0.3 to 1.5 times the diameter of the drum.

BRIEF DESCRIPTION OF THE DRAWINGS

FIG. 9A shows theoretical calculations of gas and RAP temperature in a drum where the flow is parallel as used by applicant.

FIG. 9B shows applicant's cool flow or counterflow design where gas enters the drum from the right and RAP enters the drum from the left.

FIG. 12E is shows the grid shape of an actual elicpse burner.

FIG. 12F is a side view of the openings 108 in FIG. 12E.

FIG. 12G shows a view of the flame emission area, reference numberal 112.

DESCRIPTION OF THE PREFERRED EMBODIMENT

Figure 5:
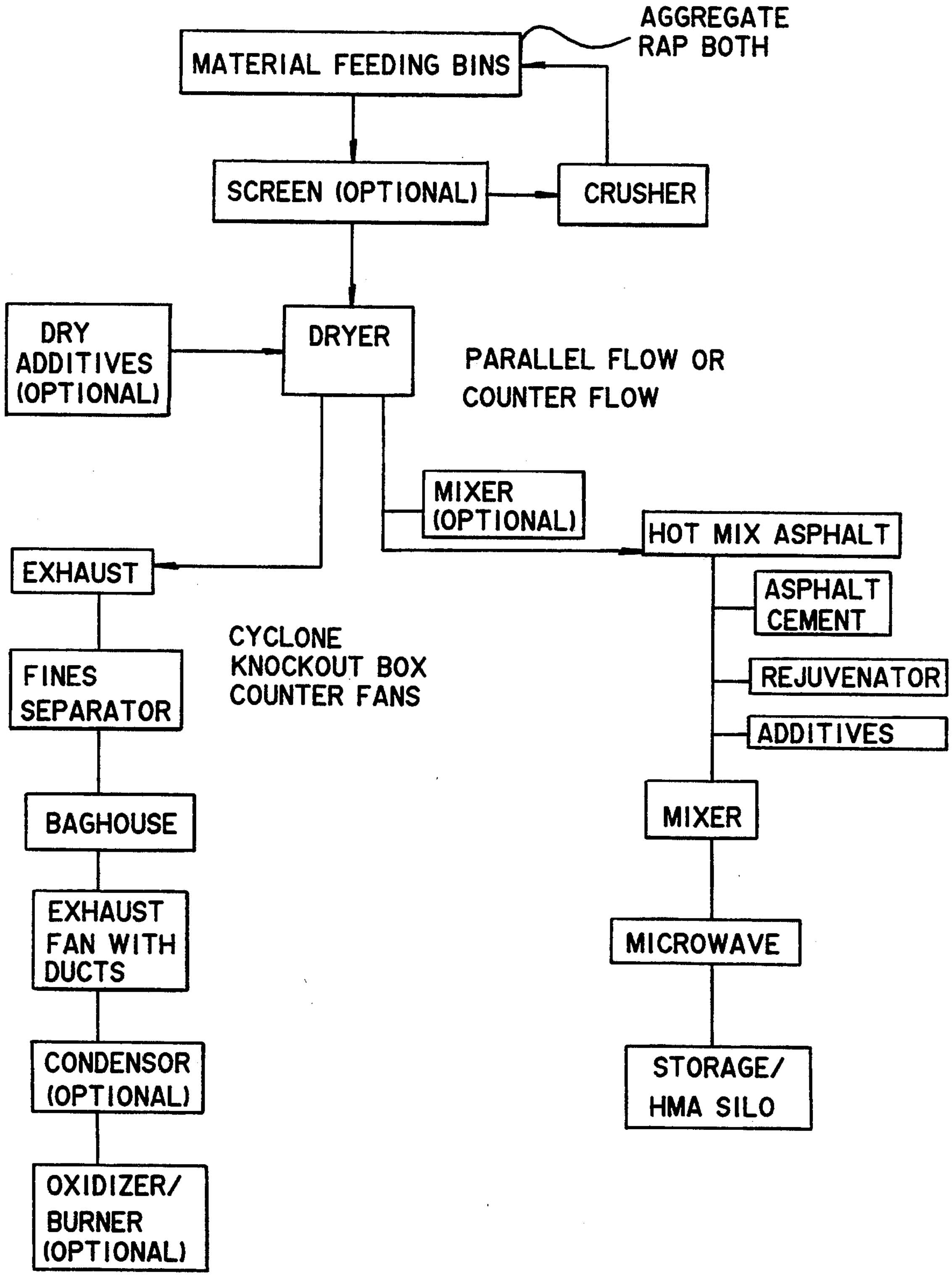
FIG. 5 shows the system configuration for hot mix asphalt using virgin material, recycled asphalt pavement (RAP) or a mix.

The system is comprised of various units creating a process for providing hot mix asphalt (see FIG. 5). The first unit is the material feeding bin. In this bin one can hold aggregates, RAP or both. Under the material feeding bin is a conveyor belt. The conveyor belt carries the material pouring out of the material feed bins to the system. An optional feature is a screen and crusher. The screen will remove large chunks which in turn are fed to a crusher and returned to the material feed bins. The material feed bins can be separated in terms of size and/or composition. When the contractor determines what material is needed for pavement the composition of the material bins can be varied accordingly. For example, if a pavement requires a very durable material then a larger percentage of fine aggregate is used, whereas when pavement of lower quality and shorter durability is needed, larger aggregates may be used. The hot mix asphalt composition is predetermined by the percentage of aggregate which is distributed by the material bins.

The material bins can hold various sizes of aggregate and the duct at the bottom of the material bin is a variable opening and thus the percentage of aggregate size is set according to the opening of the duct at the bottom of the material bin and by a variable speed feed belt beneath the bin. It is also possible at this point to adjust the percentage of RAP. For example, some states will tolerate no more than 50% RAP in the hot mix asphalt, in which case 50% of the material bins will be filled with RAP. The other 50% of the hot mix asphalt will be made using the appropriately sized aggregate. This material is carried down the conveyor belts optionally passed through a screen and crusher and carried to a dryer.

In the present invention the dryer is either a parallel flow or counter flow dryer, preferably a counter flow dryer. In a parallel flow dryer the aggregate enters the same side of the dryer as the combustion gases from a burner. In a counter flow dryer the aggregate enters the dryer at the opposite side from the burner.

The aggregate is heated in the drum dryer in order to remove moisture from the aggregate. In order to remove moisture from the aggregate and heat the aggregate after the aggregate exits the drum dryer, the aggregate is further treated according to the need to be met by its appropriate application.

Figure 14:
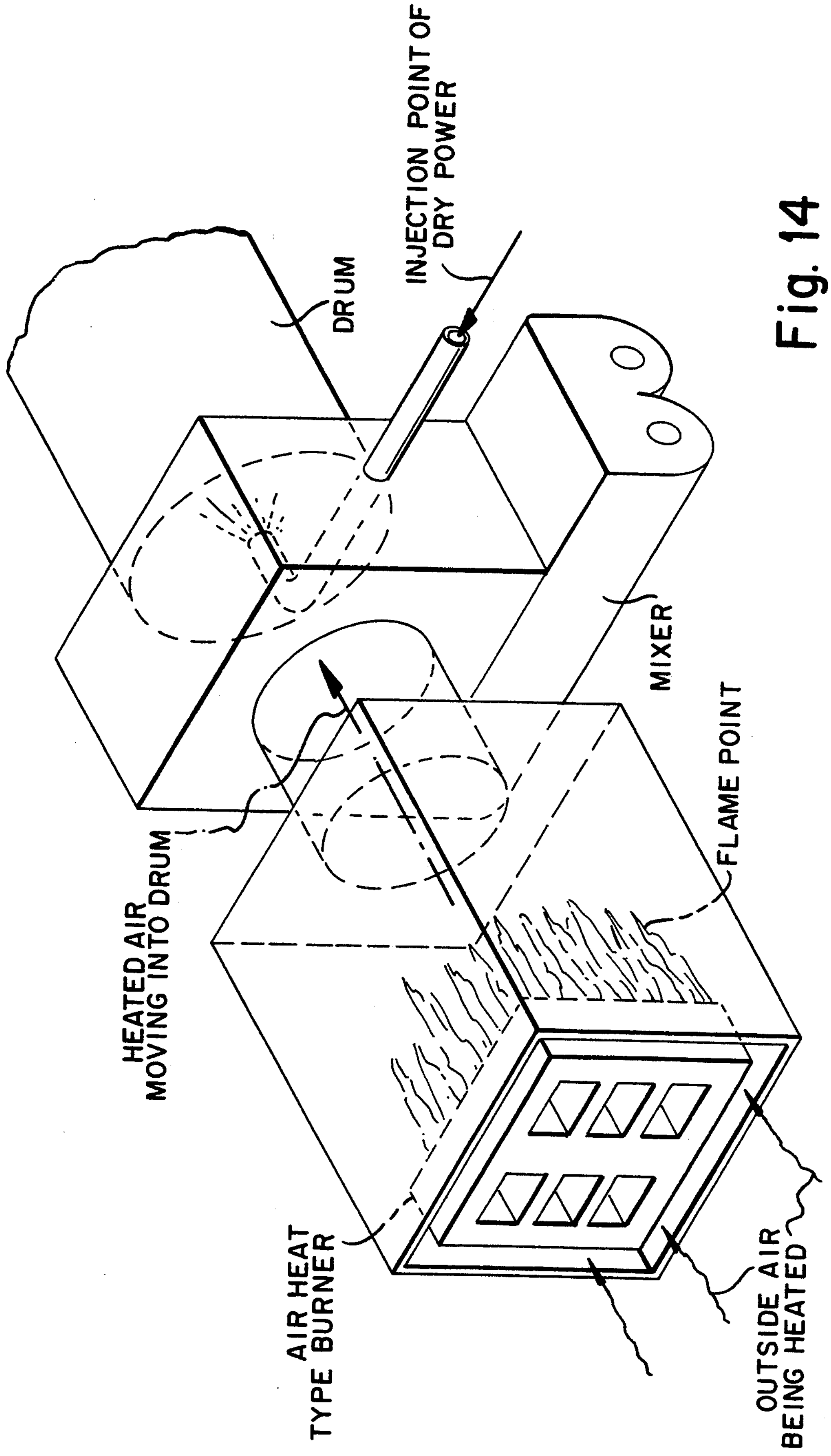
FIG. 14 shows the injection point of dry powder into the drum dryer.

In the drum dryer is a device for injecting dry additives such as hydrated lime, portland cement, or other dry mix material, into the incoming air stream into the drum (FIG. 14). By injecting the material here, even distribution can be easily achieved. Partial or all energy to inject may be supplied by the negative pressure in the drum at this point. The dry particles are blown into a veil of hot mix particles where they are captured and blended into the mix ahead of when the asphalt or rejuvenating oil is added.

In FIG. 14, there is shown a tube which is inserted into the side of the interface between the drum, burner and the mixer. The tube is bent at approximately 90° in order to insert dry powder into the drum.

For example, if the aggregate is not 100% RAP then asphalt cement (AC) must be added. If the aggregate contains RAP and the RAP has been aged then rejuvenator must be added. If the composition requires other additives such as lime etc. then the additives are added at this point. Optionally, dry additives can be added in the dryer drum. The hot mix asphalt RAP and additives at this point enter a mixer (pugmill mixer). They are then carried up to a storage bin. Optionally between the mixer and the storage bin is a microwave. The microwave strengthens the hot mix asphalt.

The by-product of the dryer is exhaust. The exhaust must be treated to remove pollutants. The exhaust is comprised of hot air, moisture, dust, hydrocarbons, carbon dioxide, carbon monoxide and nitrous oxides. In the present invention, the exhaust contains fines coated with moisture and hydrocarbons. The exhaust also contains a minimum amount of hydrocarbons, nitrous oxides, carbon oxides and other possible pollutants. The exhaust is treated to remove the fines and other possible pollutants.

The exhaust treatment components are comprised of a fine separator such as a cyclone, knock-out box or counter fans. The next component is a bag house to which is connected an exhaust fan with controllable ducts after which is optionally located a condenser and further optionally is connected an oxidizer/burner.

The fines separator can be one of three units. First, a standard cyclone, a knockout box, or a counter fan. The counter fan of the present invention will be described later. The bag house is a standard bag house. The oxidizer is typically unnecessary but an optional, extra component for removing any trace of hydrocarbons that may have passed through the fine separator and the bag house. The condenser is an optional unit added to remove moisture. Although moisture is not an environmental pollutant it does create steam and can cause anxiety for the casual observer. It may be politically expedient to add a condenser for the purpose of removing steam and thus reassuring the casual observer.

A further component of the present invention comprises generators and control systems. All of these systems are preferably configured to fit on both units. Therefore, the system can be easily transported from site to site.

When using 100% RAP, the system is at its greatest mobility. In this situation there is no need for large piles of aggregate. The RAP can be removed from the highway that is to be repaved, carried to the system and processed. As the pavement progresses down the highway, the system can be moved to minimize delays due to transporting the hot mix asphalt to the pavement site.

Figure 6:
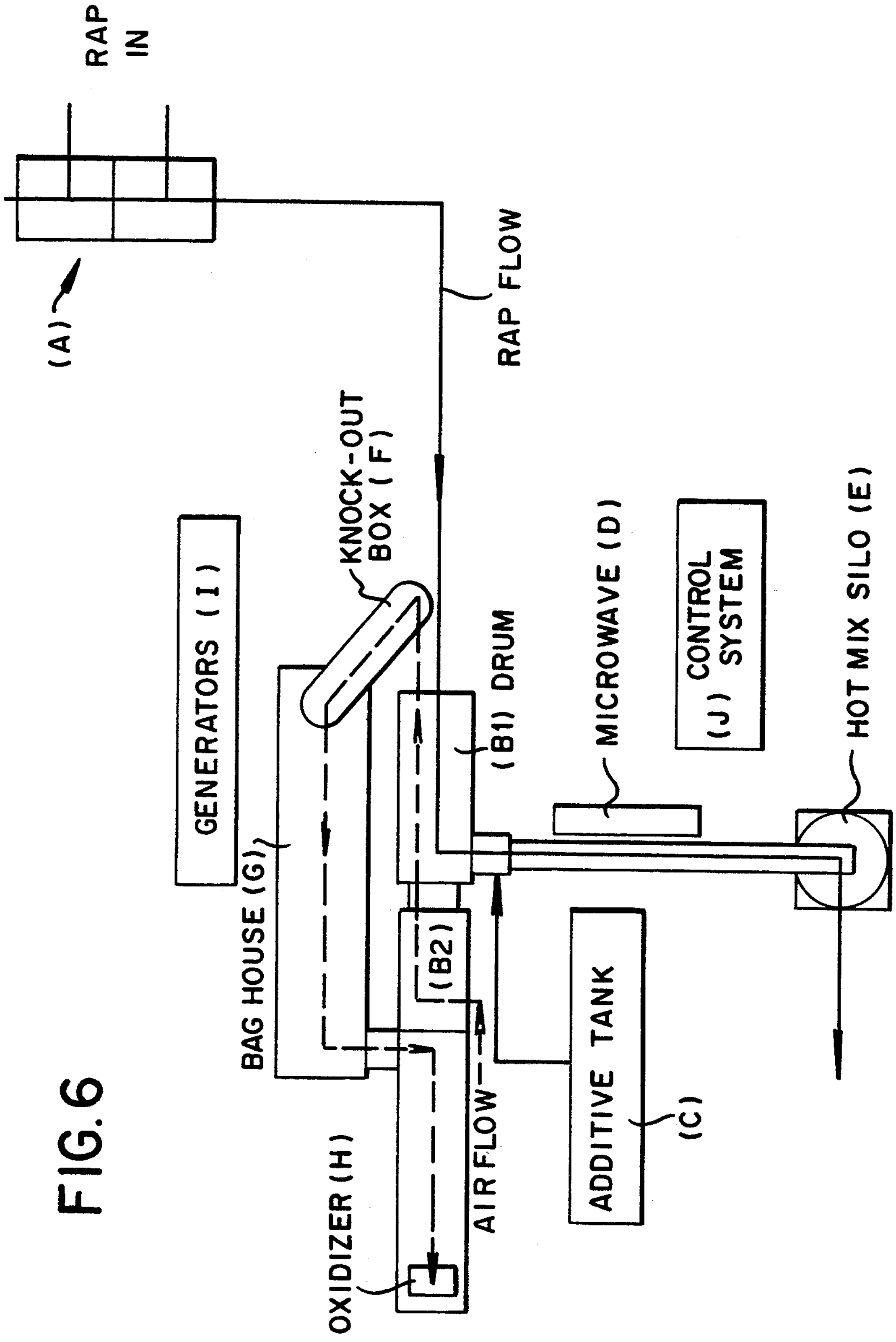
FIG. 6 shows the system configuration of a preferred embodiment.

In one embodiment of the present invention (see FIG. 6), the system configuration is comprised of material feed bins (A), a drum dryer (B1 and B2), an additive tank (C), a microwave (D), a hot mix silo (E), a knock-out box (F), a bag house (G), an oxidizer (H), generators (I) and a control system (J). In this configuration the RAP and/or aggregate flows from the material feed bins (A) to the drum (B1) where it is heated by the exhaust from the burner (B2). In this configuration is a counter flow system, from there the heated material leaves the drum dryer and is carried past a microwave (D) to a storage system/hot mix silo (E). Additive is delivered from the additive tank (C) in the hot mix silo where it is mixed in a mixing system or optionally sprayed on the hot mix asphalt as it leaves the drum either before or after the microwave, enters a mixer where it is mixed and then enters the hot mix silo. The flow of air through this system starts at the burner (B2), enters the drum dryer (B1), exits the drum dryer into the knock-out box (F) where the fines covered with moisture and hydrocarbon drop from the exhaust fumes, and are collected. The exhaust absent fines passes to a bag house where very fine particles are filtered from the air. The exhaust then enters an oxidizer where any residual hydrocarbons are oxidized.

The microwave is a optional feature and may be deleted from the above cited system configuration. However, the microwave does strengthen the hot mix asphalt and in situations where extra durability is desirable the microwave system is a useful feature. In this system it is also possible to insert additional asphalt cement and rejuvenator again depending upon the desired strength of the hot mix asphalt.

A substitute for the knock-out box are cyclone separators or counter fans. In addition to the oxidizer, one may optionally add a condenser to remove steam from the exhaust air. The above system works equally well with a 100% RAP, a 100% aggregate or a mix.

An optional feature includes the use of a conveyor belt that introduces aggregate and/or RAP into the dryer drum by projecting it in a distance of 3–4 feet.

The present invention is comprised of a self-cleaning drum dryer which is particularly useful when using RAP. The self-cleaning aspect of the drum dryer is due to two features. The first feature is the absence of corners. In prior art drums, flights were designed to lift the aggregate and also designed to buffer the drum walls from pounding of dropping aggregate. Thus, the flights were designed to lift and drop the aggregate as gently as possible. Thus, the flights operated as a buffering system dampening the effect of the falling asphalt. To accomplish this, the flights were attached directly to the drum wall, forming corners where asphalt cement collects. In the present invention the flights are designed to stand away from the drum wall. They lift, spread, and mix the aggregate while forming a complete veil to maximize moisture removal from the aggregate down the length of the drum. This is accomplished without forming corners. The second feature is that the gaps also allow the aggregate to slide on the drum wall as the drum rotates. The sliding aggregate cleans the drum wall and buffers the drum wall from falling aggregate.

A preferred embodiment of the present process and apparatus for manufacturing asphaltic pavement material including up to 100% reclaimed asphalt pavement (RAP) uses a counter flow rotating drum through which hot gases are passed in a direction opposite to the flow of asphaltic pavement material, including RAP. The hot gases enter the drum at a temperature of approximately 1200° F. and exit the drum at a temperature of about 130° to 170° F. The exiting gases then flow to a bag house where particulate material is removed from the gas stream. The asphaltic material discharging from the drum is optionally subjected to microwave radiation sufficient to at least reorient the dipolar molecules in the asphaltic material and aggregate.

In this counter flow invention, the hot gases from the burner are passed through a duct which permits some cooling of the gases and reduction of infra red radiation. This provides a drum input gas temperature which is preferably from about 400° to 2,000° F., more preferably from about 800° to 1600° F., most preferably from about 1,100° to 1,300° F. The control of the input temperature is accomplished by measuring the temperature of the exhaust gases and material output, and adjusting for pollution effects such as smoking or RAP degradation by varying cold material feed rate and/or drum inclination. In a preferred embodiment, excess ambient air is mixed with the combustion gases for the purpose of lowering the temperature of the drum input gases. Although the amount of excess air varies with the type, amount of RAP being processed, and moisture in the RAP, the amount of excess air used is preferably from about 25% to 300%, more preferably from about 30% to 200%, most preferably from about 50% to 100%.

If the gases are passed through a conduit directly in line with the drum axis, fans or baffles can be used to smooth out the temperature gradients, laminations or spikes in the incoming air, thereby shielding the drum and its contents from infra red radiation and excessively hot laminates. In one embodiment, the burner is spaced from the drum entrance and the combustion gases may undergo one or more turns, (optionally using baffles and fans) to minimize temperature variations in the combustion gases entering the drum.

It was discovered that in a conventional RAP processing plant, the combustion gases varied in from one point to another in temperature from about 200° to 2,800° F. The excessively high temperature spike of combustion gases were found to be responsible for chemical reactions known as coking, baking, and caking. They caused smoking of the RAP, as well as steam stripping and degradation of the asphalt (reduction in the strength or flexibility of the asphalt). In the present invention the mass average temperature of the incoming combustion gases is reduced, eliminating temperature spikes in these gases and the result was found to be minimized smoking, coking, and degradation of the asphalt.

In a preferred embodiment, a modified low NOx burner which produces a wall of short flames is spaced from the drum entrance, and the combustion gases cooled before entering the drum. In a another embodiment, the combustion gases from the burner are mixed so that the temperature of the laminations in the combustion gases vary about ±100° F., more preferably ±50° F., most preferably about ±20° F. For example, combustion gases entering the drum and having an average temperature of about 1,200° F. would vary in temperature from about 1,180° to 1,220° F. It is preferred that the highest temperature lamination in combustion gases entering the drum not exceed about 1,320° F., more preferably about 1,220° F. Preferably the combustion gas used in the process of the present invention have temperature laminations which vary no more that ±20° F. from the mean temperature of the mass of air flow. The temperature spikes are minimized according to the present invention by mixing the combustion gases from the burner before they enter the drum. Preferred means for mixing of the combustion gases is a specialized burner. Alternatively, the mixing means can comprise any combination of mixing vanes, baffles, fans and diffusers.

Contrary to conventional industry perceptions, it has been unexpectedly found that the process of the present invention uses about the same amount of fuel (such as natural gas) per ton of mix as a counter flow drum operated with a hot gas input of about 2,400° F. with a 270° F. exhaust according to the present invention. The amount of excess air flow can be significantly increased without unacceptable energy loss and expense as in the preferred embodiments. In the present invention, the draft fan and filter bag house should be increased in capacity. Also, the drum diameter is preferably increased to maintain the velocity of the gases in the drum in the desired range.

According to the present invention, the process described herein can be used to process RAP, virgin material, or any combination thereto. The cost of processing remains competitive as the fuel rate per ton is essentially equal.

The rate of material travels through the drum, or dwell time, is controlled by the angular velocity and the angle of the drum. A steeper drum angle with respect to the horizontal, provides a faster through flow at a given rotational rate. In the present invention, the drum longitudinal angle can be determined by measurements of the flow rate of the exiting air temperature, the temperature of the exit RAP, and/or desired RAP dwell time in the drum.

In one embodiment of the present invention, a variable speed drive is used to increase or decrease the motor RPM of the drum drive motor (or motors). An advantage of using the variable speed drive can be a soft start for large motors.

Figure 3:
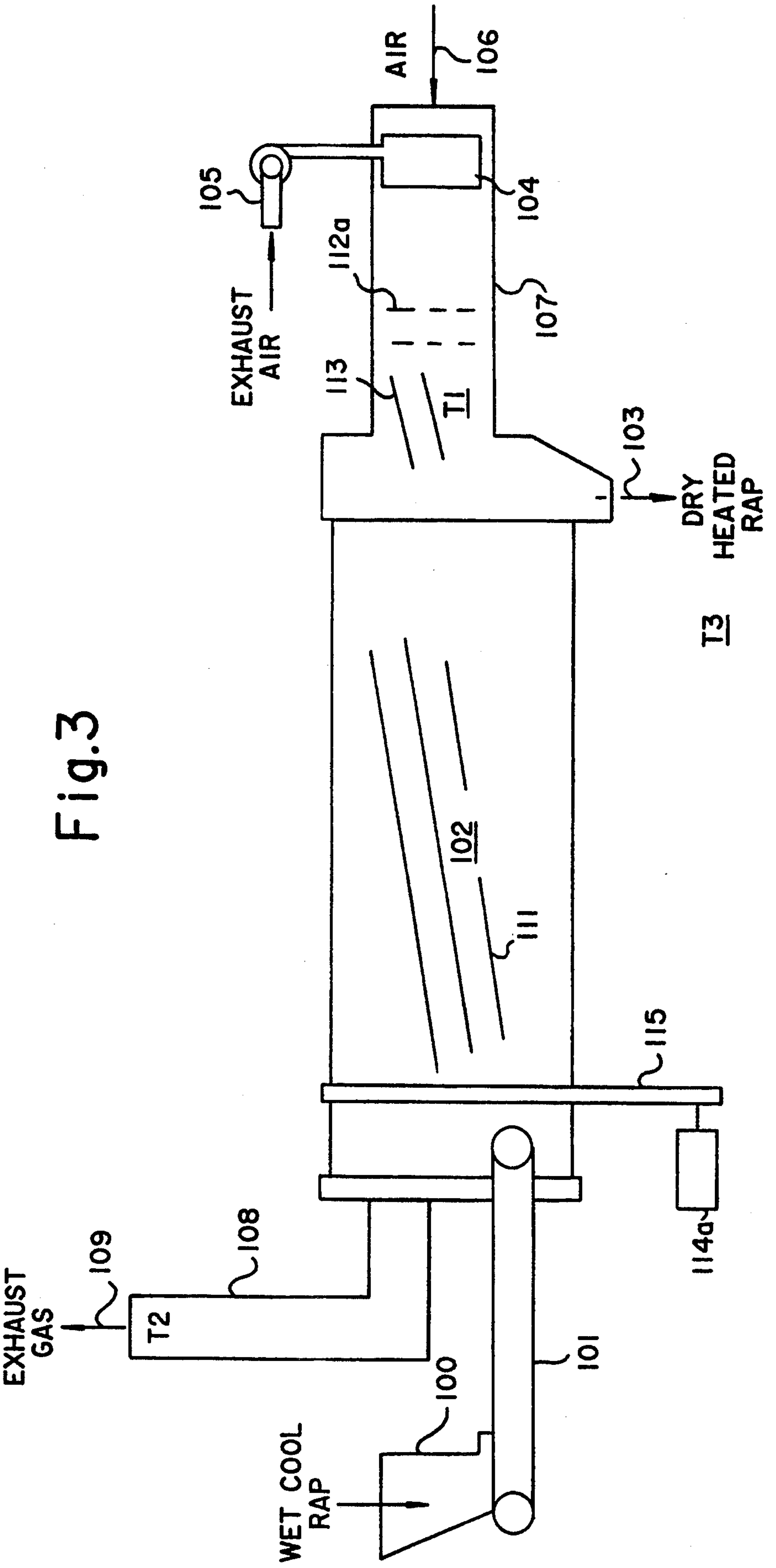
FIG. 3 shows a plan view of a counter flow RAP drum with input combustion chamber and output connections.

In another embodiment of the present invention, a horizontal array of thermocouples are arranged across the air outlet box from the drum. See FIG. 3 showing the thermocouples 108A across the inlet portion of exhaust outlet 108. If an incomplete veil is formed, hot air will pass more directly through the space in the veil and cause a corresponding temperature rise, not detected on all the thermocouples. The thermocouple array allows dwell time in the drum to be another controllable variable used to control the temperature of the material output.

Control of the temperature of the material output may be established as a function of any or all of the above parameters when the functions are controlled by a computer which can determine the drum angle which is required for a specific desired state of condition. The computer can be programmed by empirically generating curves which are a function of the particular RAP drum which is used.

In this invention, it is also an object to provide a microwave treatment system which is downstream from the dryer drum for the purpose of producing an enhanced asphaltic compound. It is generally accepted that microwave treatment will improve the performance characteristics of asphaltic binders or asphalt cement (AC).

It is also an object of this invention to provide a drum dryer in series with a second drum heating virgin aggregate and both feeding continuous mixing or batch means such as a pug mill.

It is a further object of this invention to provide a cool flow drum (counter flow or parallel flow) where the exhaust gases are directed through the burner of another drum. The second drum burner acts as an incinerator of hydrocarbons which are in the exhaust gases which are applied to it. The second drum is preferably one which receives virgin aggregate as an exhaust coolant, thus super heating the virgin aggregate which is then mixed with the separately heated RAP to form a combined mix.

The cool air flow drum of the present invention allows the incorporation of polymers such as those found in scrap plastics or scrap rubber from tires into the hot mix asphalt. Heating of the polymers in the air flow of the drum is possible because the cooler entrance air temperatures permit heating without caking or other degradation of the polymers. Excess heating of the larger polymers makes them susceptible to mechanical breakdown into shorter polymer chains in the high shear post drum mixer. The present invention permits the use of mixed plastic scraps from waste which would otherwise not be usable as hot mix asphalt enhancer or additive.

The cool air flow drum having cool flow capability (around 1,100° F.) can act as an evaporator unit to remove hydrocarbon and other contaminants from recycled asphalt and soil without combusting them. This is particularly important when chlorinated hydrocarbons, PCB's, dioxins, and other toxic wastes are present. The resultant air stream can be oxidized at high temperature in an afterburner and/or hot catalyzer. The resultant contaminated air stream has not been heated to the extent that the contaminants are partially oxidized into more persistent and/or toxic intermediate products. The resultant exhaust air stream is cooler (below 212° F.) than the prior art such that subsequent refrigeration to precipitate entrained contaminants is minimized should refrigeration be chosen rather than an incinerator as a means for removing contaminants.

The cool flow drum may also be used in combination with a centrifugal separator (counter fans) that concentrates the contaminants in the exhaust. Exhaust temperatures above the temperatures (generally 160° F. to 200° F.) at which asphalt coated minerals or asphalt cement particles are sufficiently tacky or sticky to form solid conglomerates makes such separators impractical with prior art systems. The cool exhaust of this invention allows for the use of a greater range of practical separations.

It is another object of this invention to provide flighting in the drum which varies for the purpose of controlling the material veil within the drum. The flighting may allow less exposure at the hot gas input end of the drum than at the center and cold ends. The flighting also minimizes the problems of material buildup in the drum.

In this invention, it is also envisioned that the input temperature may be increased above the preferred 1,200° F. when virgin rock not having any asphaltic compounds is fed into the material input stage of the drum.

The Eclipse (AH) burner is manufactured by Eclipse Corporation, a division of Eclipse Inc., Rockford, Ill. 61103; Phone 815-877-3031). The burner is designed as a low $NO_x$ (nitrous oxide) burner. It has been modified to provide for improved $NO_x$(nitrous oxide) emissions by rapidly dropping the temperature of the combustion gases emanating from the burner. The modification is insertion of baffle plates between burner sections. These burners are nozzle mixing, line type, packaged burners which provide for an efficient means of incinerating fumes and particulate matter. The burners are used with natural gas or propane and are designed for fresh air or recirculating systems. The normal burner flame temperature is approximately 2,200° F., a temperature at which nitrous oxide compounds are formed. In the burner as modified by applicant for this invention, a supply of fresh air, or other preheated air is introduced immediately ahead of the burner so that the air immediately cools the combustion chamber and the flame at the burner to a temperature below which $NO_x$is formed. Additional fresh or preheated air can be introduced after the burner to mix with the hot gases. It is believed that keeping temperatures below 1,600° F. at atmospheric pressure drastically reduces the production of $NO_x$. It is also known that significant $NO_x$ production by automobile gasoline engines occurs at temperatures in excess of 1,800° F. which may be the minimum temperature for significant $NO_x$ formation. In the embodiment disclosed herein, the temperature of the gases in the combustion chamber 12 are below 1,500° F.

Recycled gases can be substituted for fresh air or preheated air. In the present invention these recycled gases may be approximately 50% of the warm gases which exit from the dryer drum when operated in parallel flow. These recycled gases are at approximately 170° to 300° F. as they exit the drum and are recirculated.

This apparatus also decreases the production of carbon monoxide (CO) by passing the combustion gases through an elongated combustion chamber and a connector pipe before the gases reach the drum dryer. In this apparatus, the carbon monoxide which may be generated by the burner has sufficient time to combine with other gases or oxygen in the combustion region of the burner exhaust. The conversion of CO takes place in the combustion chamber and the hot gas feed pipe to the drum dryer. The gases upon entering the drum have had most of the CO converted to $CO_2$ by combination with other gases, and the $NO_x$ has never been formed. In this invention, the gases reaching the dryer drum are clean gases because they contain minimum amounts of undesirable $NO_x$ and CO.

Smoking of the RAP is eliminated due to the limitation of the maximum temperature of the combustion gases at the input of the drying drum and the absence of heat spikes. Gases at 1,200° F. rapidly cool when they strike the RAP (which has a moisture content of approximately 2% to 5%) in both the parallel and counter flow embodiments. The moisture is converted to steam which absorbs a substantial amount of heat, thus lowering the temperature of the gases in the drum input region. The generation of steam, however, can lead to steam cracking of the large molecules which creates an oily exhaust vapor.

If it is desired to change the temperature of the HMA or RAP at the exit of the microwave heating unit, it may be changed by changing the speed of the conveyor, thus moving the HMA or RAP through the microwave field at faster or slower speeds thereby producing a change in output temperature. As the aggregate is moved more quickly past the microwave unit, the heating will be less due to the reduced time that the aggregate is exposed to the microwaves.

The RAP treatment process of this invention results in the production of high grade asphalt from waste material with very low or no pollution of the air. This is a critical consideration in urban areas such as Los Angeles where there are strict air pollution regulations. The remote burner drum dryer combined with the microwave heater gives this invention a unique capability of producing a hot mix asphalt using either virgin aggregate or recycled asphalt pavement with a minimum of measurable air pollution. All air and combustion products which enter the recirculating system are eventually exhausted to the atmosphere. The input for fresh air for the burner is taken partially from the chamber formed by the microwave tunnel and antennas. This recycling prevents any polluting emissions from the microwave tunnel from being emitted because all vapors and particles can be vented to the burner for combustion and recirculation in the drum dryer system.

The use of a microwave heating unit as the final heating step permits the temperature of the RAP to be raised a final increment such as from 280° to 300° F. without causing smoking. Microwave may also be used to increase the strength of the asphalt product. The microwave heats the RAP by heating the rock from the inside and it does not apply excessive heat to the bituminous binder coating the rock. When using microwaves, the asphalt binder is heated by the heat from the microwave heated rock. If conventional radiation and conduction from fossil fuels is used, the RAP surface can be overheated because a large temperature difference is required to transfer the heat to the RAP. The creation of oily exhaust is compounded in the presence of steam in the hot zone of conventional parallel flow heaters.

Microwave is an expensive process and is impractical where it is necessary to raise the temperature completely from ambient to the final temperature. Capital costs would increase by a factor of five if only microwave heat were used, making the process prohibitively expensive. In one embodiment of the present invention, the problem is solved by using a pollution free drum dryer to raise the initial temperature to approximately 250° F., and then using the microwave heater in the temperature range where smoking and burning would have been produced by conventional fossil fueled burners. Smoking and burning would have been produced by fossil fuel burners because they rely upon heating the asphalt using radiation and conventional heat transfer from the outside in, thus heating the binder before heating the rock.

The foregoing and other objects, features and advantages of the present invention will become more apparent in the light of the following detailed description of the preferred embodiments thereof, as illustrated in the accompanying drawing(s).

DETAILED DESCRIPTION

Burner

Figure 12A:
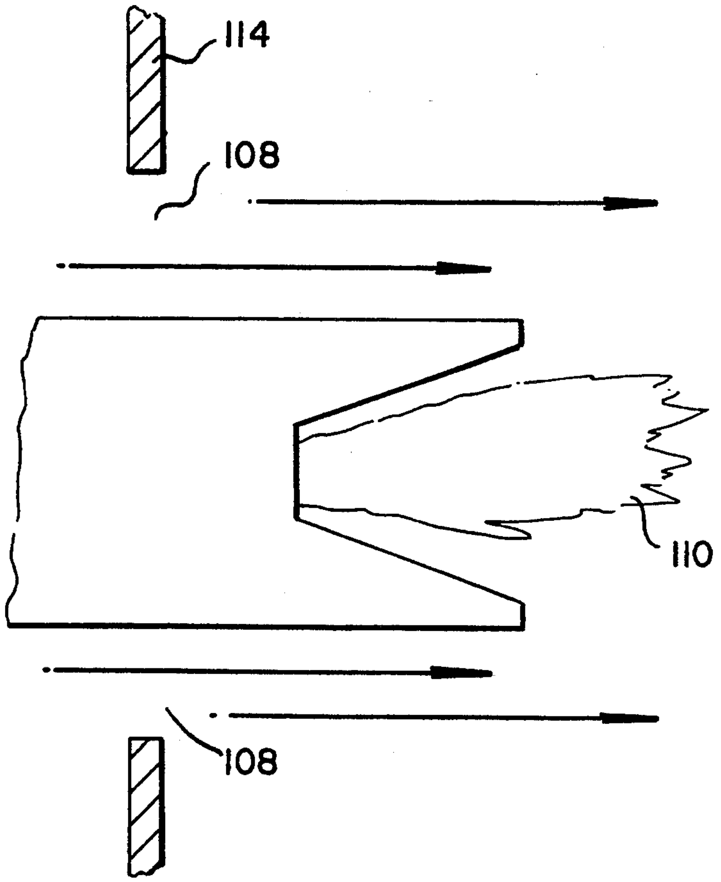
FIG. 12A shows a cross section of a burner and nozzle with airflow around it.

In this invention, applicant provides a unique burner design which achieves even heat distribution across the hot gas flow path. Applicant has found that conventional burners often produce spikes of temperature which are significantly greater than the average temperature of the air. These spikes have been found to produce charring and degradation of RAP when the spikes are admitted to the drum and strike the veil of RAP. FIG. 12H shows a perspective view of a basic eclipse burner for air heating (AH).

Figure 12B:
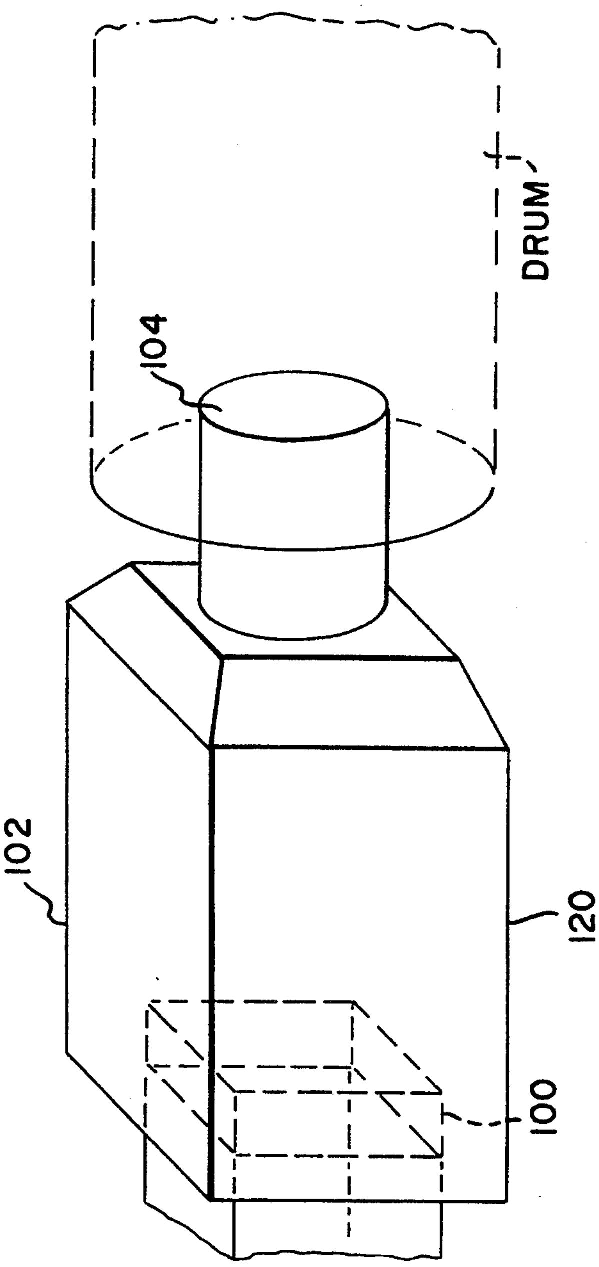
FIG. 12B shows a cross section of the burner and transition connection to the drum.
Figure 12C:
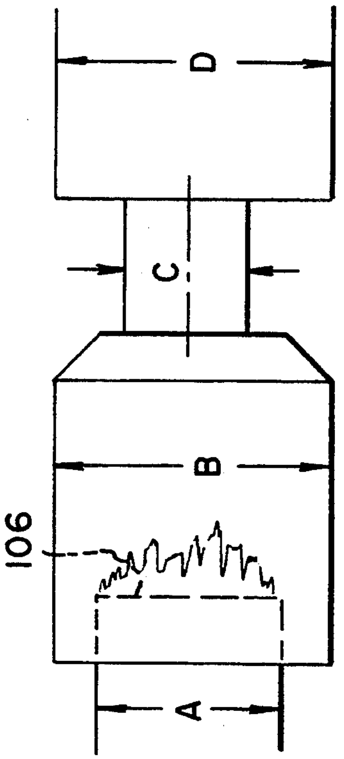
FIG. 12C is a side view of the burner transition and drum shown in FIG. 12B.

As shown in FIG. 12B, applicant shows a burner 100 which provides a flat flame front across the face which contributes to more even heat of the gas as it flows from the burner 100 to the transition 102 and the gas insertion pipe 104. FIG. 12C shows a side view of the burner assembly of FIG. 12B. In FIG. 12C, the flame front is generally indicated as reference 106. In one embodiment, applicant provides the following cross-sectional areas as indicated by A, B, C and D in FIG. 12C. The cross-sectional area A is 50.6 sq. ft., B is 65.9 sq. ft., C is 26.7 sq. ft. and D is 64.8 sq. ft. In the gas insertion pipe 104, the difference between maximum and minimum temperature of the gases should not exceed 100° F.

Applicant has provided a modified eclipse burner which is shown in FIG. 12E. The burner when assembled provides a grid of flame fronts between the broad openings 108. The flame on each flame emission area is generally shown as in FIG. 12F at reference 110. Another view of the flame along the flame emission area is shown as reference 112 in FIG. 12G. The detail of the burner throat is shown in FIG. 12H where the flame 110 is shown exiting between the edges of the burner sides. The burner used in this application is manufactured by the Eclipse Combustion Company of Rockford, Ill. 61103. The burner is referred to as an Eclipse Air Heat Burner (AH) and comes in a variety of sizes and configurations.

Figure 12D:
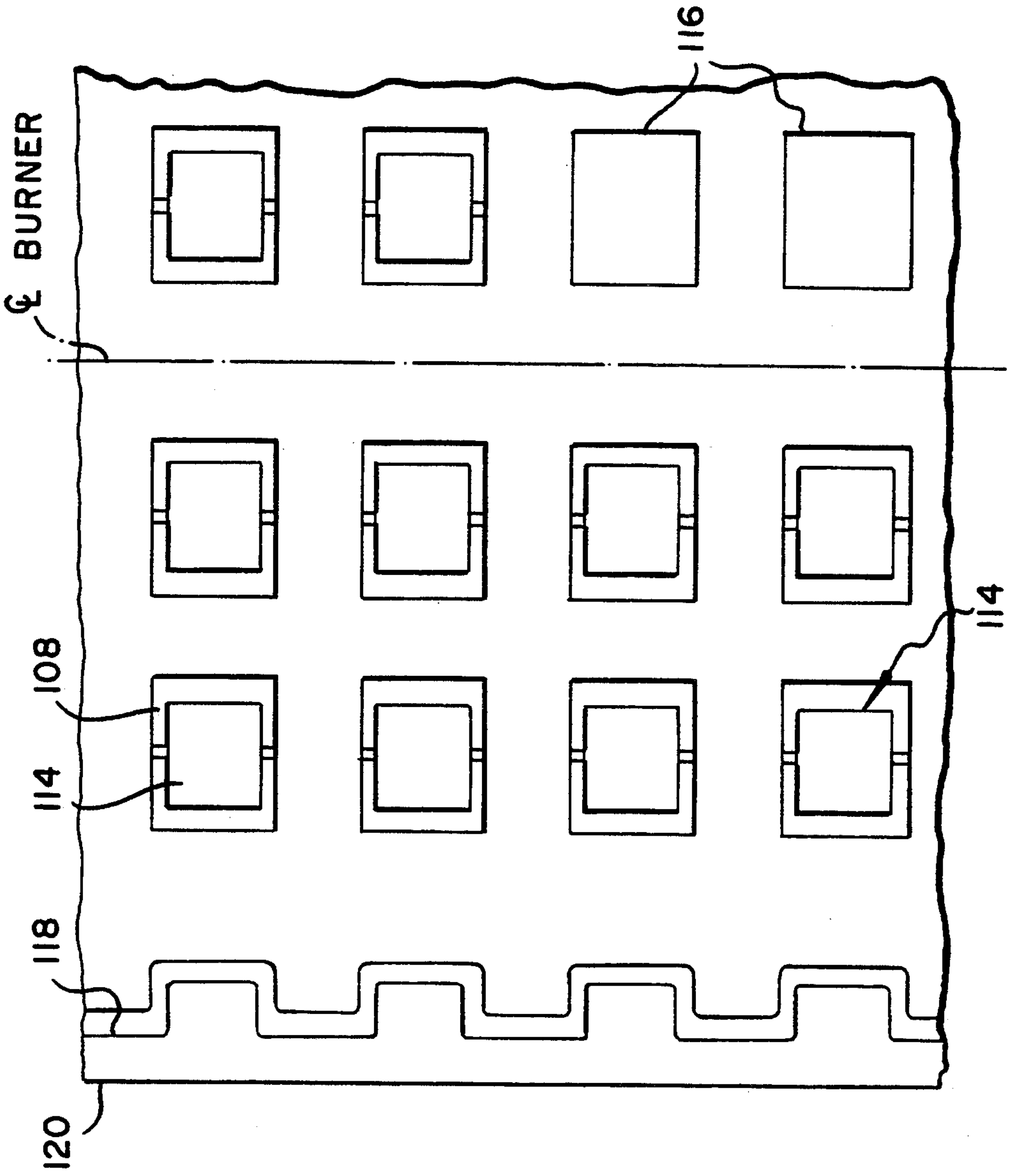
FIG. 12D shows the grid of the eclipse burner with applicants modifications of plates 114.
Figure 12H:
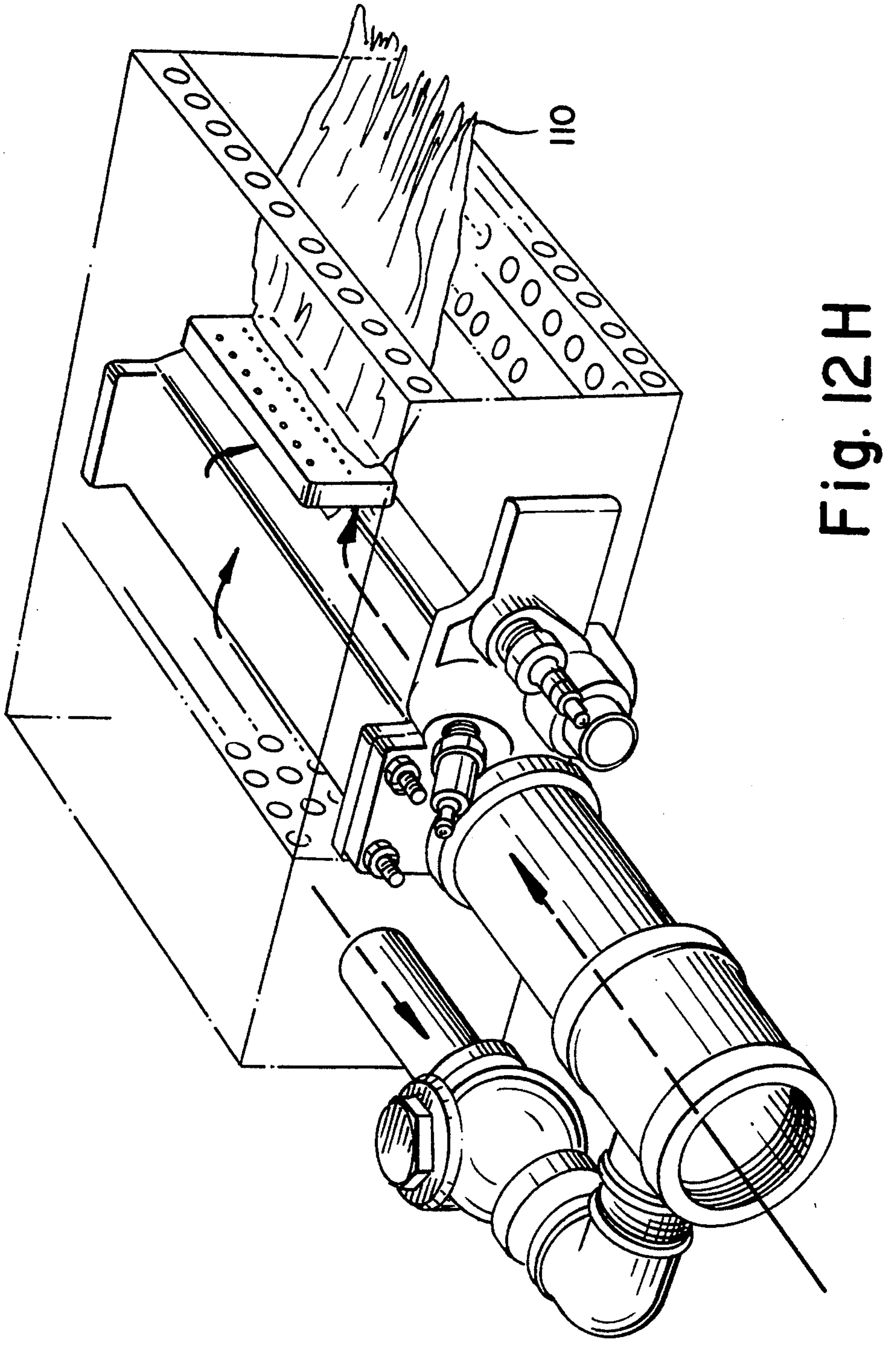
FIG. 12H shows the detailed view of the burner throat.

The Eclipse burner shown in FIGS. 12E, 12F, 12G and 12H, however, has been modified in order to provide improved performance with applicant's apparatus and process for reprocessing asphalt pavement materials. This modification provides shorter burn time and better mixing of hot and cool cases in transition 102. In FIG. 12E the grid shape of the actual burner is shown. In FIG. 12D there are shown applicant's modifications which are the additional plates 114 which fit into the openings 116 between the burner elements. The openings 108 shown in FIGS. 12E and 12F are the same as 116 in FIG. 12D. Applicant's plate 114 is inserted into the otherwise open air passage in order to provide additional air velocity in the region close to the burner outlets. This is believed to provide quicker quenching and better mixing of the fresh air and combustion gases in the transition portion 102 as shown in FIG. 12B. Plates 114 are believed to provide a high velocity fresh air flow next to the burners. This additional high velocity air is used by applicant to decrease the temperature of the gases at the inlet to the drum from the prior art asphalt temperature of 2400° F.–1200° F. as shown in applicant's description of the cool flow counter flow drum of this application.

The space between the plates 114 and the edges of the burner assembly are approximately 1½". In addition to the air flow provided around the plates, applicant also provides additional air flow around the perimeter (top side and bottom) which is indicated at reference 118. This is also a 1½" space which provides air around the entire assembly and on the outside portion of the burner grid as shown in FIG. 12E. The sidewall of the burner transition is generally indicated at reference 120 of FIG. 12D. This is also shown in FIG. 12B.

The effect of applicant's modification plates 114 is depicted in FIG. 12A. Here, the air is shown passing through openings 108 around the burner opening and flame 110. This provides quick quenching of the flame 110, increased mixing of the additional air with the flame 110 and temperature in the inlet drum which are essentially devoid of temperature spikes which can degrade the RAP by charring or burning.

Parallel Flow

Figure 1:
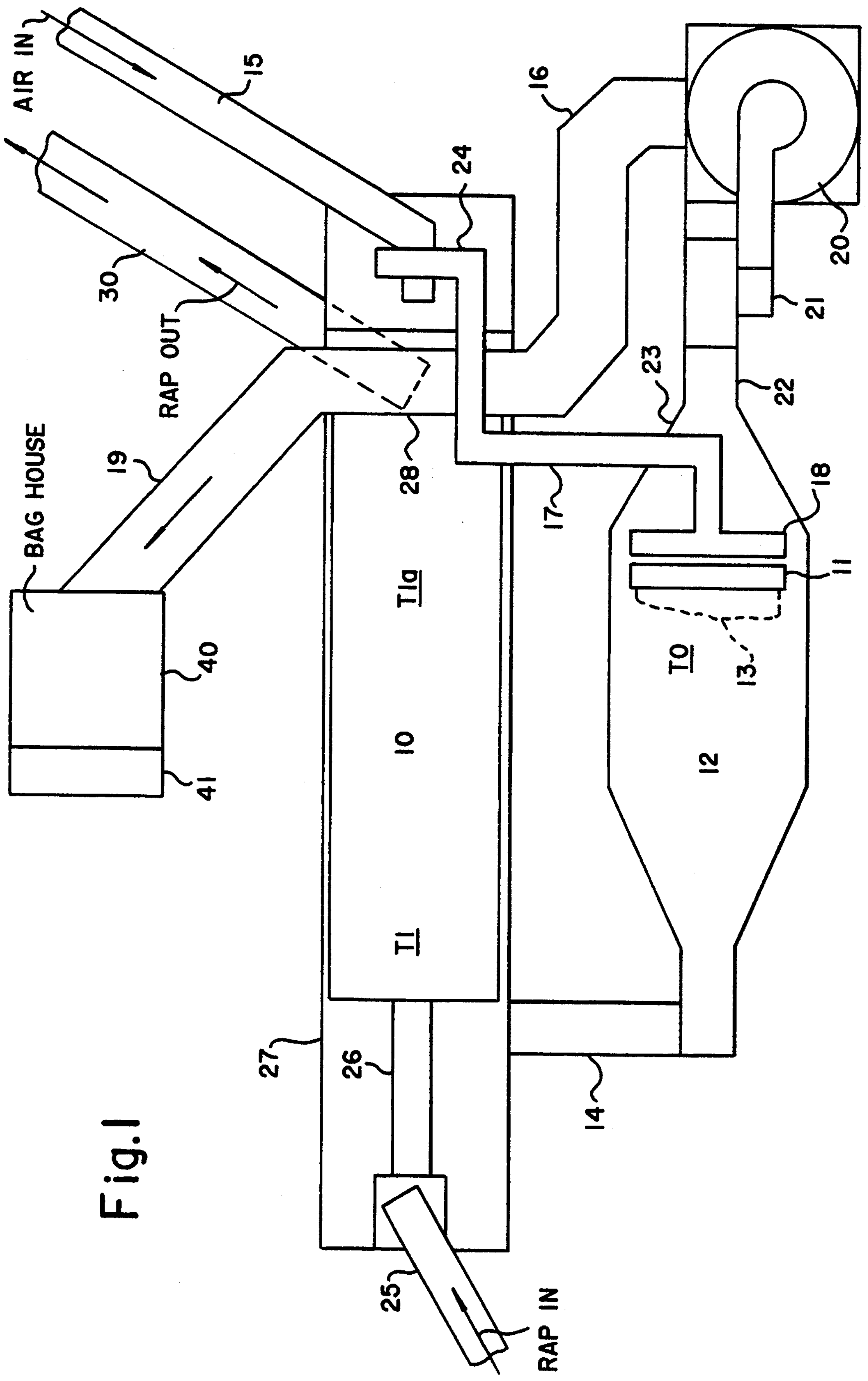
FIG. 1 shows a plan view of a parallel flow drum and separate combustion chamber with input and output connections.

FIG. 1 shows one embodiment comprised of a parallel flow RAP drum 10 with the remote burner 11 which supplies hot gases to the drum and a microwave tunnel. The burner has a combustion chamber 12 which provides for complete combustion prior to inserting the gases into the mixing drum 10 by pipe passage. The burner flame 13 extends only a short distance into the combustion chamber 12 because of the mix of supply air 15 and the recirculation air from conduit 22. A fan 24 receives supply air from conduit 15, and forces it to the burner 11 by way of pipe 17 and distribution means 18. The oxygen for the flame 13 is supplied from the fan 24 and conduit 15. A connecting conduit 14 connects the burner 12 to drum 10. A duct 14 converts the chamber 12 to the mixing drum 10.

A recirculation conduit 16 takes off approximately 50% of the gas which exits the drum 10. This half of the air recirculates through cyclone cleaner 20 back to the burner box by way of conduit 22. This is the largest quantity of recirculation that can be used and still eliminate water and permit complete combustion by the burner 11. The recirculation gases and the oxygen laden air from conduit 15 are mixed before actual ignition in flame 13 or further combustion in chamber 12. This provides for a very short burning time of the flame 13. The cooling introduced by the large volume of recirculation gases from conduit 16 prevents the flame from reaching a high temperature which is believed necessary for the formation of $NO_x$.

The recirculation conduit 16 has a second branch 19 which is an exhaust conduit which extends to a bag house or other suitable filter means. The gases exiting the drum 10 split between conduit 16 and conduit 19. The bag house 40 is necessary to remove particles from the gases escaping from the drum in conduit 19 which would otherwise cause significant air and environmental pollution problems at the RAP site. The bag house receives the portion of the drum 10 exhaust which is not recirculated to the burner 11. An exhaust draft fan 41 pulls gases through conduit 19 and into the bag house 40.

The particles in the portion of the drum exhaust which flows to the burner 11 from conduit 16 are removed by a cyclone separator 20. A recycle fan 21 passes the recirculation gases from the separator to the duct 22 which feeds the gases to the burner 11. The duct 22 also includes a diffuser portion 23 for control of the gases to the burner.

RAP to be processed is supplied to the drum 10 by the conveyor 25 which feeds a slinger conveyor 26. The slinger inserts the RAP into the drum 10. It has been found that variations in particle size and moisture content of incoming RAP results in variations in the final hot mix gradation and temperature. To minimize these variations in the hot mix according to the present invention, 2 or more cold feed bins are used to feed the drum-dryer and thus average the cold feed variations and reduce mix variations. Preferably all of the bins are filled from the same pile, but the simultaneous feed to the same conveyor belt "smooths out" the variations in moisture, gradations and asphalt content and characteristics.

The input end of the drum 27 is raised to a higher level than the exit end 28. This allows the RAP to move downward as it moves forward in the drum. The angle of the drum determines the rate of flow through the drum and can be adjusted to match flow rates required by other components of the system. The input region has drum flights which provide no lift to the RAP, and which move the RAP along the bottom of the drum and forward in direction. This input region is approximately three feet long. The hot gases from the burner 12 pass over the top of the moving RAP in the input region.

Figure 2:
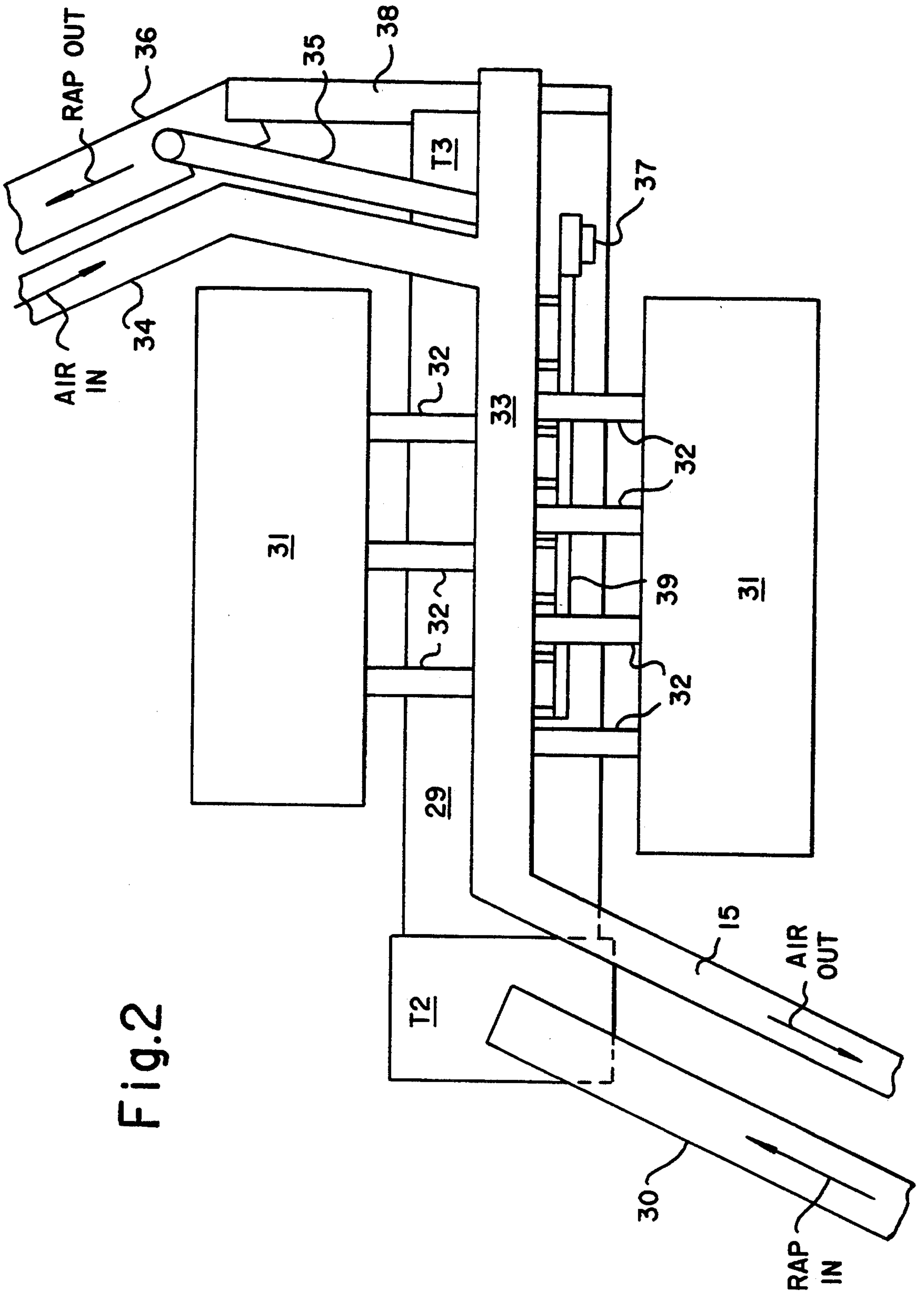
FIG. 2 shows a plan view of the microwave treatment tunnel with input and output connections.

The RAP which is processed by the drum 10 is fed out on a conveyor 30 which moves it to the microwave heating step. FIG. 2 shows the microwave processing unit 29 which receives the RAP from the drum dryer 10 and conveyor 30.

The microwave processing unit is a conveyor tunnel which feeds a stream of RAP under seven separate microwave antennas which are energized by seven transmitters 31 through wave guides 32. The RAP is spread out on the conveyor, and as the RAP stream passes under the antennas the temperature is raised to the final desired output temperature. Ideally, the drum dryer should raise the temperature as high as possible without causing smoking of the RAP and then the microwave unit should provide the last increment of heat required to obtain the final RAP temperature.

The air exhaust 15 from the microwave treatment tunnel is connected to the burner fan 24 as shown in FIG. 1. The air supplied to the microwave tunnel 29 is air which has previously passed over another RAP processing step, such as silos which load product into trucks, or a mill where additives are put into the RAP. The air from duct 34 is used to sweep hydrocarbon fumes from these other steps. The hydrocarbon fumes particles are ultimately burned at burner 11. The fumes from conveyor 36 are picked up by drawing in some air from duct 35 which picks up fumes from mixer 38 as well as conveyor 36. Mixer 38 may be used to mix in additives or rejuvenating materials into the heated RAP.

Coolant is supplied to the seven microwave transmitters as is required, and the wave guides are provided with purging air from fan 37 through duct 39.

The critical temperature of this apparatus is the temperature of the gases entering the drum 10 from the burner 12. This input region temperature must be limited to an amount which is slightly less than that which causes smoking of the RAP. It has been found that the maximum temperature T1 should be 1,200° F. This is a maximum temperature which can be used and still prevent smoking of the input RAP. This temperature will vary with the vaporization temperature (boiling point) of the asphalt. The temperature T1 is taken in the input region where the RAP moves forward, but is not lifted by the drum flights. The fall region of the drum begins downstream from the input where the flights raise the RAP and allow it to fall in a veil down to the bottom of the drum. The auger section of the drum at the entrance of the drum has a length preferably from about 1.5 to 0.3 times the drum diameter, more preferably about 1.0 to 0.5 times the drum diameter, most preferably about 0.75 times the drum diameter.

The temperature T1 may be measured, and the electrical signal indicative of this temperature may be used as a feedback signal to control the burner firing rate and/or the quantity of recirculation gases from duct 16 and cyclone separator 20.

Temperature of the RAP (T2) is measured at the input of the microwave tunnel and this temperature (T2) is controlled by varying the flow rate (pounds of RAP per minute) through the drum dryer and the dwell time in the drum dryer. The lower the flow rate the more heat is available per unit of RAP, the slower the flow and longer dwell, the longer the RAP will be subjected to the hot gases from the burner, and the higher the temperature T2 will be. The temperature T2 is also varied by changing the firing rate of the burner which heats gases for the drum dryer. The temperature T2 is normally between 250° and 350° F.

The electrical signal representing temperature T2 may be fed back to the controls for the firing rate of burner 11 and the control for the flow rate through the drum 10 (the angle of the drum controls flow rate). This temperature T2 may also be used as a feed back signal to control the rate of input of RAP to the system from the slinger 26 and conveyor 25.

The temperature of the RAP at the exit of the microwave tunnel 29, T3, is nominally 300° F. This temperature is partially controlled by control of the flow rate of the RAP through the microwave unit. The slower the flow rate, the higher the output temperature of the RAP from the microwave unit.

The temperature T3 is also controlled by the entire RAP treatment process which precedes. Therefore, an electrical feedback signal representative of T3 may be used to provide control signals for the system variables which comprise the drum angle (flow rate), the burner firing rate, the feedback rate of the gases from cyclone separator 20, the microwave power level, and/or the microwave tunnel flow rate.

The feedback signals representing temperatures T1, T1a, T2, and T3 may be used with an automatic control system for adjusting the system variables, or they may be used to provide information to a control operator (a man in the loop) who adjusts system variables in accordance with measured temperatures.

The microwave unit 29 is the most expensive apparatus in this process, and is therefore the one with the least flow rate capacity. The capacity of the drum dryer should be greater than the microwave unit so that sufficient RAP is always available for the microwave unit. With sufficient RAP available to the microwave unit, it can always be used at its maximum capacity and therefore at its most economical operating level. This will require adjustment of the firing rate, the drum angle, the recirculating percentage of gases from cyclone separator 20, and the microwave tunnel conveyor speed to achieve the maximum heating rate from the microwave magnetrons which are most economical at full power.

The microwave unit can also be controlled by adjusting the power input to the magnetrons 31. If this approach is used, the output temperature (T3) may be varied while the RAP flow rate through the microwave unit remains constant.

The operation of the parallel flow system is best understood by considering first the output temperature T3. Temperature T3 may be controlled by the RAP flow rate in the microwave unit 29 and all of the variables which are upstream from the location of T3. Since the flow rate from the drum 10 to the microwave unit 29 cannot exceed the flow rate through the microwave unit for any significant period of time, the flow rate in the drum must be the same as in the microwave unit during steady state conditions. This means that the flow rate of the drum 10 will be determined by the flow rate through the microwave unit 29.

The RAP temperature T1 is taken by measuring the gas and vapor temperature at a point above the RAP in the input to the drum where there is no RAP falling within the drum. There is no temperature probe inserted into the RAP because of difficulty of construction and maintenance required for such a probe. The drum input has an initial 3 feet where there is no lift given to the RAP which means that the RAP will not rise up and fall down in this region. The movement of the RAP in this area appears more like a conveyor belt where the stream of RAP moves forward only by the screw action of the drum flights. When the RAP passes beyond the initial 3 feet, the flight changes to lifting and the RAP is caused to shower down inside of the drum creating a veil of RAP which intersects the hot gases from the remote burner.

This temperature T1 is affected indirectly by the moisture and temperature of the heated RAP. Where the temperature of the RAP is being raised to a high temperature and the flow rate is low, the temperature T1 will rise because heat from the input will not be absorbed as rapidly by the hotter RAP in the drum. Therefore, when the flow rate of the drum changes as a function of drum angle, the firing rate of the burner must also change.

The temperature $T_o$ is taken at the burner and is the initial temperature of the gases after the flame. The heat measurement at this location is used to control possible smoking of the RAP at the input of the drum or down stream of the input. Lowering $T_0$ reduces the temperature throughout the drum 10. $T_O$ is controlled by adjusting the firing rate and/or the rate of feedback of gases from the drum exhaust at duct 16.

The temperature T1a is taken inside the drum and approximately 10 feet downstream from the input region where T1 is measured. Temperature T1a is measured at a point above the floor of the drum where the hot gases are flowing through the shower or veil of RAP. Feedback of the temperature T1a may be used to adjust the burning rate and/or the feedback of gases from exhaust duct 16, and the flow rate of RAP by adjusting the angle of the drum.

If the rate of drum RAP flow is low, the temperature T1 will rise above 1,200° F. (a maximum temperature where there is no smoking of wet entering RAP) and the burner 11 firing rate will have to be cut back to prevent overheating and smoking at the input and in the drum dryer. The percentage of exhaust gas feedback may also be varied to adjust T1, to the extent possible where there is no measurable $NO_x$ produced by the burner 11 and chamber 12.

Counter Flow Design

In FIG. 3 there is shown another embodiment of the present invention using a counter flow drum dryer. In this embodiment, the RAP enters the drum at the exit end for the exhaust and leaves the drum at the entrance point of the hot gases from the burner. This arrangement assures that the coolest RAP is contacted by the cool gases and the warmest RAP is contacted by the hottest input gases. This provides for transfer of the greatest amount of heat to the RAP, or the highest system efficiency. The exit temperature of the gases may be within 100° or less of the entering RAP, or at a temperature of 150° to 200° F.

In the counter flow process of the present invention, the temperature difference between the gases and mix at the entrance and exit of the drum are generally greater than in parallel flow designs described herein.

A most preferred input temperature of the gases has been found to be approximately 1,200° F. This temperature produces very little hydrocarbon, smoke, degradation of the RAP, or incineration of the fines. This temperature will vary with the boiling point of the asphalt cement. The burner is a low $NO_x$ burner of the type described above and used with the parallel flow design. The exhaust gases are fed to a bag house or other apparatus for cleaning. The bag house preferably contains one or more acrylic or other fabric bags of a woven or non woven design. The exhaust gases may also be cleaned with a slinger type draft fan which will concentrate the fines and hydrocarbon droplets in a periphery of the exhaust.

In the cool flow counter flow design of FIG. 3 it has been found that there is no reason to return the exhaust gases to the burner input for cooling of the burner and input air because the exhaust gases contain very little heat (less than 100° F. higher than the input RAP) and contain substantial amounts of water in the form of vapor or droplets. Therefore, the cooling air to the drum may be ambient air which is not burdened with the water from the exhaust.

In FIG. 3, element 111, represents flights within the rotating drum 102; and element 112*a* represents baffles within the hot gas connecting pipe 107. Element 113 represents vanes for directing the flow of gases into the drum 102. A motor 114*a* is connected to the drum 102 by a belt or chain means 115 for driving the drum 102 in rotation.

It is also contemplated that this counter flow design may be used with a microwave treatment apparatus located downstream. The microwave can be used for further heating of the RAP to a higher end temperature and/or for strengthening the RAP by microwave treatment of the asphaltic binder.

Microwave

In an article entitled "Effective Microwave Heating on Adhesion and Moisture Damage of Asphalt Mixtures" published in Transportation Research Record, 171 (1988) by O. H. Aly and R. L. Terriel, it was demonstrated that asphalt mixture may have the potential of improving asphalt adhesion to aggregate by use of microwave. The microwave discussed in this article provides a very small portion of the energy input to the asphalt. This article is hereby incorporated into this specification by reference.

In a preferred embodiment, the microwave radiation is applied for a sufficient time to reorient dipolar molecules within the material without any significant heating of the material. The microwave energy has a polarization effect on the material and contributes to an improvement in the adhesion of asphalt cement. In addition, positively charged (cationic when present) antistripping agents migrate to and are adsorbed by the aggregate, thus lowering its affinity for water and increasing its affinity for oil. This preferential change in the aggregate surface charge which favors asphalt cement over water, results in water-stripping resistance and contributes to the stronger adhesion. Preferably, the microwave energy can be applied to the material a sufficient time to polarize the material without any measurable change in the temperature of the material. Recycled mixtures treated with microwave radiation have been found to have a higher resilient moduli and split tensile strength, indicating an improvement in asphalt bonding to aggregate. Also, the resistance to water related stripping of microwave treated mixtures is as good or better than that of conventionally heated mixtures, even those with some chemical or lime antistrip. Microwave heating periods of a few seconds in a sufficiently strong microwave field are adequate to reorient the dipolar molecules in the RAP.

In a preferred embodiment shown in FIG. 3, the RAP enters the drum at a hopper 100 and is moved to the drum 102 by the conveyor 101. The drum 102 has a slight tilt to its longitudinal axis and slopes down from the input end of the RAP drum to the output at 103. The hot gases can be generated by an Eclipse AH burner 104 which can be supplied with combustion air from fan 105 which can receive exhaust air from a microwave heater unit, or from ambient air. There is also a separate supply of ambient air 106 which is used to cool the burner gases to approximately 1,200° F. prior to entering into the drum and coming into contact with the hot RAP in the drum. A burner tube 107 is used to connect the burner to the drum. Tube 107 can be equipped with baffles which shield the RAP from the burner radiant heat, and prevent excessively hot gas laminations, salients or spikes from the hot gas supply from entering into the drum. The burner tube 107 can be constructed so that there is a bend or turn which shields the RAP from the infra red heat of the flame. The burner tube 107 may also include turbulence inducers to shield radiant heat from entering the drum.

The burner tube 107 may also include turbulence inducers 113 or baffles 112*a* to shield radiant heat from entry into the drum. The drum 102 also includes flights 111 for raising the RAP and allowing it to fall within the drum, as well as urged the drum exit. FIG. 3 also shows a motor 114*a* for driving a belt 115 for rotating the drum 102.

Drum Flight Design

The auger sections at the front end and the rear end of the drum are angled and any asphalt coming in contact with the auger sections slides down and out. The center section of the drum contains parallel flights which in a prior art drum would have been welded directly to the wall forming corners where asphalt would stick. In the present invention, the flights are held by brackets or rods away from the drum wall creating a gap. There are no corners formed between the flights and the drum wall. As a result the drum is self-cleaning. The second feature contributing to the self-cleaning aspect of the drum is the fact that the parallel flights are angled such that any flight that is directly under the falling aggregate, along the center line of the drum, will be tipped slightly forward. Otherwise, aggregate would hit the rear end or the bottom side of the flight and the flight would not catch the falling aggregate. In other words, the planer section extending from the wall is tipped slightly up such that when a flight is in line with the vertical line of the drum, the flight is at an angle forward of the vertical line. For example, in one embodiment when the point of attachment is at the bottom of the drum, the end of the flight is 10° off of the vertical line and tilted towards the direction of rotation.

Figure 16:
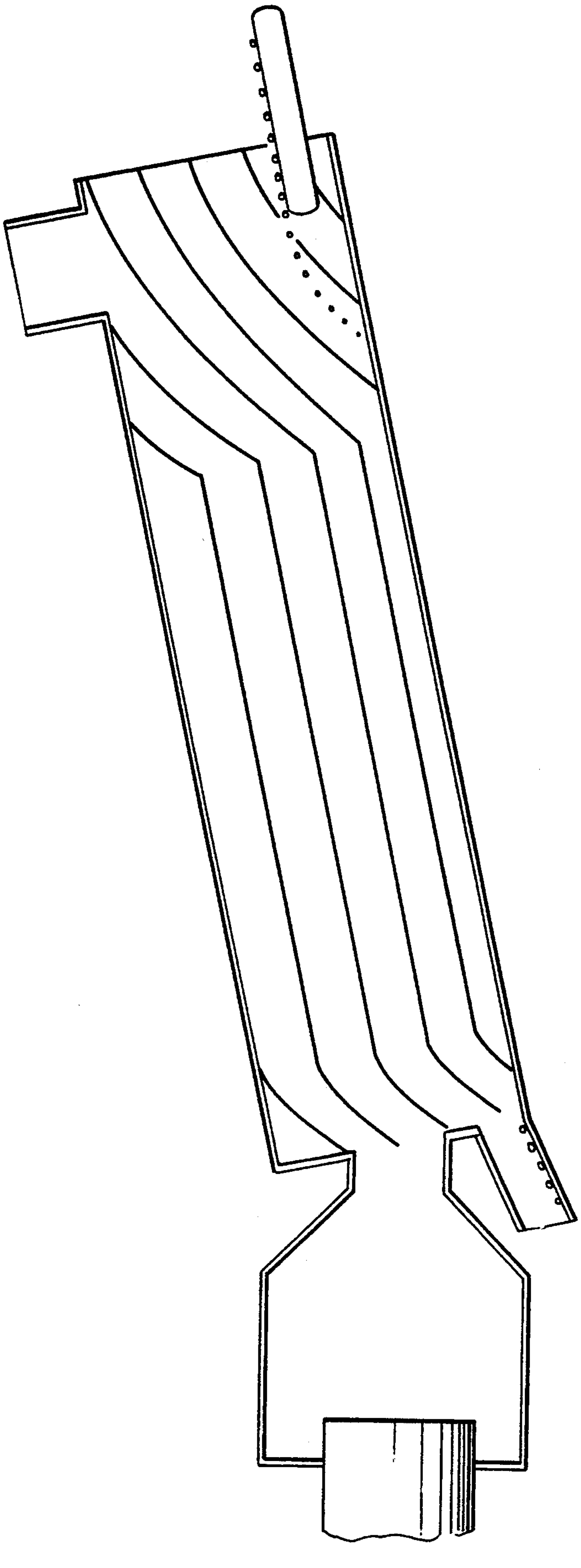
FIG. 16 shows the cross section of a drum dryer and the entry augers, parallel flights and exit augers in a counter flow drum.

In one embodiment of the present invention, the drum dryer is comprised of three sections: an introductory section, the veils creating section and an exit section. The introductory section is comprised of augers used to move the asphalt into the drum. The center section is comprised of parallel flights designed to raise the asphalt and form a veil. The tail section of the drum is comprised of an auger section designed to carry the asphalt forward out of the drum without creating a veil. The auger sections in combination with drum angle and drum rotation move the aggregate forward. The middle section of parallel flights move the aggregate forward as a result of the drum angle only. See FIG. 16.

In the present invention, it is preferable to have a longer introductory auger section than typical drum dryers. Increasing the introductory auger section in a counter flow drum results in a longer volume of air where no veil is being formed allowing the settling of the asphalt and the removal of fines in response to air velocity and drum diameter. The length of the auger section is approximately about 1.5 times to 0.3 times the diameter of the drum. Preferably about 1.0 to 0.5 times the diameter of the drum and most preferably about 0.75 times the diameter of the drum.

In one embodiment of the present invention, the drum length is about 32 feet and the introductory auger section is about 6 feet. In this embodiment the aggregate may be introduced either at the top or the bottom, preferably the bottom, of the drum either with or without a belt that projects the auger into the drum 3 to 4 feet.

Figure 17A:
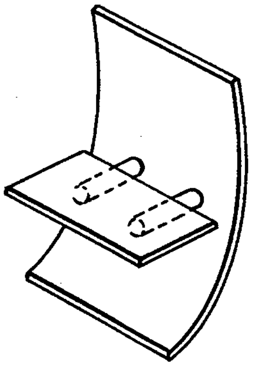
FIGS. 17A to F show flights that can be used in the present invention, with 17A and B showing the entry auger, 17C and D showing the short flights and 17E and F showing the tall flights.
Figure 17B:
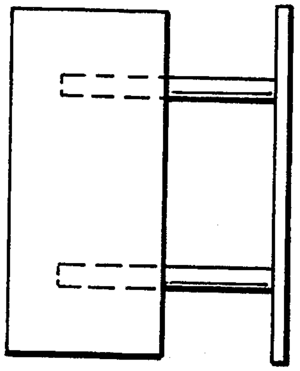
Figure 17C:
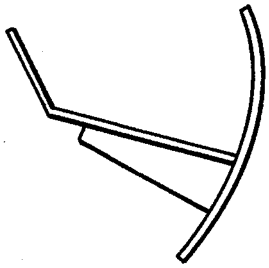
Figure 17D:
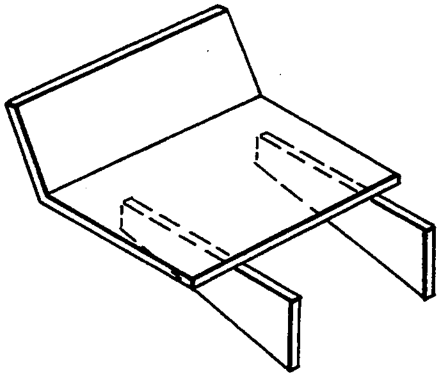
Figure 17E:
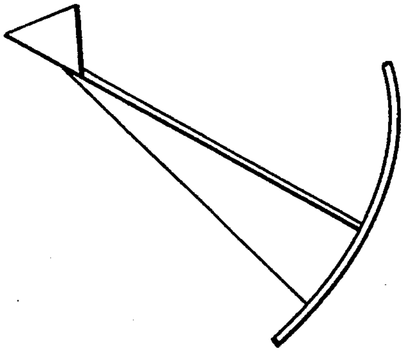
Figure 17F:
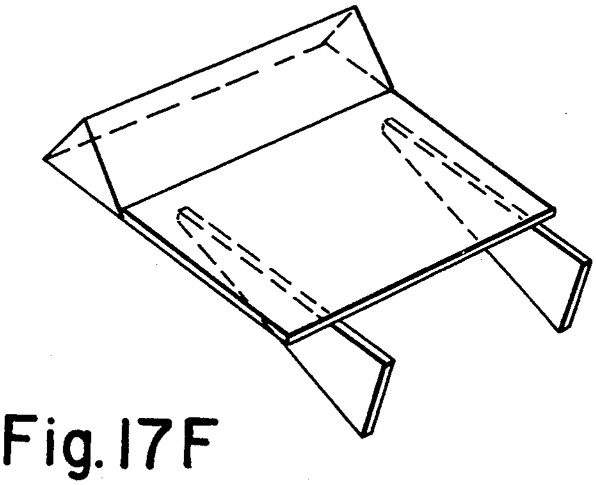
Figure 18A:
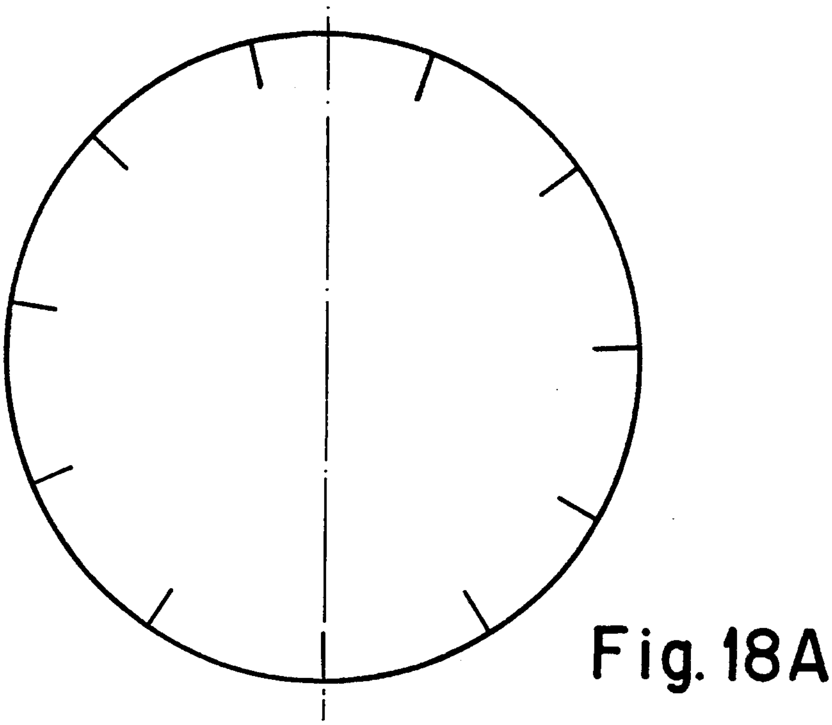
FIGS. 18A to F show the flights in relationship to the drum dryer and the drum dryer's center line, with 18A showing the entry auger flights, 18B showing a perspective view of the auger flights, 18C showing the short flights, 18D showing the tall flights and 18E and 18F showing the exit flights.
Figure 18B:
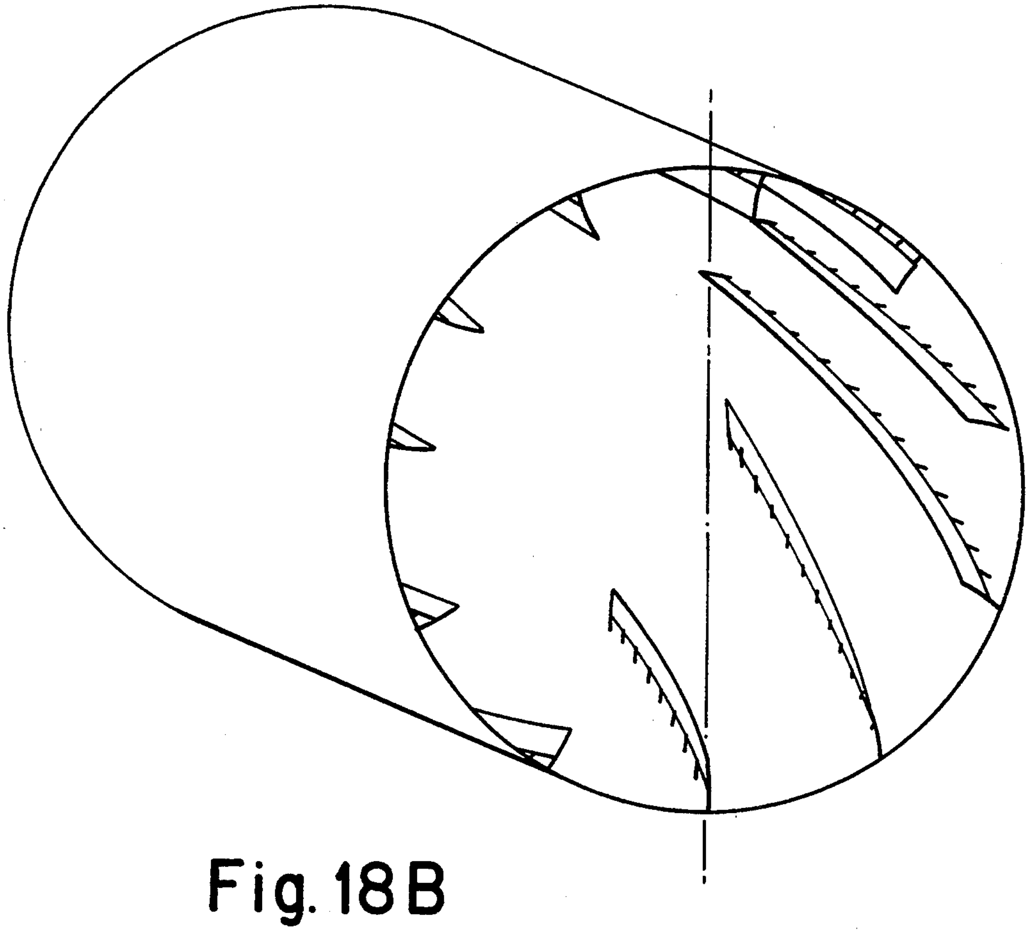
Figure 18C:
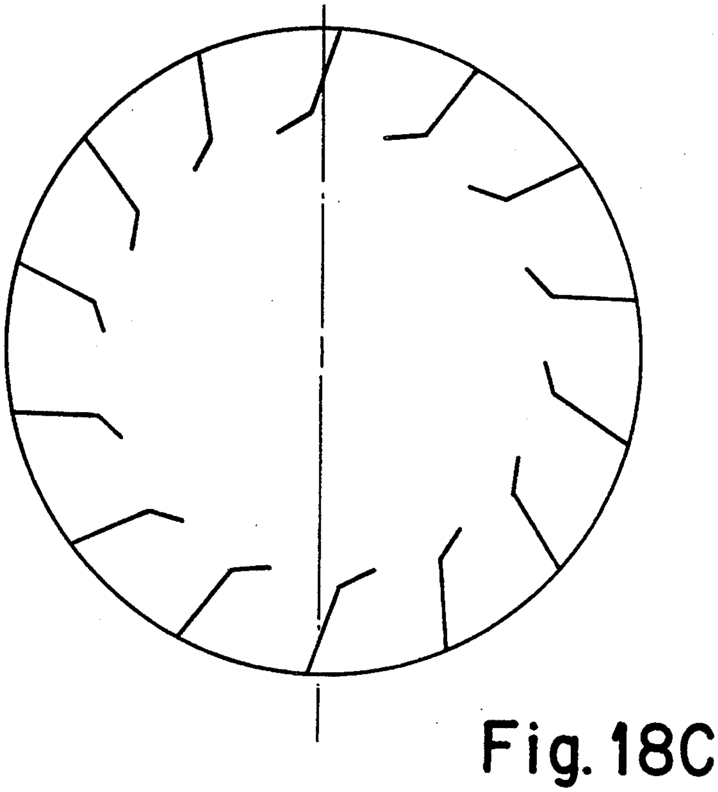
Figure 18D:
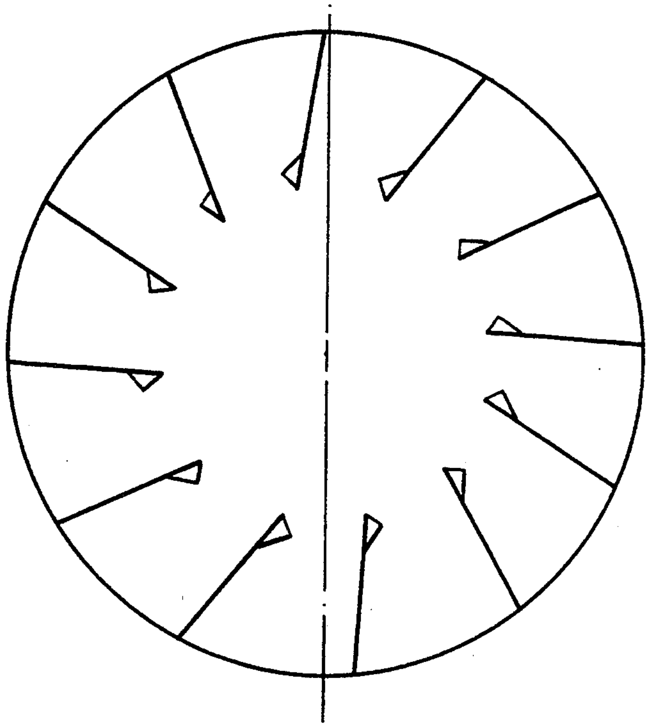

In another embodiment of the drum, the parallel flight section is comprised of two different types of flights. A short flight, shown in FIGS. 17C, 17D and 18C and a tall flight, shown in FIGS. 17E, 17F and 18D. Both of these flights stand off from the wall and are angled so that they tip forward slightly from the vertical line of the drum. Short flights are comprised of a flat table with an angled catch. This may be either one sheet of metal bent to form the catch or two sheets welded together.

In one embodiment the table section of the short flight is approximately about 9 inches. The scoop section is approximately 6 inches and the angle between the table and the scoop is approximately about 135°. The table is connected to a bracket which creates a space between the table and the drum wall of approximately about 3 inches and an angle of deflection off the vertical line of approximately about 10 degrees. The length of the short flight is approximately about 3½ to 4½ feet, most preferably about 47.5 inches.

The second set of flights, the tall flights, in this embodiment is comprised of a table and a second section comprising the scoop section of the flight which is shaped in a triangular manner. The flight can be comprised of one or two pieces of metal. In the first embodiment the table is folded over forming a triangular shaped scoop using the end of the metal. In a second embodiment the table and scoop are formed by attaching one sheet to the second sheet wherein the second sheet has been folded at an angle of approximately 95°. Thus, when the two sheets are joined one end of the folded sheet is attached to the end of the table sheet and the other end of the folded sheet is attached to the table sheet away from the edge forming a triangle. The apex of the triangle is approximately 95°. The angle formed by the table and the scoop section is approximately 42.5°. The second set of flights are preferably longer than the first set of flights, that is they extend further into the drum. The table section is approximately 12–13 inches long, most preferably about 12.75 inches long. The external face of the scoop triangle is approximately about 5 inches long, most preferable 4.65 inches long. The internal face of the scoop triangle is approximately 6 inches long, most preferably about 5.75 inches long. This flight is held to the drum wall using brackets which provide a space between the drum wall and the flight. The space is preferably about 3 inches long. The flight is attached to the drum wall such that the table tips away from the vertical line of the drum. When the site of attachment is at the very bottom of the drum in line with the center vertical line of the drum, the end of the table is tipped in the direction of rotation and away from the vertical line preferably about 10°.

In one embodiment of the present invention, the second set of flights is approximately 12 feet long. The two sets of parallel flights are coordinated such that the aggregate veil is not interrupted as the aggregate moves from the first to second set of flights. In one embodiment of the present invention there are 13 short flights or first sets of flights and there are 11 long auger flights or second set of auger flights. It has been found that this combination provides a maximum veil of RAP in the drum dryer.

The auger flights which are at the first six feet of the entry of the drum are designed such that the tail end of each will line up with the front end of the flights. Embodiments of the auger flights are shown in FIGS. 17A, 17B, 18A and 18B. In one embodiment of the auger the auger flights are held in place by rods called standoffs. These rods are approximately 1 inch in diameter. A standoff is installed 8 inches from each end of the auger then 24 inches between each remaining, for a total of 5 per flight. The auger section contains approximately 11 auger flights having a standoff of approximately 2 inches from the drum wall. The augers are installed (in a left hand clockwise rotation looking in at the inlet), causing the material to move downstream into the drum. The angle to center line on the lifting side of the flight is approximately 50° with an equivalent pitch if it were a whole pitch of approximately 212 inches. The flight must be of a length to make the auger approximately 6 feet long or approximately ⅓ of one pitch.

Figure 18E:
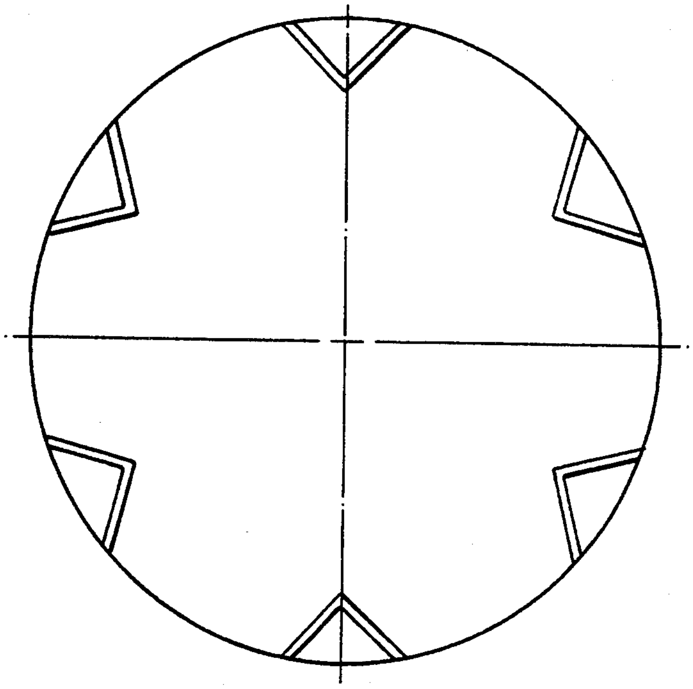
Figure 18F:
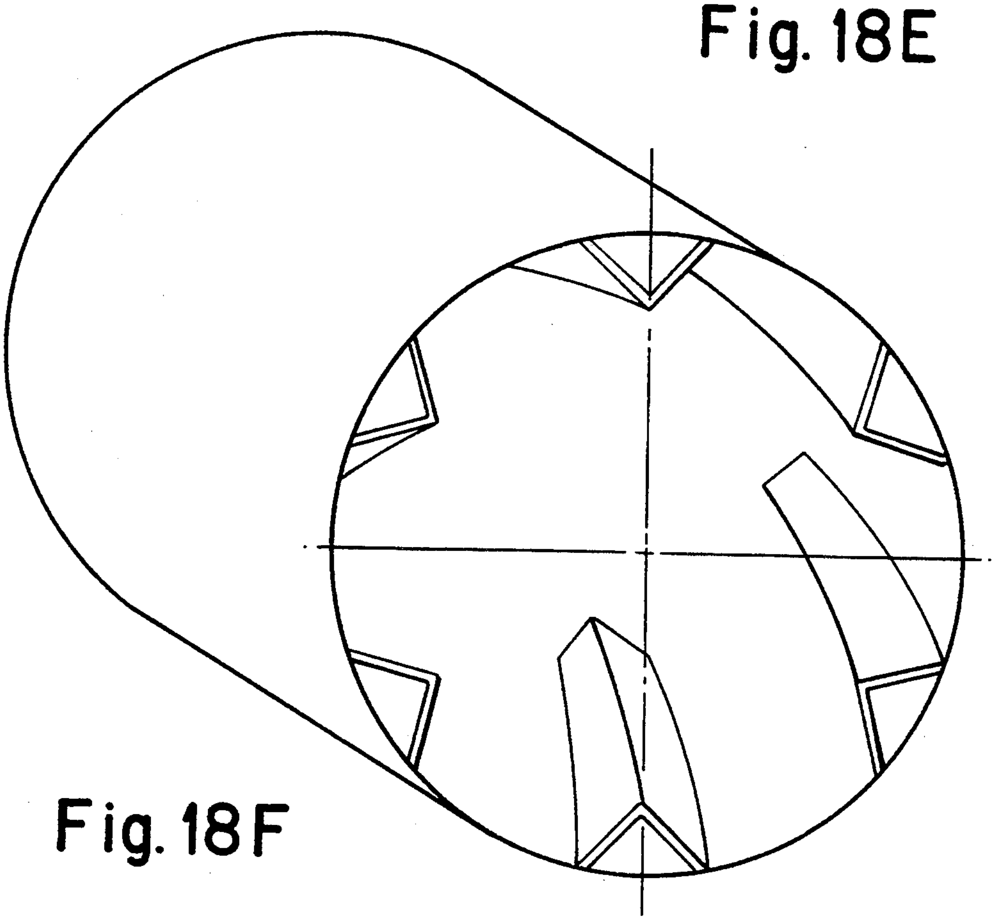

The augers at the exit end of the drum are comprised of a sheet folded into an angle such that when attached to the drum wall a triangle is formed with the drum wall in the base. Embodiments of these auger flights are shown in FIGS. 18E and 18F. The height of the apex of the triangle to the drum wall is approximately 4 inches and the length of the auger is sufficient to cover the remaining 2 feet of the drum. The flights are angled approximately 45° to the center line of the drum. Their purpose is to pull the material out of the drum without creating a veil. The exit auger flights need not be spaced from the surface of the wall and still maintain a self-cleaning drum.

Using the above cited embodiment in the present invention results in maximum veil formation, maximum moisture removal from the aggregate, minimum coking of any asphalt present in aggregate particularly if RAP is used, and maximum sorting and removal of fines. It has been found that the length of the auger section at the exhaust exit end of the counter flow drum is important in aiding the air separation of fines in the cool flow drum.

Centrifugal Fan Separator

Figure 15A:
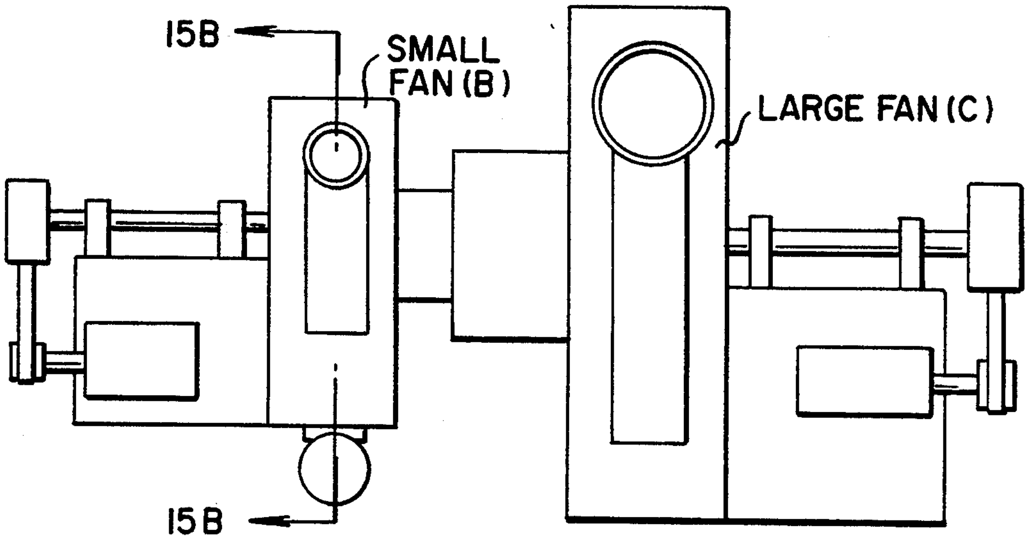
FIG. 15A shows a centrifugal separator.
Figure 15B:
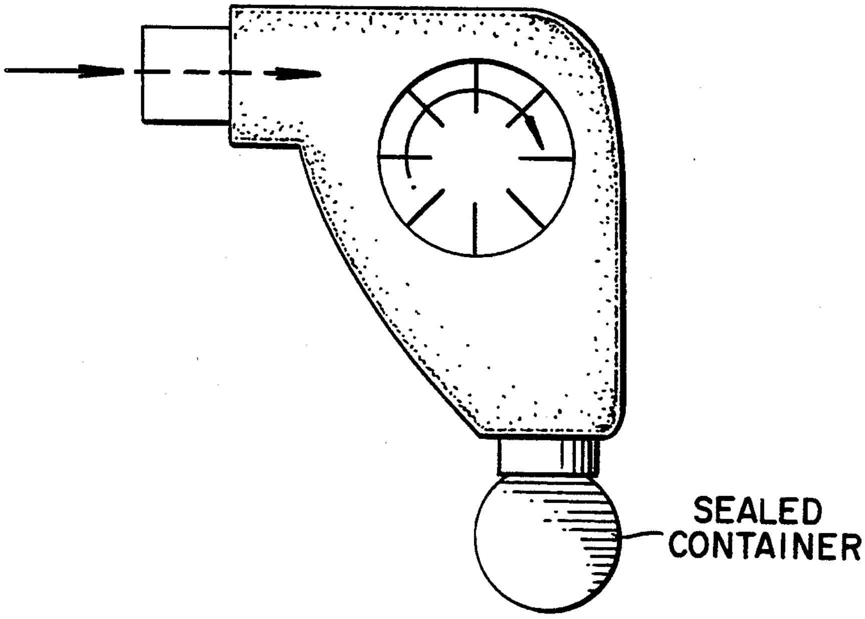
FIG. 15B shows a cross section AA in FIG. 15A.

A device called a counter fan or centrifugal fan separator, can be used to remove fines from the exhaust gas. One embodiment of the centrifugal separator consists of a large and small centrifugal fan hooked inlet-to-inlet as shown in FIGS. 15A and 15B. The large fan is a standard radial blade fan. The small fan is modified so that a sealed container such as a glass jar can be attached to the bottom of the fan. In this way spinning action of the two fans causes particulate to separate from the air to be spun off and be captured in the sealed container. In the alternative, the sealed container is replaced with a continuous feeder to remove the fines, for example, a rotary vane feeder may be used. The counter fans are connected to the exhaust air duct from the asphalt dryer. The result of combining the two fans is that as the air is pulled through the smaller fan the particulate matter encounters the small fan which is rotating backwards to the direction of the exhaust air pulled by the larger fan. As a consequence the particulate matter is thrown, due to centrifugal forces, outward into a dead air area and the particulate matter drops. The advantage of this separator is that it is very small when compared to a bag house cyclone or knock-out box. An additional advantage of this is that fans are easy to obtain and maintain and thus lowering the overall cost of the plant. A further advantage is the unexpected efficiency of removing the hydrocarbon moist fines. An additional advantage is that the plant will now more readily lend itself to mobility.

Prior art bag houses have used materials that are designed to withstand high temperatures in the range of 400°-500° F., such as NOMEX. In using the present invention, it is not necessary to use these expensive materials. Using the present invention it is acceptable to use acrylic bags in place of NOMEX bags. A bag house for use with the present invention is any bag house that is capable of filtering out remaining dust in the air not withdrawn by the fine removal system and need not be heat tolerant. It is preferable that bags be dusted with aluminum oxide. Due to the efficiency of previous removal of the fines, the bag house may be much smaller and will require less maintenance.

In operation, a dust cake on the bags is blown off of the bags every day of operation to eliminate the oily residue. The bag is then recoated with a dust coat, preferably with NEUTRALITE, or a similar material to avoid clogging of the filter bag and to provide a protective coating on the bag.

In a counter-flow plant producing 200 tons per day of product, the RAP moisture content was 2.5% b.w. The fines from the baghouse amounted to about 1% b.w. of the RAP, or about 4,000 lbs/hrs. The fines from the baghouse were tested to determine their size and asphaltic content. The fines were analyzed by passing them through a reflect extractor in which a solvent (trichlorethane 1, 1, 1) was used to wash the fines. The washed fines were then passed through a series of sieves. The results of the sieve analysis is as follows:

| Asphalt Content | 8.3% b.w. |
|---|---|
| Percent of Sample Retained on No. 20 Sieve: | 0.3% b.w. |
| Percent of Sample Retained on No. 50 Sieve: | 2.2% b.w |
| Percent of Sample Retained on No. 200 Sieve: | 70.7% b.w. |
| Percent of Sample Passing Through a 200 Sieve: | 26.6% b.w. |

The caked coating material, such as NEUTRALITE, is periodically removed with a pulse jet device emitting a pulse of high velocity air which generates a shockwave. The caked coating is broken up by the shockwave.

In a preferred embodiment, the hot gases from the drum are discharged in the counterflow device at a temperature of from about 160°-200° F., and the hot gases are passed from the drum through a knockout box, where particulate material is removed from the hot gases. The hot gases discharging from the knockout box are then passed into a baghouse to further remove fines from the hot gases. The bags are preferably coated with a protective coating thereon of a particulate material comprising SiO and $Al_2O_3$. The hot gases from the baghouse are then passed through an oxidizer, whereby to remove any smoke and entrained asphaltic material.

In another preferred embodiment, the hot gases discharging from the drum are at a temperature of from about 190°-200° F. The hot gases discharging from the knockout box are preferably passed upwardly and through a goose-necked-shaped passage and then into the baghouse.

In another preferred embodiment, the protective coating on the bag comprises diatomaceous earth. The protective coating on the bag can further comprise $Na_2O$, $K_2O$, MgO, CaO and $Fe_2O_3$. Preferably, the SiO is finely divided amorphous silica.

In practice, the protective coating on the bag can be from about one-sixth to about one-eighth of an inch thick. Due to the thickness of the protective coating, it is preferred to use a shockwave to remove this protective coating rather than a mechanical means. In any event, this protective coating is used to absorb moisture and asphaltic material.

In a preferred embodiment, the hot gases from the baghouse are passed through an oxidizer and then passed through a heat exchanger. Preferably, heat exchanger is used to heat incoming air to the oxidizer. Although any type of material can be used for the fabric of the bags which can withstand temperature limits in this process, it is preferred to used an acrylic bag.

The drum 102 may be provided with flighting bolted or welded in the drum. The flighting can be adjusted by adding or removing for the purpose of adjusting the thickness of the RAP veil falling in any section of the drum. Changes in the flighting can effectively increase or decrease the amount of RAP contact in the drum. By control of the veil, the entering gas temperature at point T1 can be increased. The increase is possible because the veil has more free air passages. Still further, the flighting can be adjusted to provide different heating conditions in different sections of the drum. The flighting can also be adjusted to control the rate of RAP movement through the drum in cooperation with the longitudinal angle of the drum and drum turning speed.

The air exhaust 108 feeds out from the cool end of the drum and may be dumped directly to the atmosphere if environmental conditions permit, or further cleaned in a cleaning step such as a bag house or a slinger fan 109.

System Control Computer

Applicant provides for control of the RAP recycling process by means of sensors located to determine various parameters of the operating system. Applicant has prepared four computer driven programs which can be used to make decisions and adjust parameters of the operating system in order to achieve desired results. Table 1 (below) gives the definition of the terms shown in applicants flow charts (FIGS. 7A-D) and block diagram (FIG. 7E).

TABLE 1

| Abbrev. | Description |
|---|---|
| Ag | Amount of Aggregate added to RAP |
| Agmx | Maximum Aggregate that can be added |
| DS | Drum Slope |
| DSmx | Maximum Drum Slope |
| DRPM | Drum RPM |
| DRPMmx | Maximum Drum RPM |
| DRPMmn | Minimum Drum RPM |
| GASi | Gas Volume Into Drum |
| GASo | Gas Volume Out of Drum |
| GASomx | Maximum Gas Volume Out of Drum |
| GRAD | Gradation of Mix |

TABLE 1-continued

| Abbrev. | Description |
|---|---|
| GRADd | Desired Gradation of Mix |
| TDI | Drum Inlet Gas Temperature |
| TDImx | Maximum Drum Inlet Gas Temperature |
| TDO | Drum Outlet Gas Temperature |
| TDOmx | Maximum Drum Outlet Gas Temperature |
| TDOmn | Minimum Drum Outlet Gas Temperature |
| Tr | RAP Outlet Temperature |
| Trd | Required RAP Outlet Temperature |
| Trmx | Maximum RAP Outlet Temperature |
| Trmn | Minimum RAP Outlet Temperature |
| TPH | Tons Per Hour Produced |
| TPHd | Tons Per Hour Required |
| TPHmx | Maximum Tons Per Hour |
| TPHa | Actual Tons Per Hour |
| TPHmn | Tons Per Hour Minimum |
| VOC | Hydrocarbons In Exhaust |
| VOCmx | Maximum Hydrocarbons Allowed |

Figure 7A:
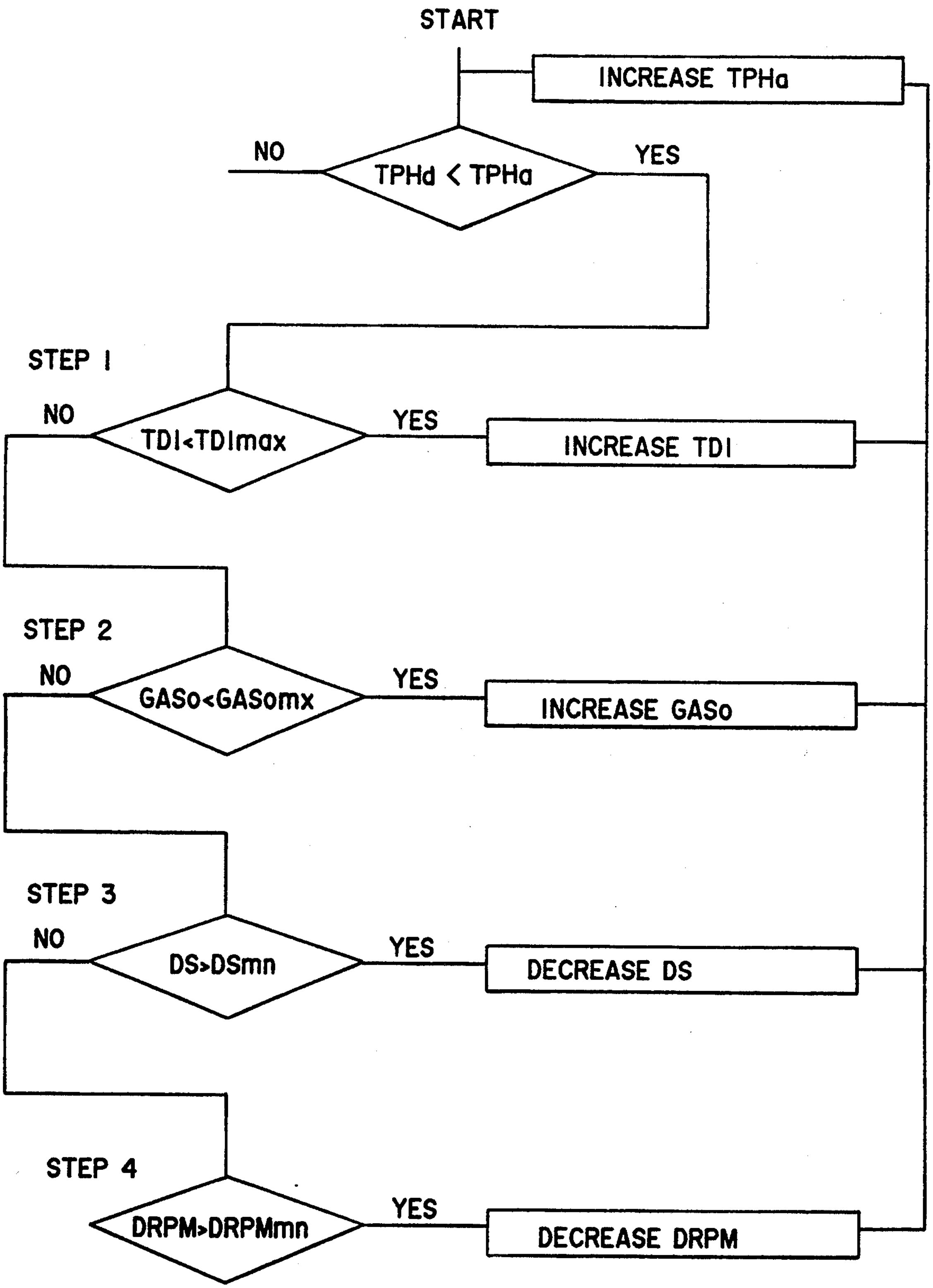
FIG. 7A is a flow chart showing control steps for increasing production rate.

FIG. 7A shows the logic flow chart for control of the production rate. If the tons per hour required (TPHd) is less than the actual tons per hour (TPHa), then it is determined whether the drum inlet at gas temperature (TDI) is less than the drum inlet temperature maximum, then the control provides for an increase in the drum inlet gas temperature (TDI). Simultaneously with the increase in drum inlet gas temperature, there is also an increase in the tons per hour produced (TPH). If the drum inlet gas temperature equals or exceeds the drum inlet gas temperature maximum, then it is determined whether the gas volume out of the drum is less than the gas volume maximum out of the drum (GASomx). If it is less than GASomx, the gas volume out of drum (GASo) is increased again along with an increase in the tons per hour. When the gas volume out of the drum becomes equal to or greater than the gas volume of out the drum maximum, control then passes to step 3 where it is determined if the drum slope (DSM) is greater than the drum slope of minimum (DSmn). If this is true, the drum slope will be decreased along with a further increase in the tons per hour (TPH). If the drum slope is equal to the drum slope minimum, then control passes to step 4 where it is determined whether the drum RPM is greater than the drum rpm minimum (DRPMmn). In this case, the drum rpm (DRPM) is decreased along with an increase in the tons per hour produced (TPH). In this control, the tons per hour required (TPHd) can be arbitrarily set by the operator in accordance with daily requirements from the plant. The drum inlet temperature, the gas volume out of the drum, the drum slope, and the drum rpm are all determined by measurements of the system during operation by actual measurements.

Figure 7B:
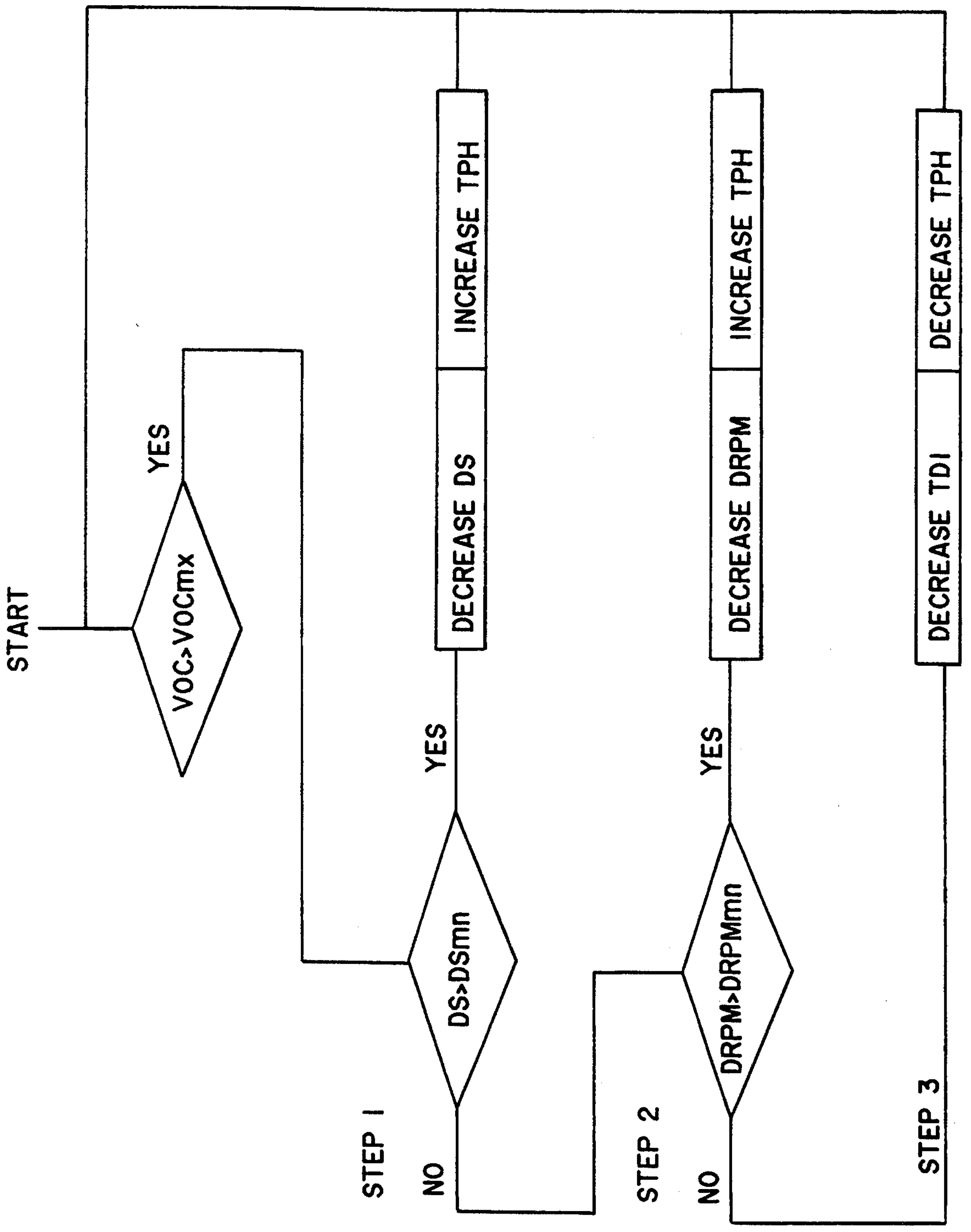
FIG. 7B is a flow chart for emission control.

In FIG. 7B applicant shows the flow chart for computer control of the hydrocarbon content in the exhaust. First a maximum level of hydrocarbons in the exhaust (VOCmx) is determined. The determination may be made to meet air quality standards. If the measured hydrocarbons are greater than the maximum, then the determination of step 1 is made. Here, if the drum slope is greater than the drum slope minimum (DSmn), then the drum slope is decreased and the tons per hour (TPH) is increased. However, if the drum slope is equal to the drum slope minimum (DSmn), then control passes to step 2 where it is determined if the drum RPM (DRPM) is greater than the drum RPM minimum (DRPMmn). If the speed is greater than the minimum, then the speed is decreased with an increase in tons per hour.

In the case where the drum speed (DRPM) is equal to the minimum (DRPMmn), the system passes control to step 3 where the drum inlet gas temperature is decreased along with a decrease in the tons per hour (TPH). In this manner, the temperature and throughput are either increased or decreased in order to provide reduction of the measured hydrocarbon in the exhaust (VOC).

Applicant provides a method of controlling the hydrocarbon emission from the counterflow RAP drum by detecting exhaust gas hydrocarbon levels (VOC) with a hydrocarbon analyzer. Drum slope (DS) is decreased when the detected exhaust gas hydrocarbon level (VOC) is greater than the maximum permissible hydrocarbon level (VOCmx). Applicant provides a further step of increasing the tons per hour of throughput material (TPH) when the drum slope is being decreased. Applicant in step 2 provides for decreasing the drum rpm to the drum rpm minimum with a consequent increase in tons per hour throughput. The final step (step 3) requires decreasing both the drum inlet gas temperature (TDI) and the tons per hour when the conditions of step 1 and 2 are both met.

Figure 7C:
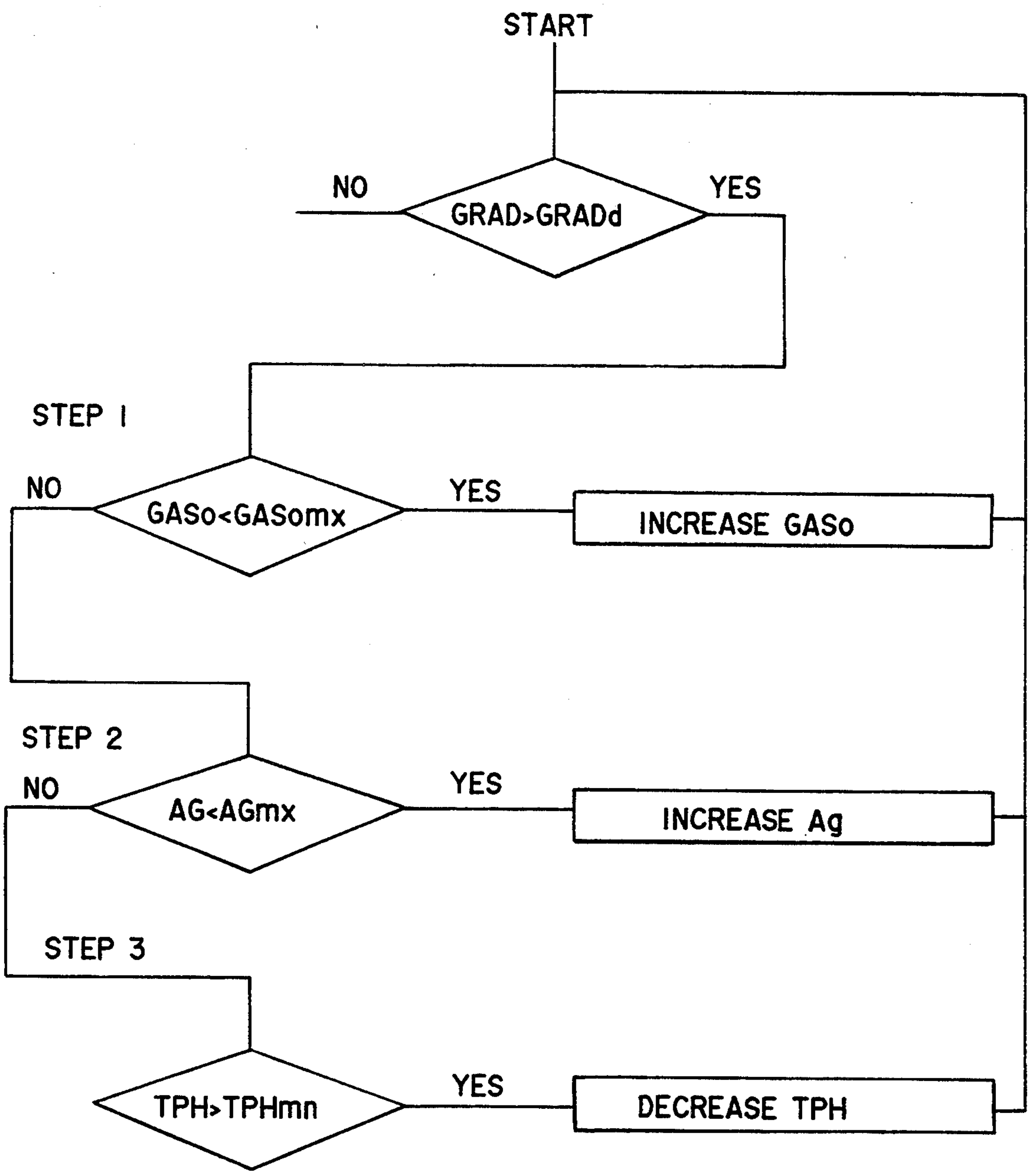
FIG. 7C is a flow chart for correction of the gradation of the mix.

FIG. 7C is the computer flow chart used in correcting the gradation of the mix during processing of the RAP in a counterflow drum. Again, the terms used in FIG. 7C are the same as the terms defined in Table 1 above.

Gradation correction is a function of the fines content of the final asphalt product. Since applicant's system provides for fines removal during processing by the drum, the fine content of the output asphalt product can be adjusted by varying drum conditions. As shown in FIG. 7C, if the measured gradation of the mix is greater than the gradation desired, then control is passed to step 1 where it is determined if the gas volume out of the drum is less than the gas volume out of the drum maximum ($GAS_{omx}$). If this is the condition, the gas volume out of the drum is increased to increase the removal of fines. With the greater increase in fines removal, the gradation of the mix is lowered. If in step 1, it is determined that the gas volume out of the drum is equal to the maximum gas volume out of the drum, then control is passed to step 2 where it is determined if the amount of aggregate added to the RAP is less than an amount of aggregate that can be added ($AG_{mx}$). If the amount of aggregate to be added can be increased, it is increased and control is passed back to the beginning.

If however, the maximum aggregate that can be added is being added, then control is passed to step 3 where the tons per hour output (TPH) is compared to the tons per hour minimum ($TPH_{mn}$). If tons per hour can be decreased, then it is decreased and control is passed back to start. In this way, the control of the gas volume out of the drum, the aggregate added, and the tons per hour (throughput) are used to adjust the gradation of the mix. The gradation desired ($GRAD_d$) is determined by the asphalt specification required by the road contractor or consumer of the asphalt. The maximum gas volume out of the drum ($GAS_{omx}$) is determined by the capacity of the exhaust fan located between the bag house and the after burner.

Figure 7D:
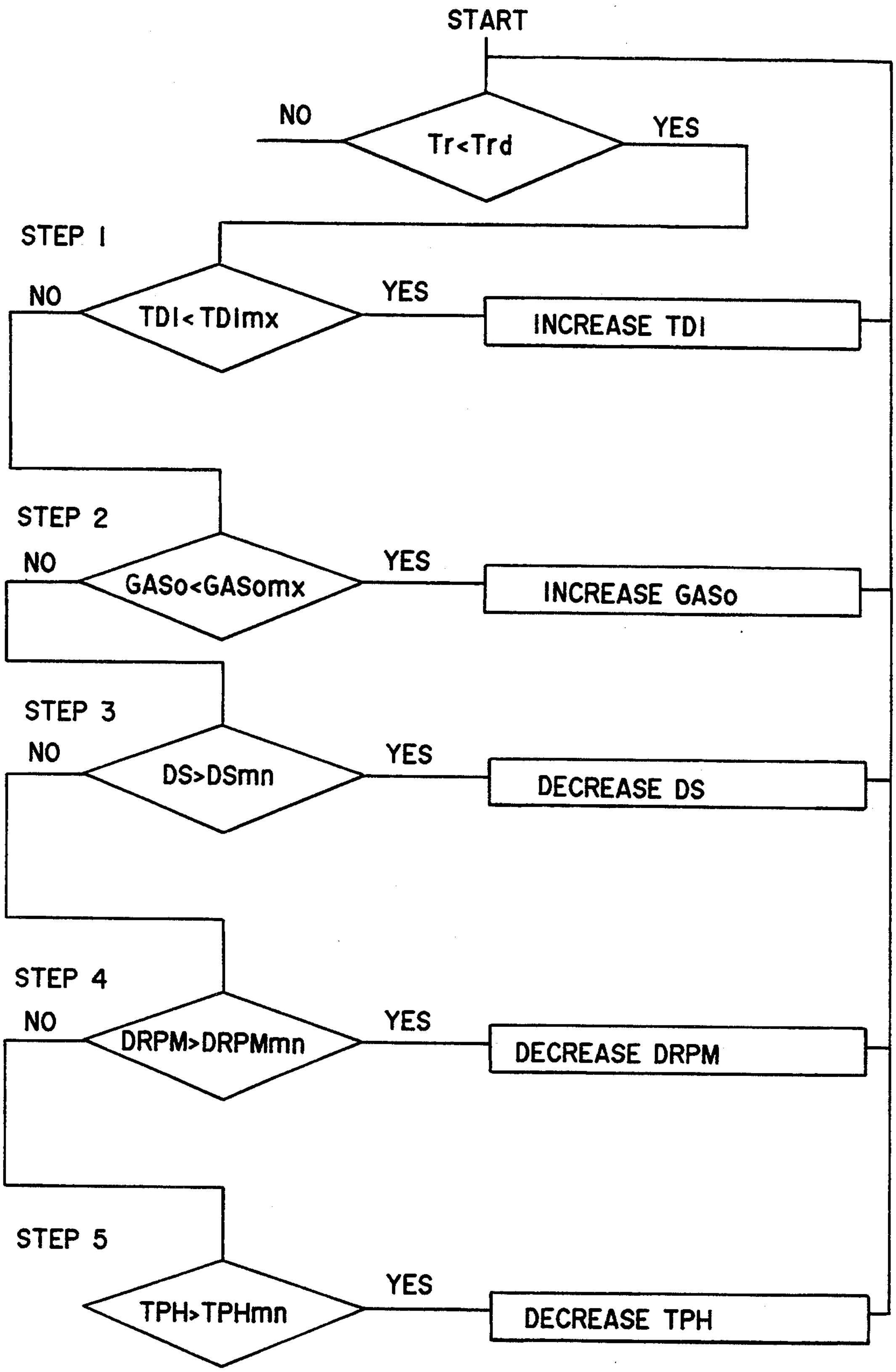
FIG. 7D is a flow chart for control of a outlet RAP temperature.
Figure 7E:
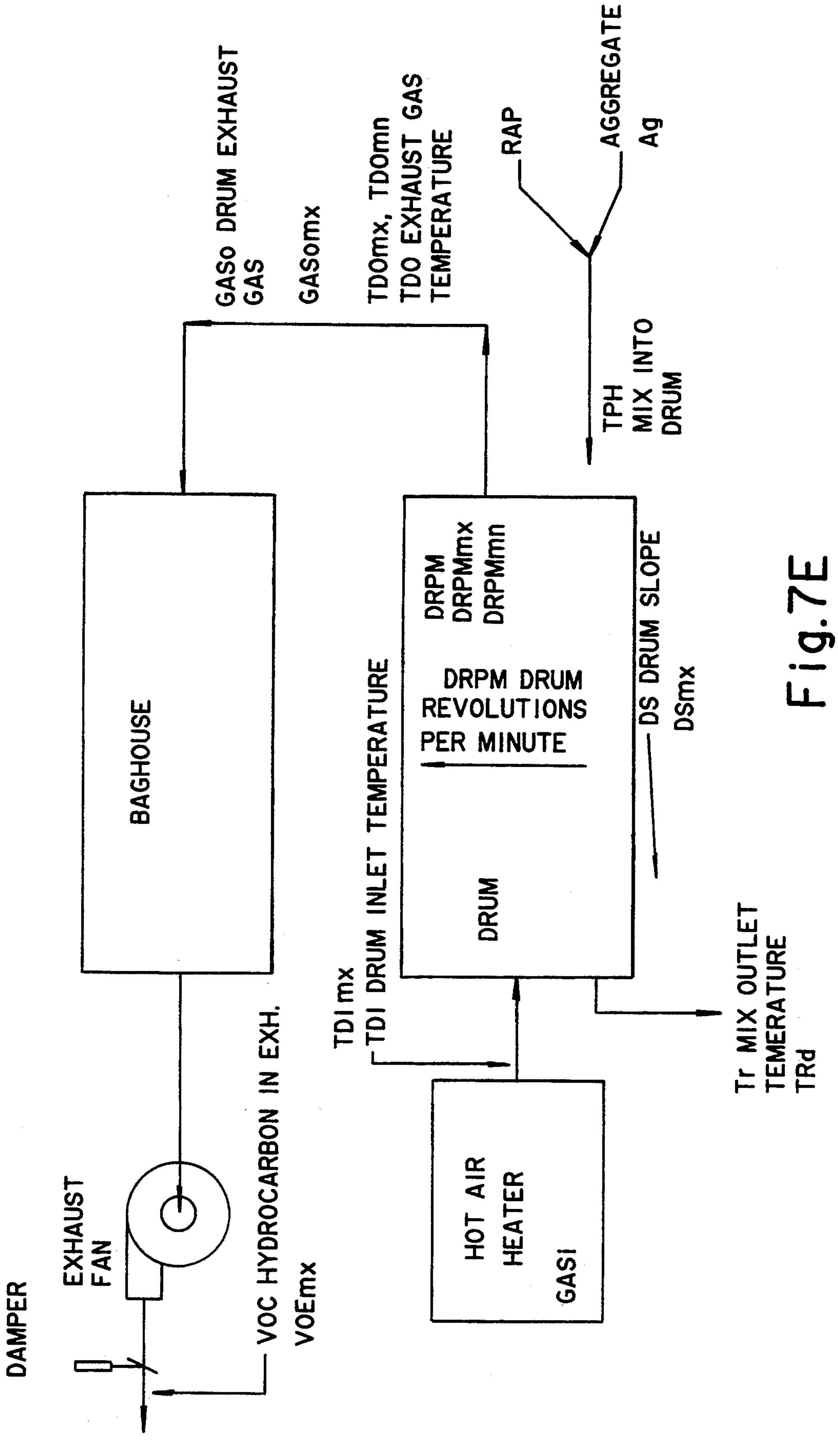
FIG. 7E shows the location of parameters set forth in FIGS. 7A through 7D and Table 1.

In FIG. 7D, applicant demonstrates the method for control of the RAP outlet temperature ($T_r$). Here, a required output RAP temperature ($T_{rd}$) is set and the actual RAP outlet temperature is compared. If the actual outlet temperature is less than the set output RAP temperature, then control is passed to step 1. In step 1 the drum inlet gas temperature (TDI) is compared to the drum inlet gas temperature maximum ($TDI_{mx}$). If the temperature is less than the maximum, then the drum inlet gas temperature is increased by increasing the fuel supplied to the burner. At this point control is returned to start. If the drum inlet temperature is equal to the maximum drum inlet temperature, then control is passed from step 1 to step 2 and it is determined whether the gas volume into the drum is less than equal to the gas volume into the drum maximum ($GAS_{omx}$). If the answer to step 2 is yes, then the program will require an increase in the gas volume out of the drum ($GAS_o$).

If the answer to step 2 is no, then control is passed to step 3 where it is determined with whether the drum slope (DS) is greater than the drum slope minimum ($DS_{mn}$). If this is true, then the drum slope is decreased and control is returned to start. If the answer in step 3 is no, then control is passed to step 4. In step 4 it is determined whether the drum RPM is greater than or equal to the drum RPM minimum. If the answer is yes, it is possible to decrease the drum RPM and it is decreased as control is passed back to start.

If the answer in step 4 is no, then control moves to step 5 where it is determined whether the tons per hour are greater than the tons per hour minimum permissible. If this is true, then the throughput (TPH) is decreased and control is returned to start.

In the above description of control of RAP outlet temperature, applicant provides for control in accordance with preset limits which are parameters controlled by the drum size firing rates etc. The set features are required RAP outlet temperature ($TR_d$), drum inlet gas temperature maximum ($TDI_{mx}$), gas volume out of the drum maximum ($GAS_{omx}$), drum speed minimum ($DS_{mn}$) drum RPM minimum ($DRM_{mn}$), and the throughput per hour or tons per hour ($TPH_{mn}$).

Appropriate sensors are provided throughout the system to measure the actual RAP outlet temperature, actual drum inlet gas temperature, actual gas outlet temperature, actual drum slope, actual drum RPM, and actual tons per hour produced.

Figure 8A:
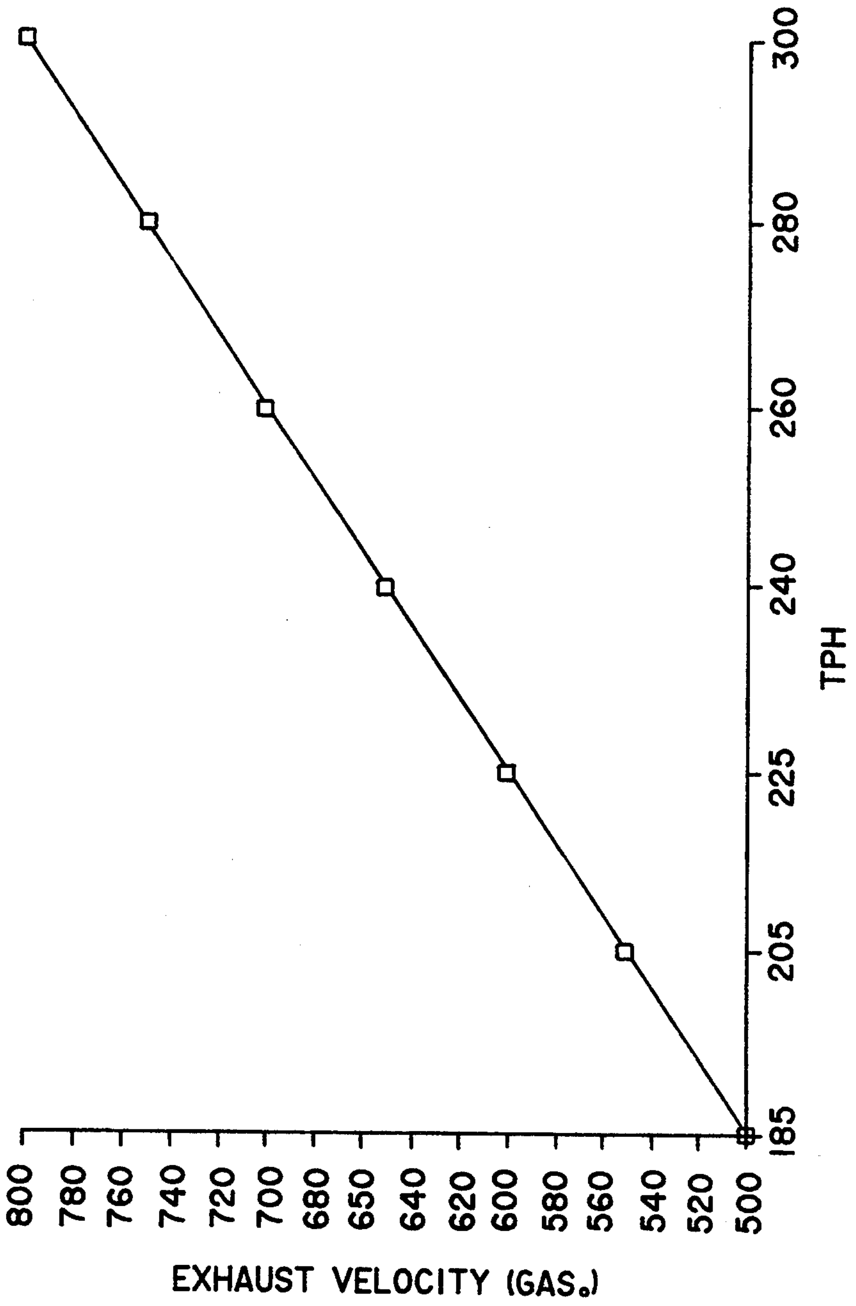
FIG. 8A is a graph of tons per hour versus exhaust velocity.

In FIG. 8A applicant shows the relationship of the tons per hour produced versus exhaust velocity in one apparatus embodying this invention. The relationship is shown as lineal. Throughput per hour is a lineal function of the exhaust velocity when exit RAP temperature is held constant.

Figure 8B:
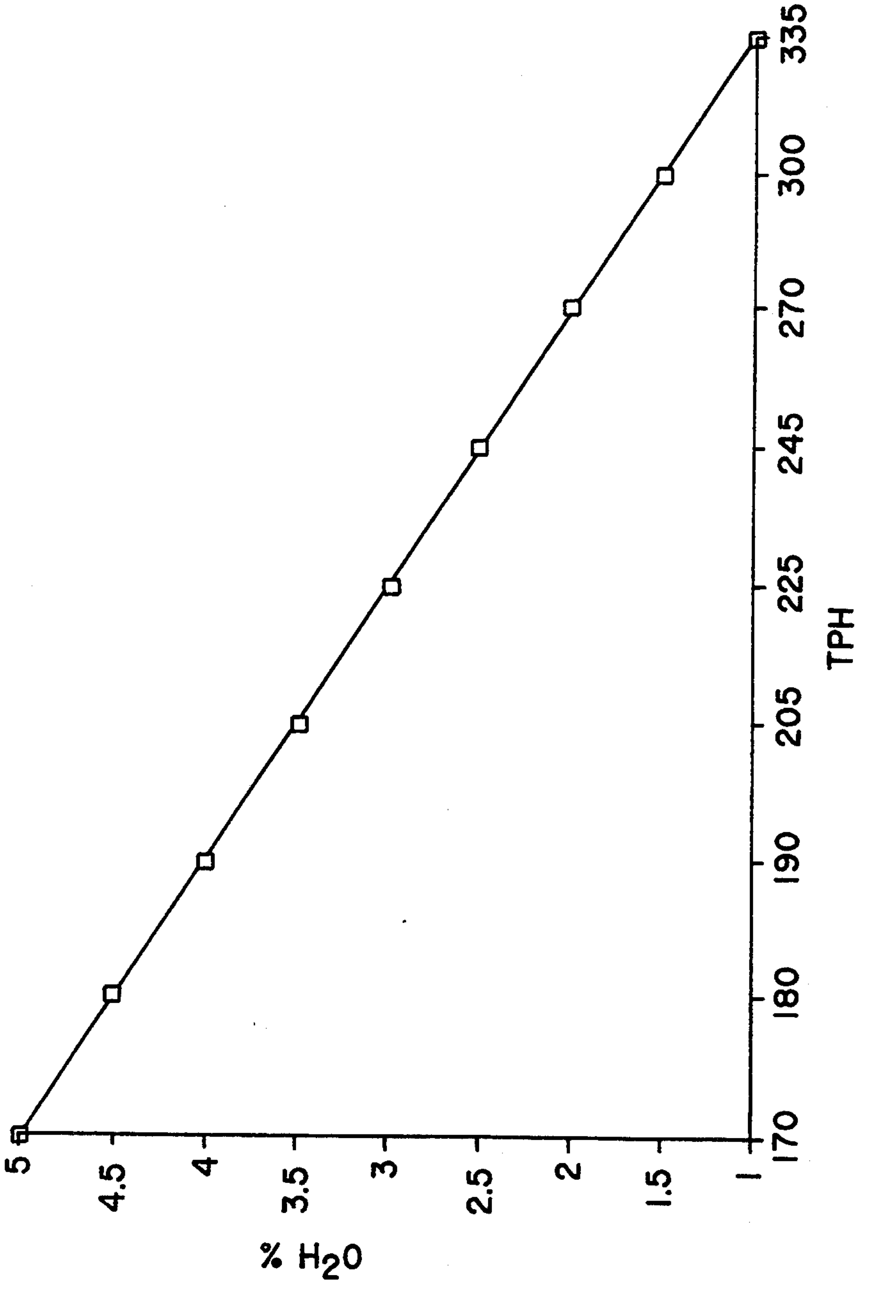
FIG. 8B is a graph of tons per hour versus moisture.

FIG. 8B shows the lineal relationship between the throughput (tons per hour) versus the percentage moisture in the RAP with other conditions held constant.

Figure 8C:
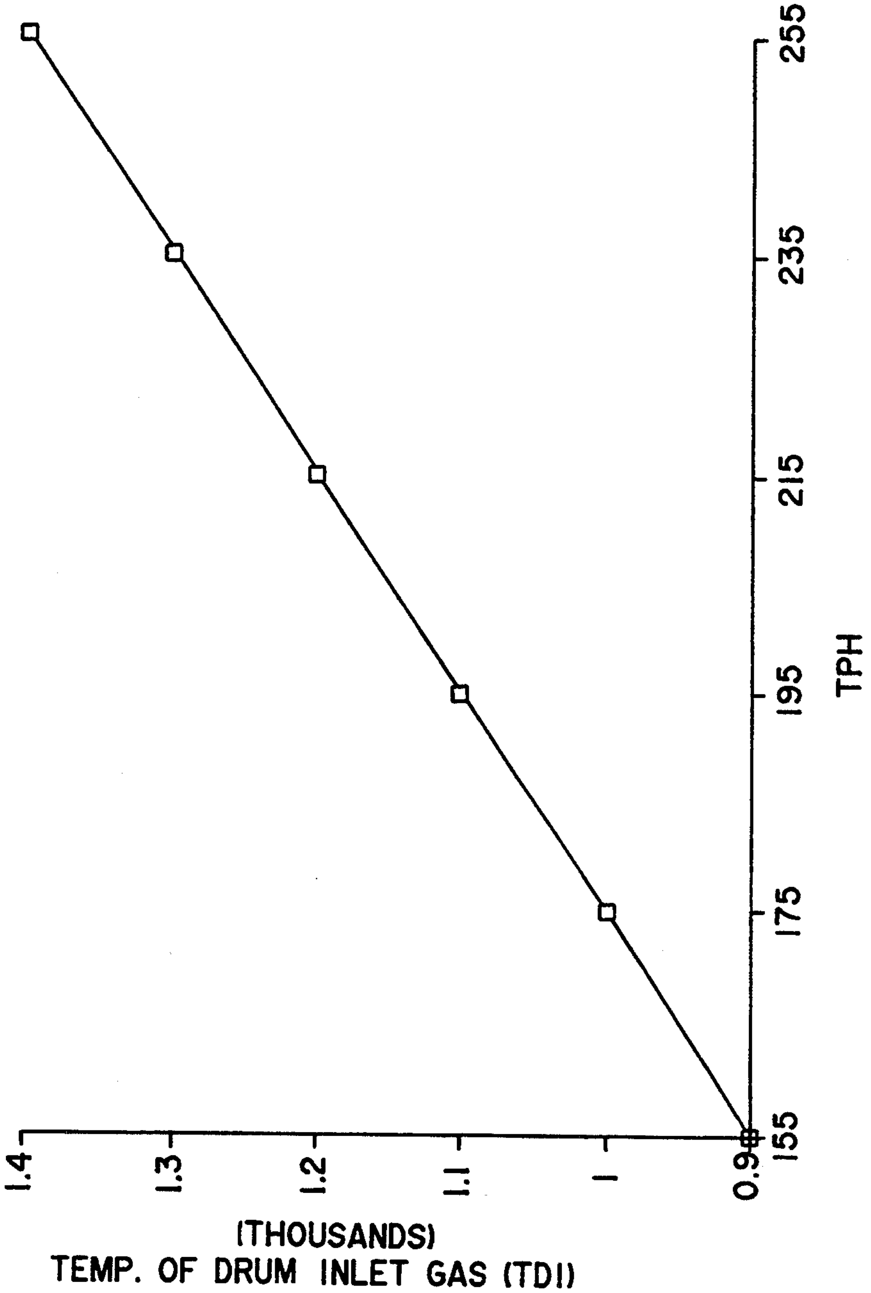
FIG. 8C is a graph of tons per hour versus inlet temperature.

FIG. 8C shows the tons per hour versus the temperature of the drum inlet gas (TDI).

Figure 8D:
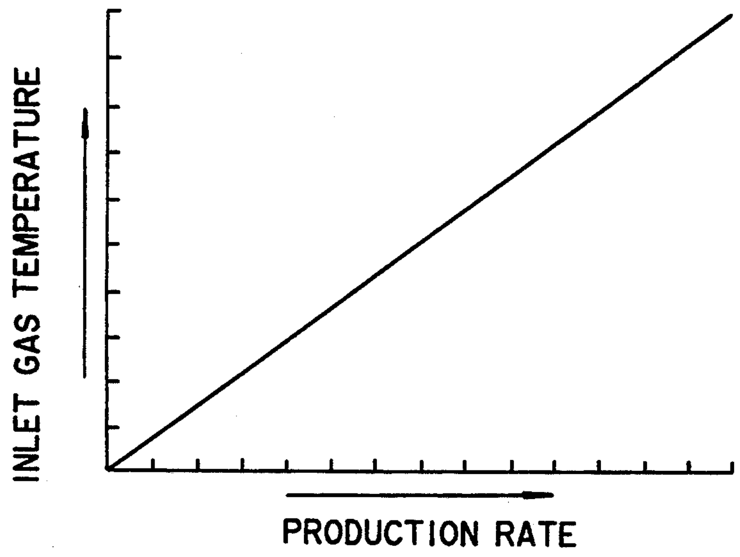
FIG. 8D is a graph of inlet temperature versus production rate.

FIG. 8D shows the lineal relationship between asphalt production rate and inlet gas temperature with other conditions held constant.

Figure 8E:
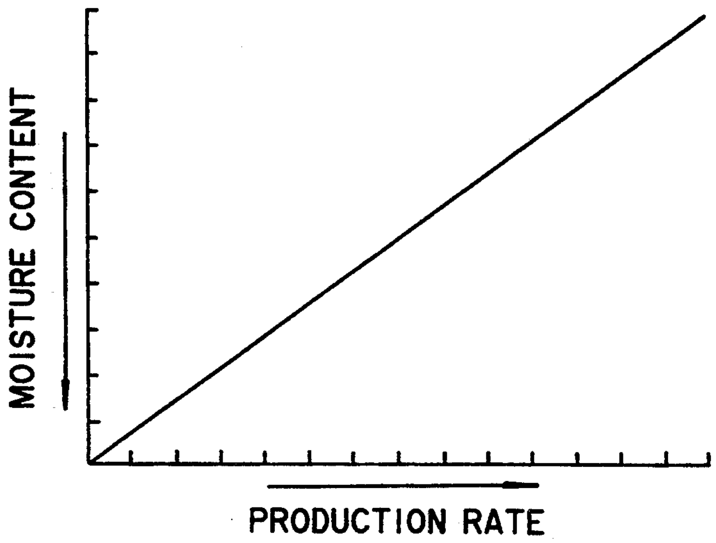
FIG. 8E is a graph of moisture content versus production rate.

FIG. 8E shows the production rate (tons per hour) is an inverse lineal relationship to the moisture content which is increasing in the direction of the arrow shown (Pointing Downward).

Figure 8F:
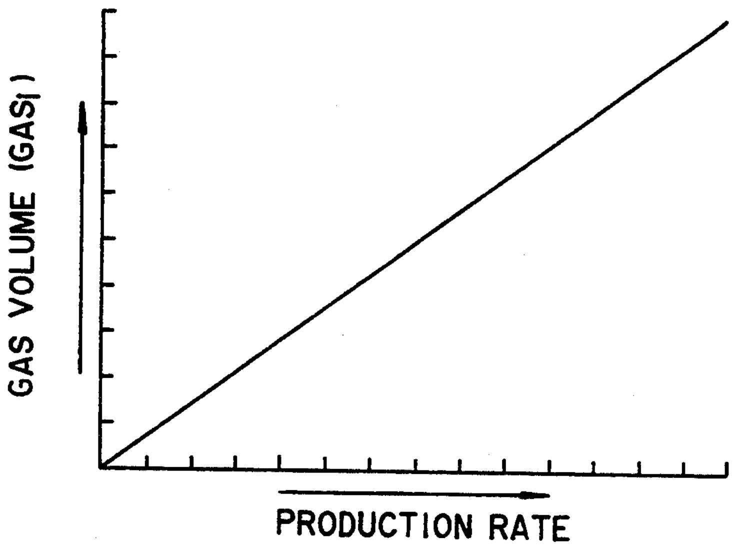
FIG. 8F is a graph of gas volume versus production rate.

FIG. 8F shows the lineal relationship between the production rate (tons per hour) and the gas volume (GASi).

Figure 8G:
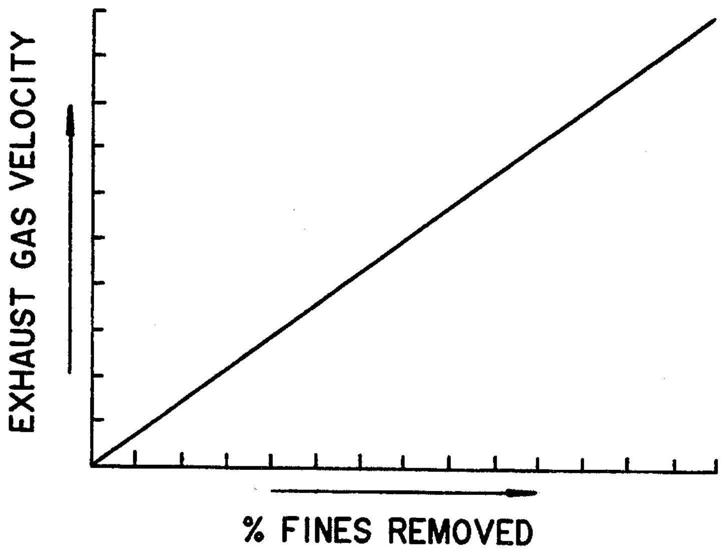
FIG. 8G is a graph of exhaust gas velocity versus the percentage of fines removed.

FIG. 8G shows the relationship of fines removal to exhaust gas velocity ($GAS_o$).

Each of these relationships shown in FIG. 8A–8G provide background relationship for the flow charts used for control of the counterflow drum (FIGS. 7A, 7B, 7C, 7D).

Control of the process is provided by adjustment of the drum longitudinal angle, by adjustment of the firing rate, by adjustment of the amount of ambient air 106, by adjustment of the rate of RAP input, and/or by adjustment of the drum flighting. Control is effected by temperature measurements which include the temperature of the incoming RAP at 101, the temperature of the exhaust gases (T2), the temperature of the input gases (T1), and the temperature of the exit RAP (T3).

The process may be controlled by a computer which receives as inputs T1, T2, and T3. The drum throughput is adjusted by the rate of input from the conveyor 101 and by the longitudinal tilt of the drum 102. The tilt may be mechanically or hydraulically controlled and the computer may be used to control the tilt by control of servo mechanisms having feedback of position to the computer. Based upon the drum and burner design and/or configuration, empirically generated curves can be constructed which permit the computer to predict which drum angle would produce a desired throughput of RAP. In a preferred embodiment, it has been determined that the temperature T1 can be approximately 1,200° F., and T2 is preferably less than 100° F. higher than the input RAP temperature, and T3 is preferably on the order of 250° to 350° F.

Figure 4A:
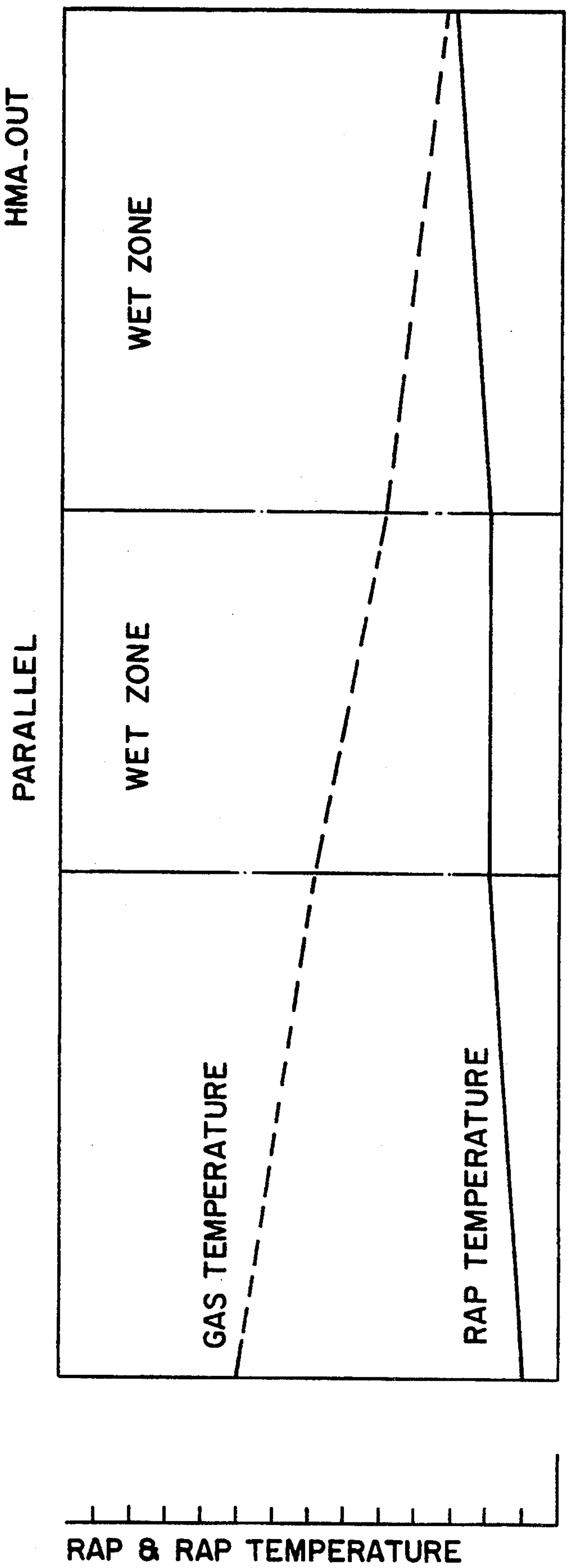
FIG. 4 is a graph showing the gas temperature and RAP temperature at various points along a drum operated according to the present invention.
Figure 4B:
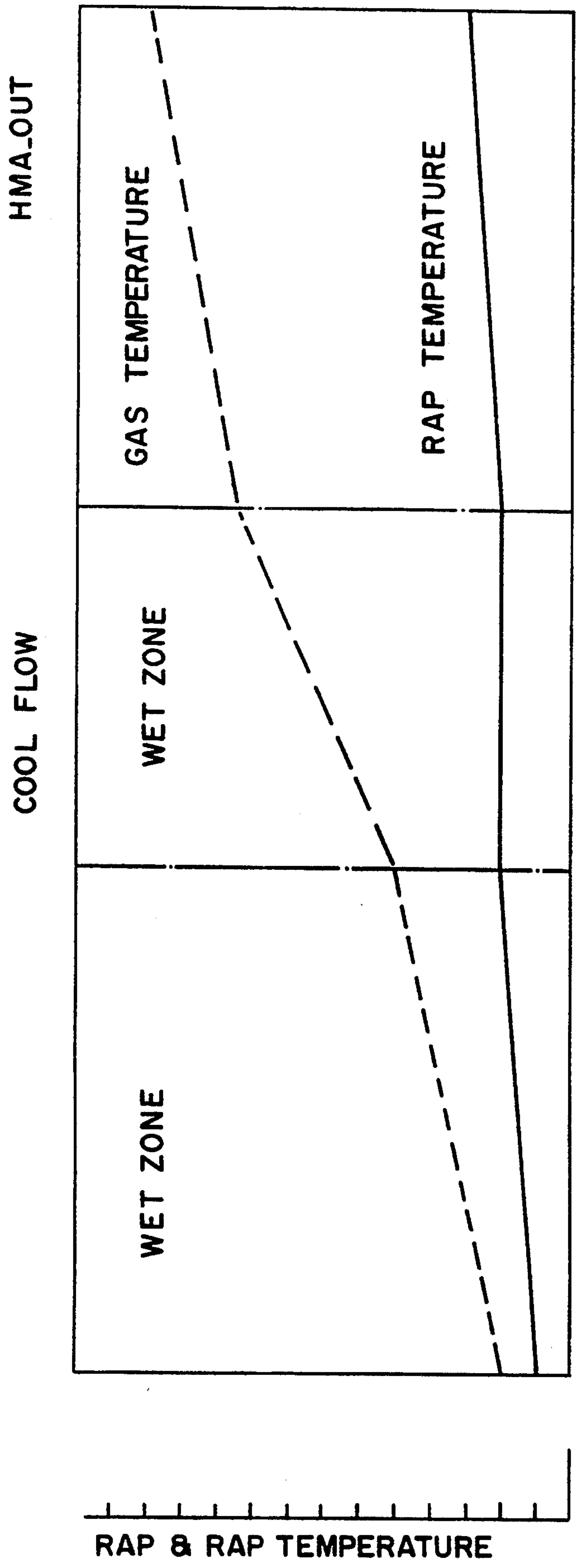
Figure 9A:
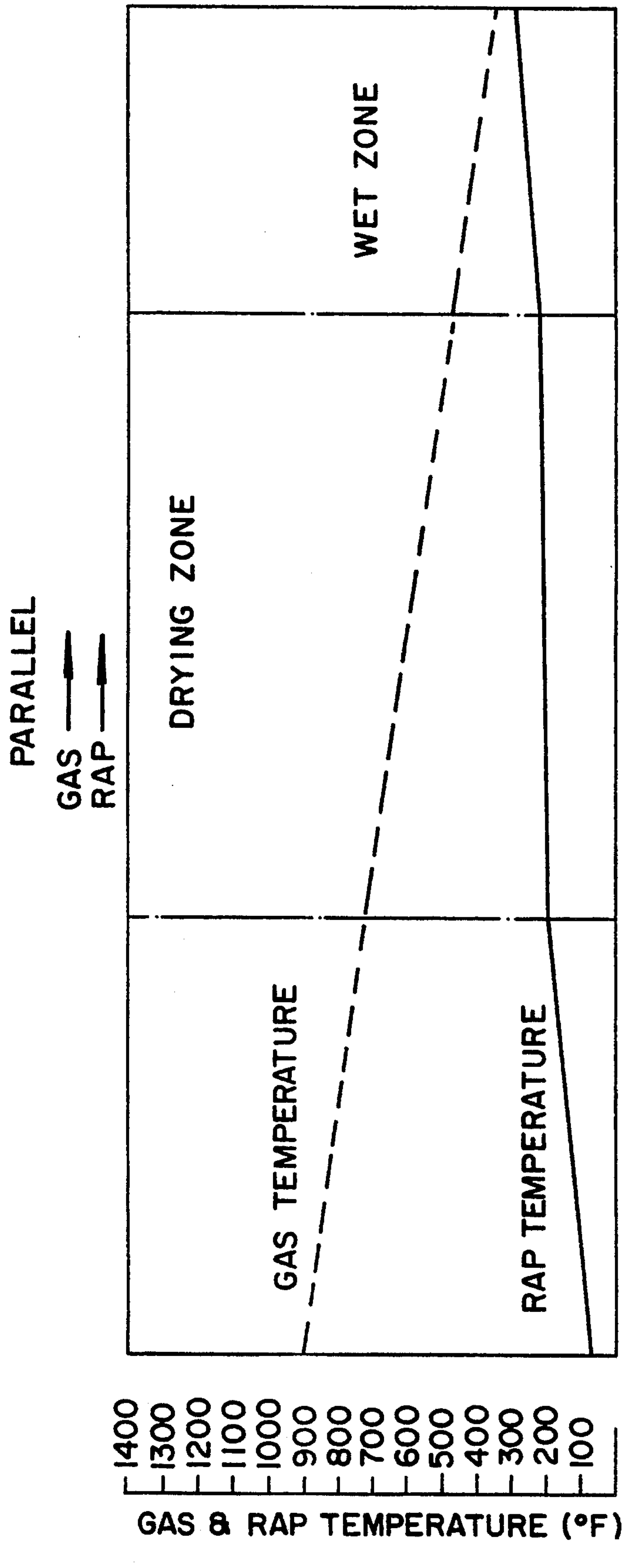
FIGS. 9A and 9B show the drum temperature profiles in the parallel and counterflow cases.
Figure 9B:
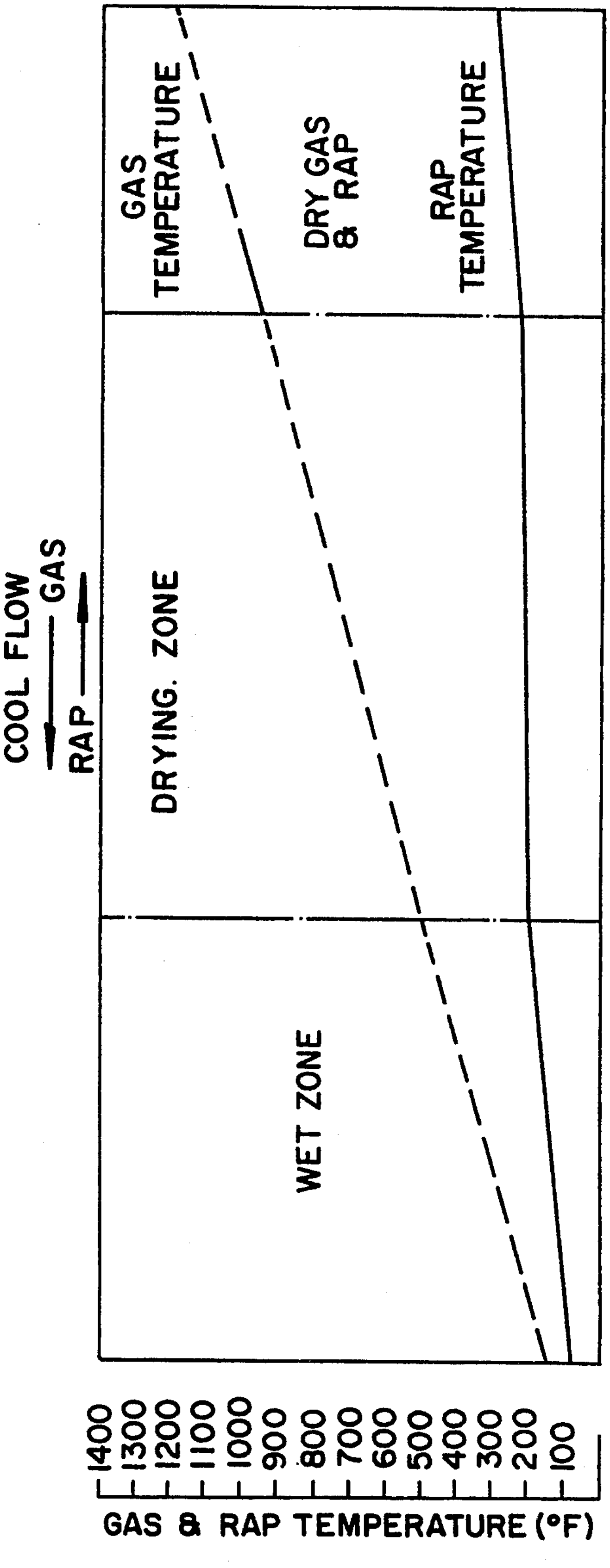

In another preferred embodiment, the process is controlled to meet the temperature profile of the gas and RAP in a rotating counter flow drum as shown in FIGS. 4, 9A and 9B. This temperature profile is divided into three areas, viz an area on the right side of T1 temperature profile where the incoming gases and discharging RAP are dry, a middle drying zone where the moisture in the RAP is being vaporized to dry the RAP, and a wet zone where the incoming RAP can contain significant amounts of moisture and the gases contain significant water vapor from the vaporized moisture in the RAP passing through the drum.

In a preferred embodiment, the diameter of the drum and amount of gas flow through the drum is designed to maintain a gas flow velocity of from about 4 to 40 ft/sec, more preferably from about 8 to 30 ft/sec., most preferably from about 12 to 24 ft/sec. According to the present invention, it has been found that the gases sort the fines and carry excess fines out of the drum. In this way the incoming RAP is given better gradation as it passes into the drum and any optional subsequent treatments. The gas discharging from the drum is preferably at a temperature of from about 130° to 320° F. The air is cooled in the drum to this temperature to ensure that the air and contained fine particles are cool enough to effectively condense any vaporized hydrocarbons on the fine particles (excess fines) in the gases discharging from the drum.

It has also been discovered that by increasing the air volume the dew point is lowered such that lower exhaust discharge temperature ranges can be used. By maintaining the temperature of the discharge gases in these ranges, the relative humidity of the gases is maintained sufficiently low enough to ensure that the gases entering the bag house are above the dew point. This is contrary to prior art teachings that state that if the exhaust gas enters the bag house below 212° F. or even below 250° F., condensation occurs which clogs the (blinding) bags and effectively prevents air flow through the bags. When this occurs, the entire system shuts down. It has been found using the present invention that the bag house can be operated at life extending low temperatures and using less expensive filtering material.

In the process of the present invention, by the time the RAP in the drum is dry and the excess −200 mesh fines are being carried by the gas stream, the asphalt is not yet hot enough to be sticky and encapsulate or capture these excess fines. As a consequence, the excess fines are lifted from the RAP by hot gases in the drum and carried away in the exiting gas stream. Larger particles fall back into the auger section and are reincorporated into the mix.

In operation, it has been found that the oxygen levels of the gases entering the drum are approximately 18%, and that the exit level is approximately the same. Therefore, although not wishing to be bound by theory, it is believed that the elimination of the emission of smoke and degradation of the asphaltic compounds is not a result of reduced oxygen available for the combination with the asphalt. Still further, it is believed that the oxygen in the input stream is combined with the hydrocarbons of the asphaltic compounds by adding oxygen atoms to the long organic chains. It should be noted that this is not combustion, but addition of oxygen to the molecules without breaking up the chains and without production of excessive heat or combustion. This oxygenating results in hardening the asphalt product.

In the counter flow embodiment it has been confirmed that a much smaller portion of the asphaltic compounds boil off or are cracked into smaller volatile molecules when the hot gases that strike the exiting RAP at the gas input are essentially dry and free of the steam that causes steam cracking of the larger asphalt molecules into smaller hydrocarbons that are gaseous at the temperature of the exhaust. These hydrocarbon vapors are then condensed back into the cooler RAP during exit of the gases where the stream contacts RAP at cool ambient temperatures. This produces a clean output which can conform to air pollution standards which limit hydrocarbon vapor emission and opacity.

Dew Point

In the preferred "cool flow" counter flow embodiment, the output gas is less than 200° F., and may be as low as 170° F. The excess air provided to the burner allows reduction of the exhaust gas temperature below 250° F. In the prior art, as reported by the National Asphalt Pavement Association, the exhaust temperature should be at all times greater than 250° F. to avoid condensation. The excess air applied at applicant's burner provides excess air at the exhaust which allows the reduction in temperature because the dew point is also reduced when the air volume is increased. This is a way of removing the moisture at a lower temperature which allows use of less expensive bags in the bag house.

Water Removal

Figure 10:
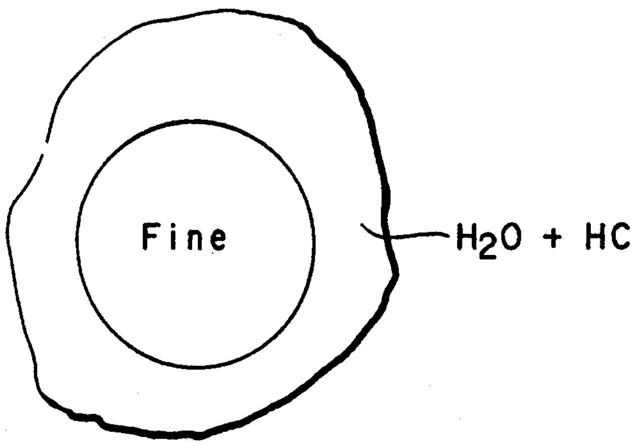
FIG. 10 shows a fines particle which has accumulated moisture.

In applicant's cool flow design using a counterflow drum with excess air, applicant has provided an output temperature less than 200° F. and preferably in the order of 170° F. This, however, is against the teachings of the asphalt processing industry because the dew point of the 170° air is necessarily greater than 170°. If air at such a low temperature is fed into a conventional bag house, there will be blinding of the bags. Therefore, applicant has provided for use of the fines removal as a method of water removal. In this process, applicant removes fines from the input aggregate by the high velocity of the gas in the drum. The excess fines produced by mining of RAP are then carried away from the asphalt material and towards the bag house. However, since the air temperature is low (approximately 170° F.), moisture will condense on the fine particles. Applicant then provides for removal of the fine particles at a location prior to entry of the fines into the bag house. In this process, the moisture is condensed out on the fine particles along with other oily or condensable vapors from the process as shown in FIG. 10.

One method of fines removal is the use of a knockout box. A knockout box is a portion of a duct where the volume increases. This lowers velocity and causes particles to fall out of the air. In this process, the velocity of the air exiting the drum is lowered thereby allowing fines to drop out of the moving air. Periodically, fines are then removed from the knockout box. Other means for fines removal may be used such as cyclone separators or centrifugal separators.

Applicant, therefore, provides an apparatus for making asphalt from RAP comprising in combination a counter flow drum having an outlet air temperature which is above the dew point of the outlet air. In this process, the outlet air has a velocity sufficient to carry fine particles which are less than 200 mesh in size. A means for collecting the fine particles which are less than 200 mesh may be provided in the form of a cyclone separator or a knockout box as used in the asphalt manufacturing industry. In this process, moisture and vapors condense on the fine particles and are removed from the apparatus by the means for collecting fine particles. Applicant next provides a bag house for filtering outlet air located downstream from the means for collecting fine particles. The moisture removed by the collection of fine particles is sufficient to prevent moisture and vapor blinding of the material of the bag house. The temperature of the gases at the drum exit are preferably less than 200° F. and in any event are more than the dew point of the outlet air moisture combination.

Low Temperature Bag House

As discussed above, applicant's apparatus provides for low temperature output air which is spread to the bag house. In applicant's preferred embodiment the temperature may be as low as 170° F. This provides an additional advantage of reduced cost of filter bags in the bag house. The bags in applicant's design do not have to be able to withstand high temperatures, i.e. in the order of 250°–270° F. which are experienced by conventional asphalt production methods. Therefore, bags made of singed acrylic material can be used. These bags are lower in cost and therefore will provide a significant cost savings in the daily maintenance of the asphalt re-treatment plant. NOMEX bags usually cost 4 or 5 times as much per bag.

In FIG. 10 applicant has shown several fine particles where water and hydrocarbon materials have been condensed upon them. This indicates how water removal is accomplished by the removal of excess fines.

Fines Removal

Figure 13:
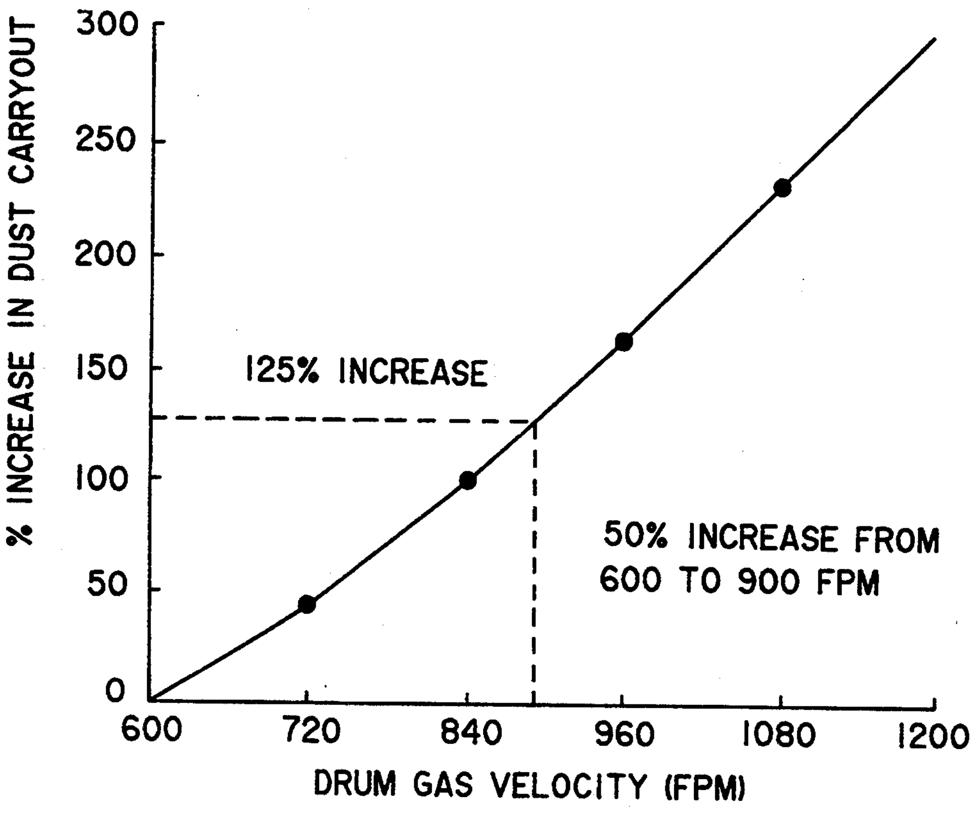
FIG. 13 shows a graph of dust carry out versus drum gas velocity.

As the exhaust gas moves through the drum, dust particles become entrained in it and are carried out of the drum. The speed at which the exhaust gas moves through the drum is called the exhaust gas velocity. As the exhaust gas velocity increases, the exhaust gas entrains more dust particles and larger ones (FIG. 13). The exhaust gas velocity is calculated by dividing the cross-sectional area of the drum into the volumetric flow rate of the exhaust gas. For example, given a drum with a diameter of eight feet, and a volumetric flow rate of 40,000 actual cubic feet per minute (AFCM), the exhaust gas velocity is calculated as follows:

$$X\text{-AREA}=PI\times(8\text{ ft})^2\times\tfrac{1}{4}=50.2\text{ ft}^2$$

$$\text{VELOCITY}=40{,}000\text{ ft}^3/min\div50.2\text{ ft}^2=796\text{ feet/minute }(FPM)$$

The particle sizes of the individual dust particles entrained in the exhaust gas vary. The size, weight and shape of a particle, and the exhaust gas velocity will determine whether a dust particle will become entrained in the exhaust gas. Therefore, there is a maximum particle size that can be carried in the exhaust gas for a specific velocity.

In the parallel flow design used for processing RAP it is impossible to get rid of fines to the extent that it is required for control of the −200 mesh in the asphalt mix. The prior art teaches away from applicant's invention because there is a general objective of keeping the dust down by absorbing them into the asphalt product. In a prior art parallel flow design, the fines are absorbed into the hot, tacky tar prior to exiting and contribute additional fines to the mix. In contrast, the counter flow design provides significant fines removal from the RAP; i.e, ¼ to 3% of the 200 mesh which is in the order of 50 pounds per ton (2½%×2000 lbs.) Fines removal in this invention is controlled by the velocity of the air through the dryer, the amount of excess air in the knockout box. Fines can be removed because they are blown away from the hot, tacky tar substance and out the end of the counter flow drum which feeds the RAP in.

Excess fines (too many fines for tlhe mix) are created when asphalt is removed from a road by milling and crushing. The fines of the original mix are already captured by the asphalt material and will remain captured through the subsequent treatment in the RAP drum. The removal of excess fines allows less addition of make-up rock and bitumen to the mixture because with the lower percentage of fines, the specification for the asphalt mix can be maintained without reducing the fines ratio by increasing the rock amount. This permits a higher RAP percent in the asphalt product. Applicant's counter flow drum is the first RAP drum which uses the drum process for control of fines. All other known processes rely upon control of the mixture of the final asphalt product by addition of material either before or after the drum. Stated another way, there is no "filter" drum known in the art where a large amount of fines can be removed.

Figure 11:
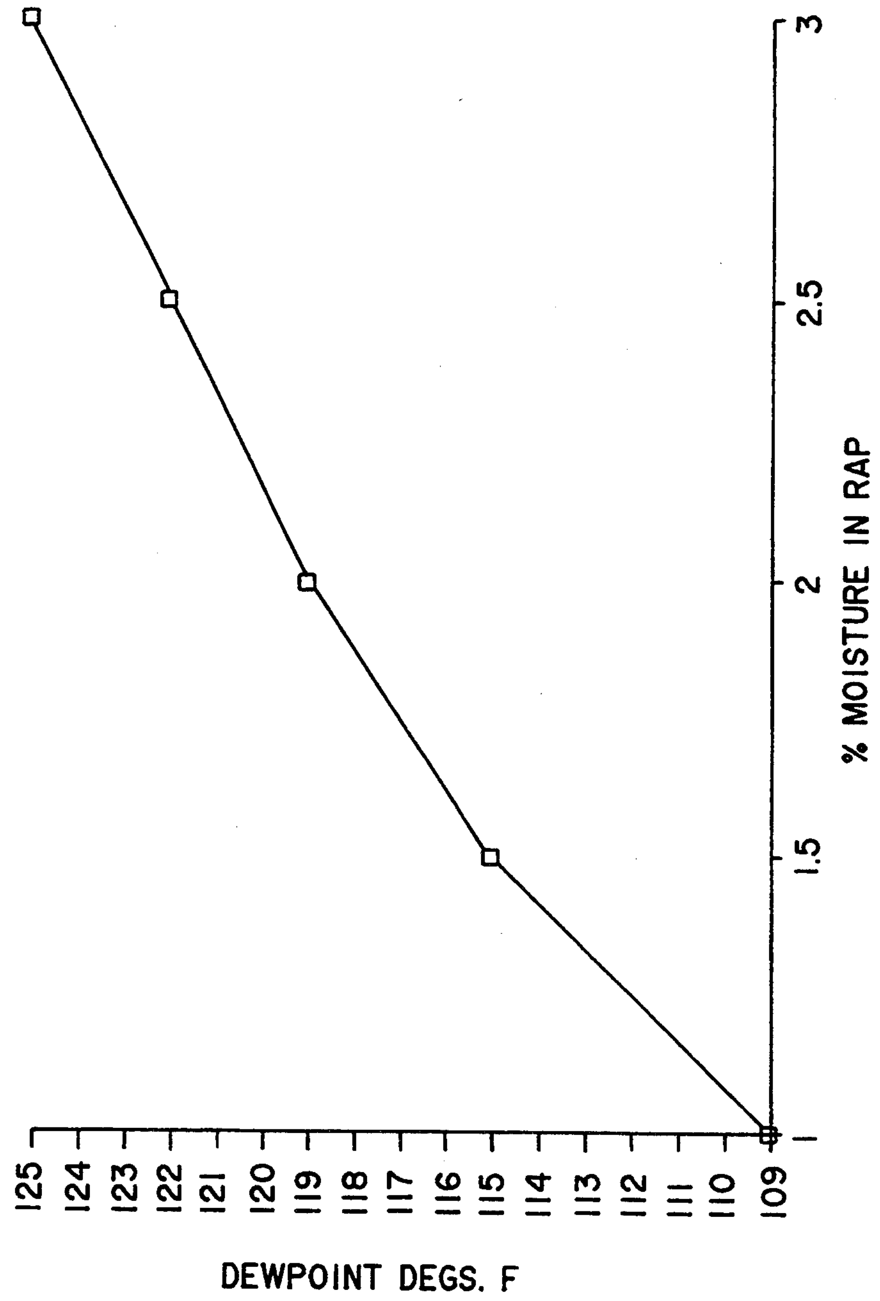
FIG. 11 shows a chart of moisture, temperature and dew point.

FIG. 11 shows the RAP moisture content and dew point where the adjustment in velocity of the air flow for purpose of fines control is accomplished at a point where the velocity does not have a significant effect on the dew point. This graph shows along the horizontal line, moisture in the RAP; along the vertical line, temperature; and a curve show the dew point. The dew point can be adjusted by change in air flow but that this adjustment can occur in the relatively flat portion of the curve in the graph.

Fines control is also achieved by control and monitoring of air flow in the bag house and by particle size at the bag house.

Fines removal is also a function of the gradation of particles in an asphalt mix product. The specification of the mix is a determinant of the number of fines to be removed. An advantage is that fines removal allows a higher percentage of RAP than is achievable where fines remain in the mix. It is detrimental to have too high a content of −200 mesh particles in the mix. Further, the fines removal is adjusted for each asphaltic RAP source. Different sources and different milling conditions produce different fines conditions.

Fines removal has the benefit of allowing the plant to return asphalt production to the original mix proportion of fines. The most critical portion of a mix specification for asphalt is the presence of 200 mesh fines. Excessive fines produce an asphalt which is inferior.

The use of the counter flow drum which provides for mix adjustment by fines removal is by itself a significant economic benefit which justifies its use. Here, the control of the mix is a function of the air flows.

In applicant's drum mixer for processing materials to be used in asphalt pavement, applicant provides a burner means, a counter flow drum wherein direction of material flow through the drum is in the direction opposite to that of hot gas flow, and flights in the drum for raising materials and allowing the materials to fall in a veil in the end of the drum or material enters and where hot gases are removed. Applicants further provide a means for controlling the flow of hot gases through the drum whereby the velocity is sufficiently high to carry off particles which are 200 mesh or smaller in size. In this design, the control means for the air flow rate through the drum is the damper on the exhaust fan. Applicant also provides raising flights which are located downstream from auger flights in the drum as a control of fines removal. The size of the mesh removed is a function of the sizes found in the RAP, and the desired size distribution in the final reprocessed RAP asphalt product. This is specified in accordance with road construction requirements which determine particle sizes and ratios in asphalt pavement. Applicants fines removal technique may also be used where virgin materials are being used and excess fines are encountered. Still further, applicant's method of removal may be used where there is a mixture of RAP and virgin material. Fines removal is preferably accomplished prior to the bag house, and this can be provided by the use of a knockout box or removed by a cyclone separator.

It should be noted that the standard practice in the asphalt production industry is that the excess air in the drum should be in the order of 0–25%, and should not be greater than 100% as practiced by applicant in the cool flow design.

Applicant has provided with the cool flow counter flow design a fines removal system which allows operation of the bag house at a temperature substantially below 212° F. This is possible because the fines removal removes the moisture and prevents blinding of the bag house. In reference 2, FIG. 11, it can be seen that the curve if extended, that the moisture curve runs asymptotic to the 212° line which would be the boiling point of water at sea level conditions.

Temperature Spikes

During the development which included the tube-type dryer as shown in the Radomsky U.S. Pat. No. 4,957,434, it was discovered that although the air goes through areas where flow is turbulent, and through turning vanes and other devices which should cause mixing of the air, the actual air delivered to the tubes in the dryer varied from 200°-600° F. when temperature was measured at different locations such as different tubes. This discovery of non-uniform heating from this conventional asphalt burner (flame ball) lead to the search for a burner or flame source which could give a more even heat when delivered to the tubes. Eclipse AH burner, which produces a wall of flame and a very even temperature measurement across the entire duct was selected. This burner resulted in even temperatures supplied to the tube-type air dryer. The tube-type dryer with the eclipse-type burner was initially conceived after measurements were made in the tube at the inlets to the tubes. Even if there are very few temperature spikes which produce degradation, charring, or coking of the RAP, undesirable smoking conditions will result. If 1% of the RAP is affected by high temperature spike gasses, it can result in degradation and unacceptable smoke even though the mixture is 99% correct.

Removal of spikes in temperature at the inlet to the drum can also be accomplished by devices such as fans, mixing vanes, mixing tubes, defusers and turbulence inducing devices. These measures may be used where other types of fuel are to be used, such as oil or coal. It should be noted that oil and coal in order to provide clean burning will also require high burning temperatures and hence substantial mixing of the cool air with the heated air prior to contact with the RAP veil in the drum.

Energy Consumption

In applicant's cool flow, counter flow design the actual energy consumed per ton is approximately 130% of that of a conventional drum which has an output temperature in the order of 250°-300° F. Applicant's output temperature, however, is only 160-°170° F. and therefore the change in temperature of the output partially compensates for the higher mass flow of air through the counterflow dryer with excess air (1200° at drum input). Applicant uses double the air mass to reduce the inlet temperature of the drum to 1200° but by achieving a further temperature drop to 170° F. from 130° F. at the output, applicant achieves an increase in the energy requirement only approximately 130% rather than the 200% that would be present with a 300° F. air output temperature.

As shown in the flow chart (FIG. 7B), applicant provides for hydrocarbon emission control and minimizing of the smoke as a process control parameter. This measuring of the smoke and adjusting of the burner temperature and air flow in accordance with the smoke is believed to be unique to applicant's cool flow design.

Drum Temperature and Efficiency

FIGS. 9A and 9B show a comparison of gas and RAP temperatures in applicant's parallel flow and counter flow drums. FIG. 9B shows the parallel flow situation which is also termed by applicant to be cool flow. In the parallel case, the gas input temperature (900° F.) is highest where the RAP temperature is at ambient (less than 100° F.). As the gas and RAP pass through together in parallel, the falling gas temperature approaches the rising RAP temperature. However, as a practical matter the two can never be precisely the same because there is always some heat transfer from the gas to the RAP where the size is finite. In the cool flow situation, the gas inlet temperature is shown to be in the order of 1200° F. which is greater than that in the parallel flow case. Here, the gas enters from the right hand side and the RAP enters from the left. Therefore, the exit gas temperature may be less than the exit RAP temperature. It is this characteristic of a counter flow drum which provides for the greater efficiency, and output temperature less than the dew point of the gas. In applicant's counterflow design, the exit gas temperature is less than 200° F. and hence contains very little useful heat that is available for recycling to the burner or air input. As a practical matter, it has been found by applicant that the output gas temperature is so low in a cool flow case that the output air can be discarded without a significant affect on overall system efficiency.

Drum Temperature and Efficiency

Example 1

Applicant has compared the conventional counterflow case and the instant cool flow counterflow case. The main difference is than in conventional counterflow drums, the drum air inlet temperature is maintained at a high degree i.e. 2400° F. In contrast, applicant's cool flow counter flow provides an air input temperature in the order of 1200° F. The following comparisons are based upon computer simulation of the processes.

TABLE 2

CONVENTIONAL COUNTERFLOW
Drum Dryer Calculation Sheet

| # | Variables | | | | | |
|---|---|---|---|---|---|---|
| 1 | Drum DIA. | 10.0 | Ft. | | | |
| 2 | Ambient Temperature | 70 | Degs. F. | 580 | 0.0750 Air Density | |
| 3 | RAP Input Rate | 300 | Tons/Hr | 576,000 | Lbs. RAP | |
| 4 | Moisture Content | 4.00 | % | 24,000 | Lbs. H2O | |
| 5 | Drum Air in Temp. | 2,400 | Degs. F. | 0.0200 | Air Density #/Ft3 | |
| 6 | Drum Air Out Temp. | 270 | Degs. F. | 2,130 | Air Delta T | |
| 7 | RAP Outlet Temp. | 300 | Degs. F. | 230 | RAP Delta T | |
| 8 | % Air Recycled | 0 | % | 0.0545 | Air Density | 270 |
| 9 | % Unremoved H2O | 0.20 | % | 2996 | Sys. Leakage Discharge | |
| 10 | RAP Heating | 27,820,800 | BTU/HR | 2,175 | Sys Leakage Vol. @ Ambient | |
| 11 | H2O Vaporizing | 26,220,000 | BTU/HR | 1,500 | Leakage Drum Inlet @ Amb. | |
| 12 | Drum Leakage BTU Loss | 324,000 | BTU/HR | 2,066 | Drum Leakage & Discharge | |
| 13 | Total | 54,364,000 | BTU/HR | 3,072 | BTU/SCFM Inlet Air | |
| 14 | Exh. Air Heat | 7,615,774 | BTU/HR | 23,633 | Drum Inlet SCFM | |
| 15 | (Total & Exh) | 65,079,683 | BTU/HR | 72,599,837 | Burner BTU Required | |
| 16 | Air Into Drum | 88,734 | ACFM @ | 2,400 | Deg. F. | |
| 17 | Air Into Drum | 23,633 | SCFM | | | |
| 18 | Drum Air Discharge | 32,551 | ACFM @ | 270 | Deg. F. | |
| 19 | Steam Volume | 10,951 | CFM | | | 29 |
| 20 | Total Drum Discharge | 45,567 | ACFM @ | 270 | Deg. F. | 22,000.00 |
| 21 | Total Drum Discharge | 33,083 | SCFM | | | |

TABLE 2-continued

CONVENTIONAL COUNTERFLOW
Drum Dryer Calculation Sheet

| # | Variables | | | | | |
|---|---|---|---|---|---|---|
| 22 | Drum Exh. Gas Vel. | 588 | F/M | | | |
| 23 | Total Sys. Discharge | 48,563 | ACFM @ | 270 | Deg. F. | 1 |
| 24 | Total Sys. Discharge | 35,258 | SCFM | | | |
| 25 | % Additive | 0.50 | % Add | 48 | Add #/Min. | 345 |
| 26 | Add. #/Hour | 2,880 | #/Hr | 0 | # Air Rec. | 32,551 |
| 27 | Return Air | 0 | ACFM @ | 270 | Deg. F. | 10951 |
| 28 | Return H2O | 0 | CFM | 0 | #H2O Rec. | |
| 29 | Return Air + H2O | 0 | ACFM | 0 | | 22,528 |
| 30 | Combustion Air | 6,000 | ACFM @ | 70 | Deg. F. | 66,286 |
| 31 | Bleed Air | 17,633 | ACFM @ | 70 | Deg. F. | |
| 32 | Exh. Gas Vol. | 48,563 | ACFM @ | 270 | Deg. F. | 1,922 |
| 33 | | | | | | 388 |
| 34 | % H2O in System | 16.50 | % | Lbs. H2O/Total Lbs In Sys | | 96,244 |
| 35 | % H2O Exhausted | 16.50 | % | | | −7509 |
| 36 | | | | | | |
| 37 | HG Consummation @ Max | 72,600 | CFHR | | | −135 |
| 38 | 1000 BTU/FT3 | | | | | −22 |
| 39 | Propane Consummation | 799 | Gals./Hr. | | | −113 |
| 40 | 90900 BTU/GAL | | | | | |
| 41 | #1 Fuel Oil | 538 | Gals./Hr | @135000 | BTUs/Gal | |
| 42 | Desired Temp. Out Of | 300 | Deg. F. | | | |
| 43 | Microwaves | | | | | |
| 44 | Mw Kw Required | 389 | Kilowatts @ | 95% Eff. | | |
| 45 | | | | | | 285 |
| 46 | Mw's Available | 6 | Units | | | 972,420 |
| 47 | MW Kw's/Unit | 50 | Kw's | | | 1,326,000 |
| 48 | Actual Temp. Out of # | 297 | Deg. F. | | | (353,500) |
| 49 | Microwaves | | | | | |
| 50 | | | | | | |
| 51 | After Burner Temp. | 270 | Deg. F. | | | |
| 52 | After Burner BTUs | 0 | BTUs/Hr. | | | |
| 53 | Operating Days/Week | 5 | | | | |
| 54 | Operating Hours | 8 | Hrs. | 40 | Hrs/Week | |
| 55 | Tons Produced | 2,316 | Tons | 11578 | Tons/Week | |
| 56 | Additive Gals./Day | 2,759 | Gal. | 13796 | Add/Week | |
| 57 | NG CF/Day | 581 | KCF NG | 2904 | KCF NG CF/Week | |
| 58 | Propane Gals./Day | 6,389 | Gals. | 31947 | Gals./Week | |

TABLE 3

CYCLEAN COOL FLOW
Drum Dryer Calculation Sheet

| # | Variables | | | | | |
|---|---|---|---|---|---|---|
| 1 | Drum DIA. | 10.0 | Ft. | | | |
| 2 | Ambient Temperature | 70 | Degs. F. | 891 | 0.0750 Air density | |
| 3 | RAP Input Rate | 300 | Tons/Hr | 576,000 | Lbs. RAP | |
| 4 | Moisture Content | 4.00 | % | 24,000 | Lbs. H2O | |
| 5 | Drum Air In Temp. | 1,200 | Degs. F. | 0.0239 | Air Density #/Ft3 | |
| 6 | Drum Air Out Temp. | 170 | Degs. F. | 1,030 | Air Delta T | |
| 7 | RAP Outlet Temp. | 300 | Degs. F. | 230 | RAP Delta T | |
| 8 | % Air Recycled | 0 | % | 0.0631 | Air Density | 170 |
| 9 | % Unremoved H2O | 0.20 | % | 4052 | Sys. leakage Discharge | |
| 10 | RAP Heating | 27,820,800 | BTU/HR | 3,489 | Sys Leakage Vol. @ Ambient | |
| 11 | H2O Vaporizing | 26,220,000 | BTU/HR | 1,500 | Leakage Drum Inlet @ Amb. | |
| 12 | Drum Leakge BTU Loss | 162,000 | BTU/HR | 1,783 | Drum Leakage & Discharge | |
| 13 | Total | 54,282,000 | BTU/HR | 1,488 | BTU/SCFM Inlet Air | |
| 14 | Exh. Air Heat | 6,724,772 | BTU/HR | 48,726 | Drum Inlet SCFM | |
| 15 | (Total & Exh) | 63,973,958 | BTU/HR | 72,584,285 | Burner BTU Required | |
| 16 | Air Into Drum | 152,614 | ACFM @ | 1,200 | Deg. F. | |
| 17 | Air Into Drum | 48,726 | SCFM | | | |
| 18 | Drum Air Discharge | 57,920 | ACFM @ | 170 | Deg. F. | |
| 19 | Steam Volume | 10,260 | CFM | | | 27 |
| 20 | Total Drum Discharge | 69,963 | ACFM @ | 170 | Deg. F. | 22,000.00 |
| 21 | Total Drum Discharge | 58,857 | SCFM | | | |
| 22 | Drum Exh. Gas Vel. | 891 | F/M | | | |
| 23 | Total Sys. Discharge | 74,815 | ACFM @ | 170 | Deg. F. | 1 |
| 24 | Total Sys. Discharge | 62,266 | SCFM | | | |
| 25 | % Additive | 0.50 | % Add | 48 | Add #/Min. | 345 |
| 26 | Add. #/Hour | 2,880 | #/Hr | 0 | # Air Rec. | 57,920 |
| 27 | Return Air | 0 | ACFM @ | 170 | Deg. F. | 10260 |
| 28 | Return H2O | 0 | CFM | 0 | #H2O Rec. | |
| 29 | Return Air + H2O | 0 | ACFM | 0 | | 18,792 |
| 30 | Combustion Air | 6,000 | ACFM @ | 70 | Deg. F. | 133,021 |
| 31 | Bleed Air | 42,726 | ACFM @ | 70 | Deg. F. | |
| 32 | Exh. Gas Vol. | 74,015 | ACFM @ | 170 | Deg. F. | 3,884 |
| 33 | | | | | | 300 |
| 34 | % H2O In System | 9.00 | % | Lbs. H2O/Total Lbs In Sys | | 158878 |

TABLE 3-continued

| # | Variables | CYCLEAN COOL FLOW Drum Dryer Calculation Sheet | | | |
|---|---|---|---|---|---|
| 35 | % H2O Exhausted | 9.00 | % | | −6264 |
| 36 | | | | | |
| 37 | HG Consummation @ Max | 72,504 | CFHR | | −142 |
| 38 | 1000 BTU/FT3 | | | | −13 |
| 39 | Propane Consummation | 790 | Gals./Hr. | | −129 |
| 40 | 90900 BTU/GAL | | | | |
| 41 | #1 Fuel Oil | 537 | Gals./Hr | @135000 BTUS/Gal | |
| 42 | Desired Temp. Out Of | 300 | Deg. F. | | |
| 43 | Microwaves | | | | |
| 44 | Mw Kw Required | 389 | Kilowatts @ | 95% Eff. | |
| 45 | | | | | 285 |
| 46 | Mw's Available | 6 | Units | | 972,420 |
| 47 | MW Kw's/Unit | 50 | Kw's | | 1,326,000 |
| 48 | Actual Temp. Out of # | 297 | Deg. F. | | (353,500) |
| 49 | Microwaves | | | | |
| 50 | | | | | |
| 51 | After Burner Temp. | 170 | Deg. F. | | |
| 52 | After Burner BTUs | 0 | BTUs/Hr. | | |
| 53 | Operating Days/Week | 5 | | | |
| 54 | Operating Hours | 8 | Hrs. | 40 Hrs/Week | |
| 55 | Tons Produced | 2,316 | Tons | 11578 Tons/Week | |
| 56 | Additive Gals./Day | 2,759 | Gal. | 13796 Add/Week | |
| 57 | NG CF/Day | 580 | KCF NG | 2900 KCF NG CF/Week | |
| 58 | Propane Gals./Day | 6,381 | Gals | 31905 Gals./Week | |

The data for the cool flow and conventional counterflow cases show that the drum air inlet temperature of 1200° F. is half of that found in the conventional counterflow. This is selected so that there will not be burning, charring or cracking of the RAP material when it encounters the high heat of a conventional drum. The drum area outlet temperature in the cool flow case is 170° F. or substantially less than the 270° F. of a counterflow conventional apparatus. The reason for this is that applicant has found that moisture removal by fines removal prior to the bag house allows use of air in the bag house which is at a temperature less than the dew point.

Applicant in the cool flow case provides 48,726 cubic feet per minute of air to the drum, which is over twice as much as the cubic feet per minute provided in the conventional counterflow (see item 17). In applicant's cool flow design, the exhaust gas volume is 74,815 cubic feet per minute while in the conventional case the exhaust gas volume of 48,563, see item 32.

As shown in items 55-59, the tonnage, additive, and propane used are the same in both cases. However, in applicant's cool flow design the problem of burning and smoking of the RAP material is eliminated by the reduced input temperature. This approach by applicant is against the teaching of the art which would require that the drum air and the RAP have a maximum difference in temperature in order to provide a maximum heat transfer from the air to the RAP.

Example 2

Table 4 shows operating conditions on Nov. 21, 1991, in applicant's experimental plant in Waxahatchie, Tex. In this facility, the burner is being run on natural gas. The plant was shut down at 11:45 a.m. in order to move the paver at the job site. The unit was restarted at 2:00 p.m. and shut down again at 4:00 p.m.

The operating parameters are defined as follows. TPH is tons per hour, drum is drum temperature in °F., bags is bag temperature in °F., A-B is the temperature at the after burner, RAP gives the temperature of the RAP output, Exh % indicates the bag fan percentage which means damper control of main air of entire system.

TABLE 4

DAILY LOG

| Time | TPH | DRUM | BAGS | A/B | RAP | EXH % ADD % |
|---|---|---|---|---|---|---|
| | | | Temperatures | | | |
| 7:30 | 131 | 1318 | 185 | 1412 | 320 | 100.6$^{25}$ |
| 8:30 | 146 | 1311 | 182 | 1426 | 300 | 100.6$^{25}$ |
| 9:30 | 159 | 1333 | 180 | 1418 | 300 | 100.5$^{25}$ |
| 10:00 | 145 | 1300 | 185 | 1424 | 289 | 100.5$^{25}$ |
| 10:30 | 146 | 1343 | 184 | 1434 | 292 | 100.5$^{25}$ |
| 11:08 | 145 | 1322 | 184 | 1429 | 303 | 100.5$^{25}$ |
| 2:30 | 143 | 1306 | 175 | 1401 | 300 | 100.625 |
| 3:00 | 144 | 1308 | 176 | 1420 | 304 | 100.5$^{25}$ |

In Table 5 applicant provides a daily log summary of daily averages obtained from the Waxahachie operation depicted in Table 4. In this Table, the terms which are the same as in Table 4 are indicated, The theoretical moisture is an estimate of the moisture content in the RAP on the day of operation, The term ADD used refers to the amount of additive used and the term ADD% indicates the percentage of the ton sold which is additive.

TABLE 5

Daily Log Summary

| Date | Drum TPH | Theo. Temp | Bag Moisture | A/B Temp | | RAP Temp | Temp | Bag | Fan % | AddAdd Used % |
|---|---|---|---|---|---|---|---|---|---|---|
| Oct 2 | 163.4 | 1202.1 | 3.4 | 174.4 | 1395.0 | 282.3 | 65.0 | 1467.4 | 0.50 | 1226.0 |
| Oct 3 | 197.6 | 1331.6 | 3.4 | 181.1 | 1422.9 | 276.6 | 70.0 | 2706.3 | 0.51 | 2211.7 |
| Oct 4 | 202.5 | 1303.3 | 3.2 | 180.0 | 1420.7 | 278.0 | 70.0 | 2189.0 | 0.50 | 1804.0 |
| Oct 5 | 173.9 | 1241.5 | 3.5 | 162.3 | 1428.2 | 291.0 | 68.51 | 1514.1 | 0.51 | 1224.0 |
| Oct 7 | 210.7 | 1327.4 | 3.1 | 181.1 | 1415.1 | 282.9 | 70.0 | 2232.7 | 0.51 | 1804.0 |
| Oct 8 | 212.1 | 1349.9 | 3.2 | 176.9 | 1418.9 | 281.4 | 70.0 | 2507.3 | 0.51 | 2037.0 |

TABLE 5-continued

| | | | | Daily Log Summary | | | | | | |
|---|---|---|---|---|---|---|---|---|---|---|
| Date | Drum TPH | Theo. Temp | Bag Moisture | A/B Temp | | RAP Temp | Temp | Bag | Fan % | AddAdd Used % |
| Oct 9 | 167.5 | 1206.3 | 3.6 | 165.4 | 1423.4 | 289.3 | 70.0 | 933.3 | 0.53 | 729.0 |
| Oct 14 | 169.2 | 1137.7 | 2.2 | 166.0 | 1413.1 | 289.2 | 45.0 | 1641.3 | 0.54 | 1265.0 |
| Oct 15 | 203.7 | 1196.6 | 2.9 | 175.8 | 1425.5 | 290.1 | 70.0 | 2875.5 | 0.53 | 2239.0 |
| Oct 16 | 196.3 | 1237.4 | 2.8 | 173.3 | 1425.2 | 286.6 | 61.8 | 2255.3 | 0.53 | 1773.0 |
| Oct 17 | 208.3 | 1318.8 | 4.5 | 180.3 | 1424.6 | 287.2 | 100.0 | 2911.9 | 0.53 | 2301.0 |
| Oct 18 | 181.9 | 1176.6 | 4.6 | 175.4 | 1407.8 | 287.2 | 100.0 | 1682.3 | 0.58 | 1204.0 |
| Oct 19 | 201.4 | 1300.6 | 4.6 | 172.0 | 1414.0 | 288.0 | 100.0 | 1426.6 | 0.53 | 1124.0 |
| Oct 21 | 199.1 | 1317.2 | 3.3 | 169.3 | 1427.4 | 207.3 | 70.6 | 2544.7 | 0.53 | 2003.0 |
| Oct 22 | 203.7 | 1167.5 | 3.5 | 176.5 | 1413.0 | 270.0 | 06.4 | 1385.4 | 0.51 | 1130.0 |
| Oct 23 | 202.9 | 1143.5 | 4.0 | 163.8 | 1420.7 | 281.4 | 100.0 | 2523.0 | 0.54 | 1928.0 |
| Oct 24 | 195.4 | 1221.0 | 4.2 | 165.6 | 1423.4 | 284.9 | 93.1 | 2210.6 | 0.52 | 1766.0 |
| Oct 25 | 178.6 | 1174.6 | 4.6 | 166.3 | 1399.9 | 277.4 | 90.0 | 2070.0 | 0.53 | 1846.0 |

In the counterflow design it is believed that the clean operation without excessive hydrocarbon and smoke emission is due to the condensation of vapors in the exiting gases upon the entering RAP which is cold (Ambient temperatures). The condensate on the RAP is then carried by the RAP out of the drum. These materials are ultimately incorporated into the Hot Mixed Asphalt (HMA) product.

Although the invention has been shown and described with respect to a best mode embodiment thereof, it should be understood by those skilled in the art that the foregoing and various other changes, omissions and deletions in the form and detail thereof may be made therein without departing from the spirit and scope of this invention.

What is claimed is:

1. In a process of drying and heating recycled asphaltic pavement (RAP) to form a hot mix, with low hydrocarbon emissions, into the atmosphere wherein hot gases are passed through a drum in a direction opposite to RAP, the further steps comprising:

a) discharging the hot gases from the drum at temperature of from about 160°-200° F., b) passing the hot gases from the drum through a knockout box, whereby to remove particulate material from the hot gases, c) passing the hot gases from the knockout box through bags in a baghouse to further remove fines from the hot gases, said baghouse having a particulate coating thereon of a particulate material comprising SiO and $Al_2O_3$, and d) passing hot gases from the baghouse through an oxidizer, whereby to remove any smoke and entrained asphaltic material.

2. The process of claim 1, wherein hot gases discharging from the drum are at a temperature of from about 190°-200° F.

3. The process of claim 1, wherein hot gases are passed from the knockout box upwardly and then through a goose-neck shaped passage and into the baghouse.

4. The process of claim 1, wherein the particulate coating on the bag comprises diatomaceous earth.

5. The process of claim 1, wherein the protective coating on the bag further comprises $Na_2O$, $K_2O$, MgO, CaO and $Fe_2O_3$.

6. The process of claim 1, wherein SiO is finely divided amorphous silica.

7. The process of claim 1, wherein the protective coating on the bag is about one-eighth of an inch thick.

8. The process of claim 1, wherein the protective coating on the bag is from about one-sixth to one-eighth of an inch thick.

9. The process of claim 1, wherein a shockwave is used to remove the protective coating.

10. The process of claim 1, wherein a protective coating is used which absorbs moisture and asphaltic material.

11. The process of claim 1, wherein hot gases from the oxidizer are passed through a heat exchanger.

12. The process of claim 1, wherein hot gases pass through a heat exchanger to heat incoming air to the oxidizer.

13. The process of claim 1, wherein the bag is an acrylic fabric.

* * * * *